US012602300B2

(12) United States Patent
Venkatanarayanan et al.

(10) Patent No.: US 12,602,300 B2
(45) Date of Patent: Apr. 14, 2026

(54) TECHNIQUES FOR EFFICIENTLY TRANSITIONING OBJECT GROUPS TO LOW RPO REPLICATION MODE

(71) Applicant: Dell Products L.P., Hopkinton, MA (US)

(72) Inventors: Prakash Venkatanarayanan, Framingham, MA (US); Girish Sheelvant, Hopkinton, MA (US); Sathya Krishna Murthy, Morrisville, NC (US); Nagapraveen Veeravenkata Seela, Cary, NC (US)

(73) Assignee: Dell Products L.P., Hopkinton, MA (US)

( * ) Notice: Subject to any disclaimer, the term of this patent is extended or adjusted under 35 U.S.C. 154(b) by 12 days.

(21) Appl. No.: 18/778,087

(22) Filed: Jul. 19, 2024

(65) Prior Publication Data

US 2026/0023663 A1     Jan. 22, 2026

(51) Int. Cl.
        *G06F 11/20*          (2006.01)
        *G06F 11/1446*        (2026.01)
(52) U.S. Cl.
        CPC ...... *G06F 11/2074* (2013.01); *G06F 11/1451* (2013.01)
(58) Field of Classification Search
        CPC .................... G06F 11/2074; G06F 11/1451
        USPC ...................................... 714/6.3
        See application file for complete search history.

(56) References Cited

U.S. PATENT DOCUMENTS

| | | | | |
|---|---|---|---|---|
| 10,025,843 | B1 * | 7/2018 | Meiri ................. | G06F 11/2074 |
| 10,885,061 | B2 * | 1/2021 | Ward ................. | G06F 11/2071 |

OTHER PUBLICATIONS

U.S. Appl. No. 18/243,761, filed Sep. 8, 2023, entitled Data Storage System With Efficient Data Change Reporting for Replication, Alan L. Taylor, et al.
U.S. Appl. No. 18/486,579, filed Oct. 13, 2023, entitled Techniques for User Snapshot Orchestration During Asynchronous Replication, Alan L. Taylor, et al.
U.S. Appl. No. 18/641,996, filed Apr. 22, 2024, entitled Techniques for Dynamic Resource Balancing With Asynchronous Replication, Vamsi K. Vankamamidi, et al.

* cited by examiner

*Primary Examiner* — Yair Leibovich
(74) *Attorney, Agent, or Firm* — BainwoodHuang

(57) ABSTRACT

Techniques can include: establishing an asynchronous replication configuration for a replication session of a source volume group VG1 and a target volume group VG2; and performing processing to transition the replication session to a low RPO (recovery point objective) replication mode comprising: setting the replication session to an alternative asynchronous replication (AAR) mode; transitioning the replication session to a hybrid mode; creating a first snapset of snapshots of source volumes of VG1; replicating each snapshot of the first snapset from a source to a target system in either the low RPO replication mode or the AAR mode based on an associated member level asynchronous replication mode corresponding to said each snapshot; and constructing a second snapset of snapshots of target volumes of VG2, wherein each snapshot in the second snapset denotes a same point in time copy as a corresponding snapshot in the first snapset.

20 Claims, 19 Drawing Sheets

Figure 5B:
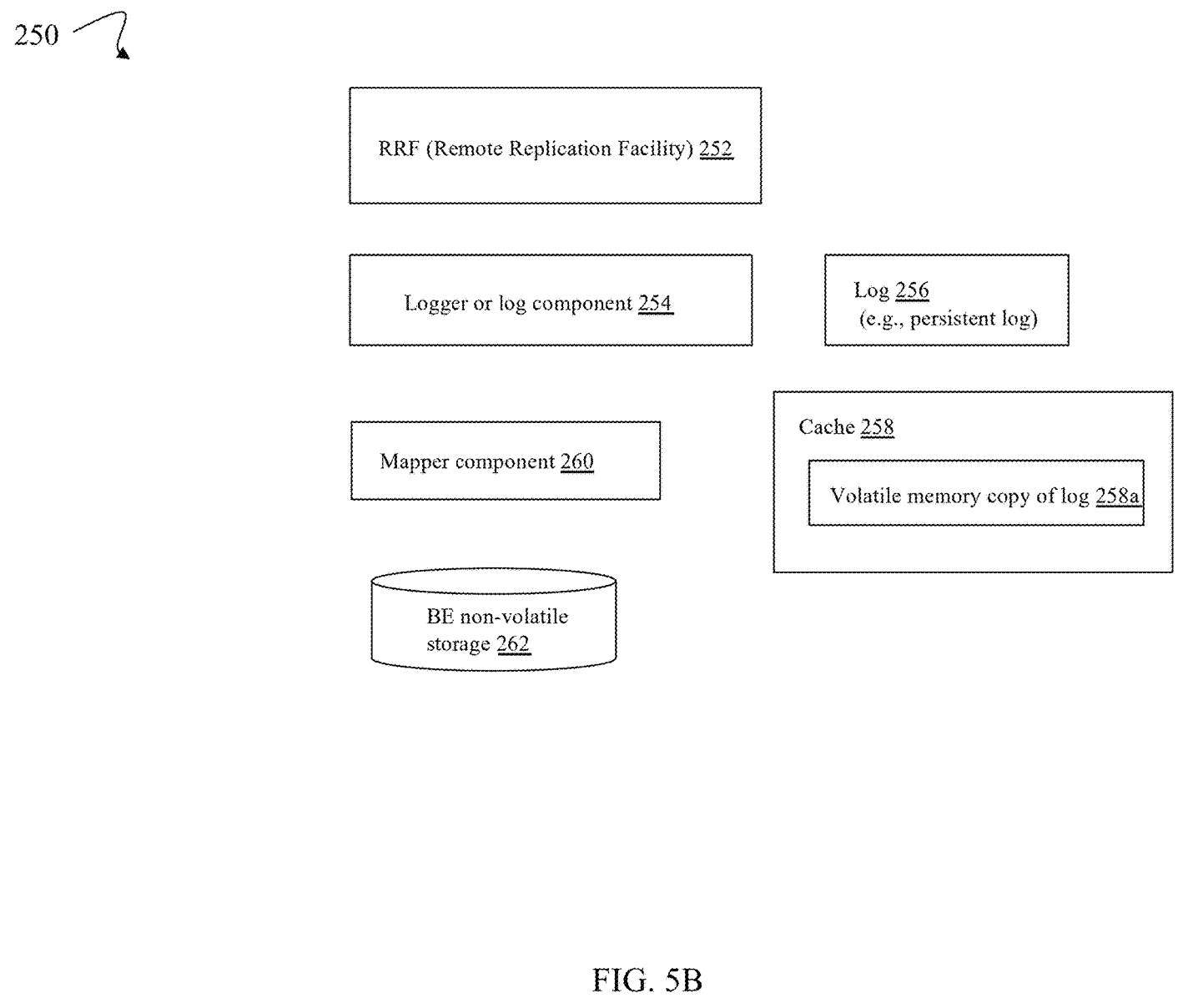

250

Log 256
(e.g., persistent log)

Cache 258

Volatile memory copy of log 258a

RRF (Remote Replication Facility) 252

Logger or log component 254

Mapper component 260

BE non-volatile storage 262

301 Increasing time order

302a Take snap 1(V1), TF
302b W1 (write LBA A of V1)
302c W2 (write LBA B of V1)
302d Take snap 2(V1), TF
302e W3 (write LBA C of V1)
302f W4 (write LBA D of V1)
302g Delete snap1 (V1)
302h Take snap 3 (V1), TF
302i W5 (write LBA E of V1)
302j Delete snap2 (V1)

Tracking ID=ID1

LBA A (e.g., W1 302b)

LBA B (e.g., W2 302c)

Tracking ID=ID2

LBA C (e.g., W3, 302e)

LBA D (e.g., W4, 302f)

410

420

410a

410b

420a

420b

400

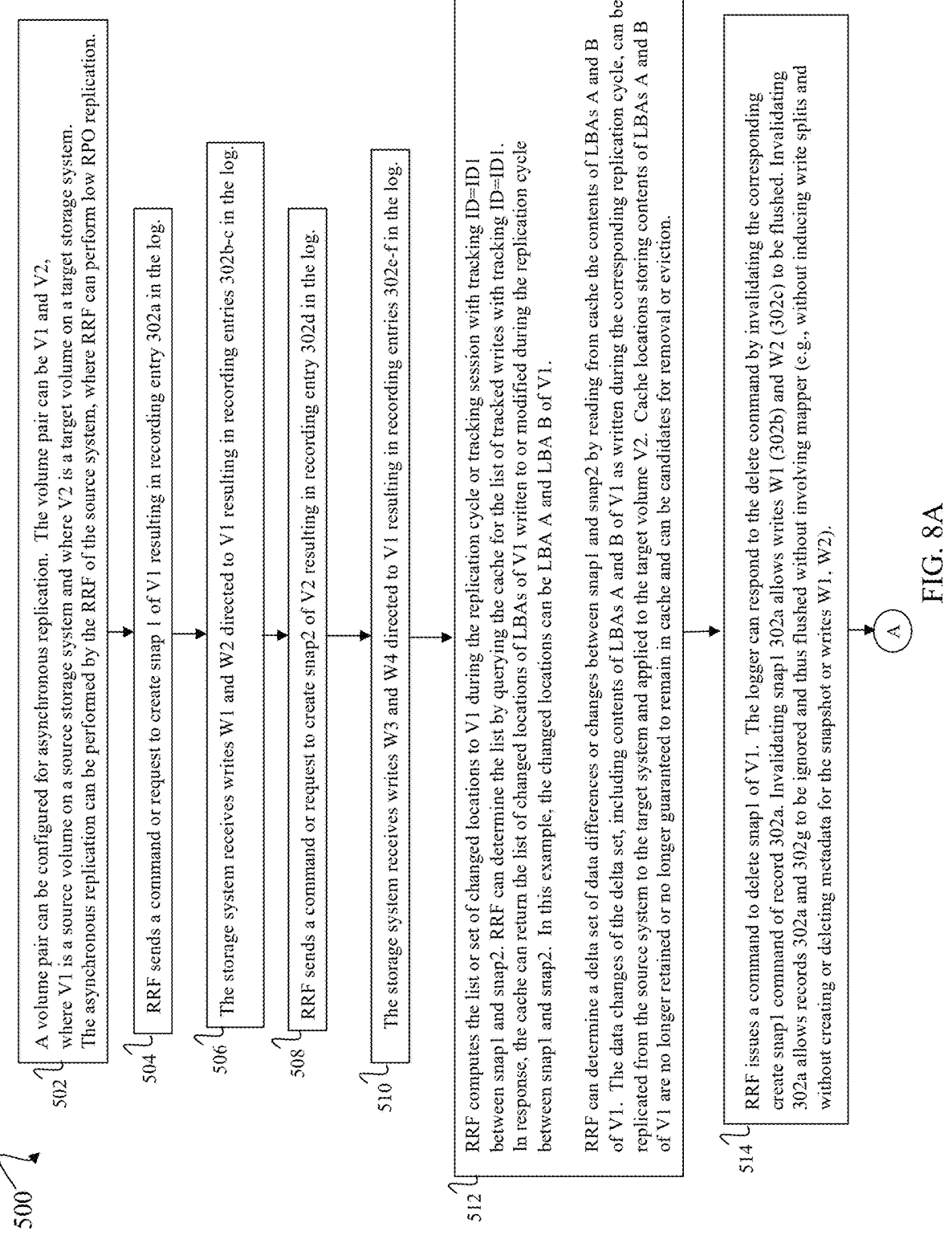

502 — A volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication.

504 — RRF sends a command or request to create snap 1 of V1 resulting in recording entry 302a in the log.

506 — The storage system receives writes W1 and W2 directed to V1 resulting in recording entries 302b-c in the log.

508 — RRF sends a command or request to create snap2 of V2 resulting in recording entry 302d in the log.

510 — The storage system receives writes W3 and W4 directed to V1 resulting in recording entries 302e-f in the log.

512 — RRF computes the list or set of changed locations to V1 during the replication cycle or tracking session with tracking ID=ID1 between snap1 and snap2. RRF can determine the list by querying the cache for the list of tracked writes with tracking ID=ID1. In response, the cache can return the list of changed locations of LBAs of V1 written to or modified during the replication cycle between snap1 and snap2. In this example, the changed locations can be LBA A and LBA B of V1.

RRF can determine a delta set of data differences or changes between snap1 and snap2 by reading from cache the contents of LBAs A and B of V1. The data changes of the delta set, including contents of LBAs A and B of V1 as written during the corresponding replication cycle, can be replicated from the source system to the target system and applied to the target volume V2. Cache locations storing contents of LBAs A and B of V1 are no longer retained or no longer guaranteed to remain in cache and can be candidates for removal or eviction.

514 — RRF issues a command to delete snap1 of V1. The logger can respond to the delete command by invalidating the corresponding create snap1 command of record 302a. Invalidating snap1 302a allows writes W1 (302b) and W2 (302c) to be flushed. Invalidating 302a allows records 302a and 302g to be ignored and thus flushed without involving mapper (e.g., without inducing write splits and without creating or deleting metadata for the snapshot or writes W1, W2).

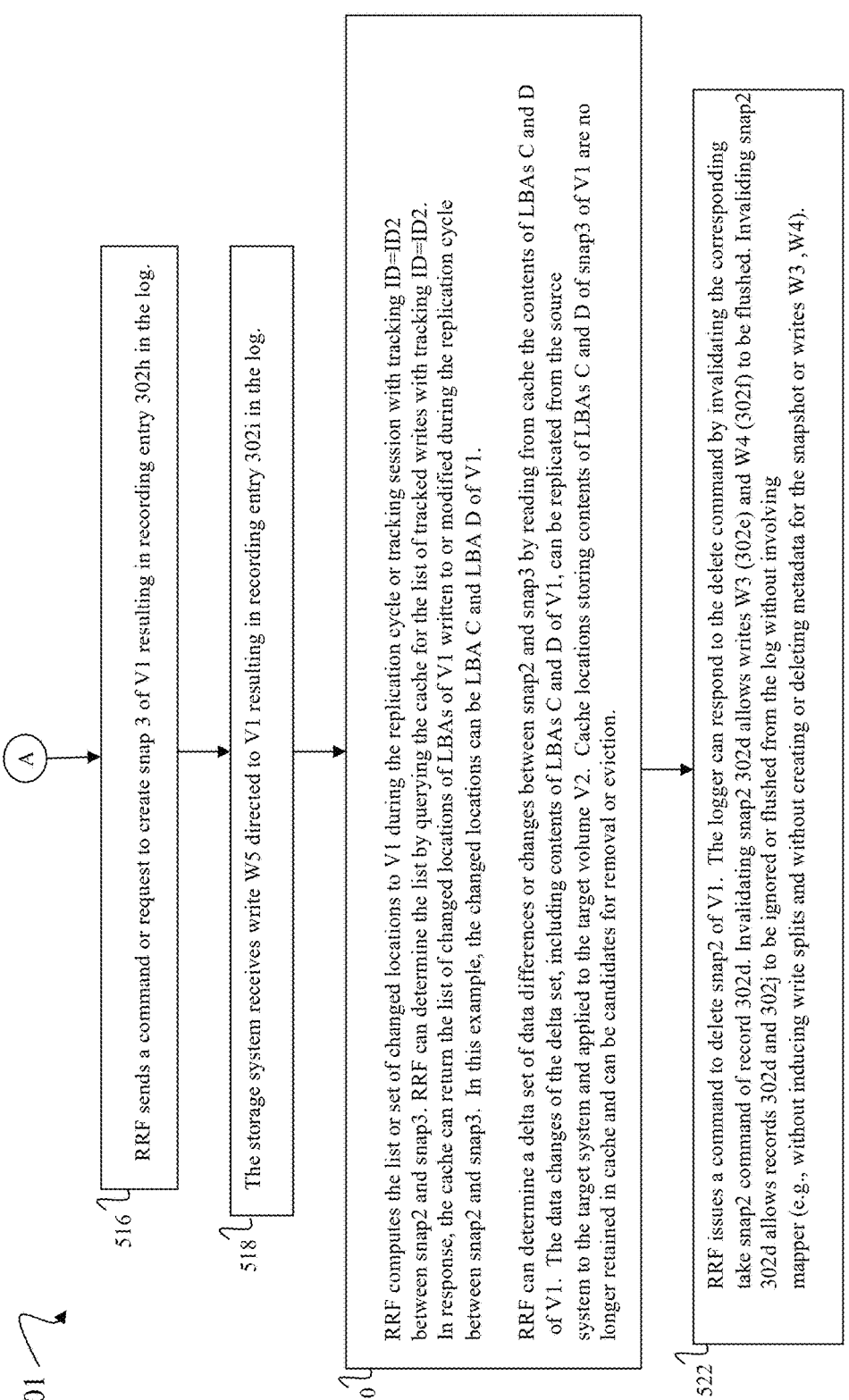

501

A

516  RRF sends a command or request to create snap 3 of V1 resulting in recording entry 302h in the log.

518  The storage system receives write W5 directed to V1 resulting in recording entry 302i in the log.

520  RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3. In this example, the changed locations can be LBA C and LBA D of V1.

RRF can determine a delta set of data differences or changes between snap2 and snap3 by reading from cache the contents of LBAs C and D of V1. The data changes of the delta set, including contents of LBAs C and D of V1, can be replicated from the source system to the target system and applied to the target volume V2. Cache locations storing contents of LBAs C and D of snap3 of V1 are no longer retained in cache and can be candidates for removal or eviction.

522  RRF issues a command to delete snap2 of V1. The logger can respond to the delete command by invalidating the corresponding take snap2 command of record 302d. Invalidating snap2 302d allows writes W3 (302e) and W4 (302f) to be flushed. Invalidating snap2 302d allows records 302d and 302j to be ignored or flushed from the log without involving mapper (e.g., without inducing write splits and without creating or deleting metadata for the snapshot or writes W3, W4).

FIG. 8B

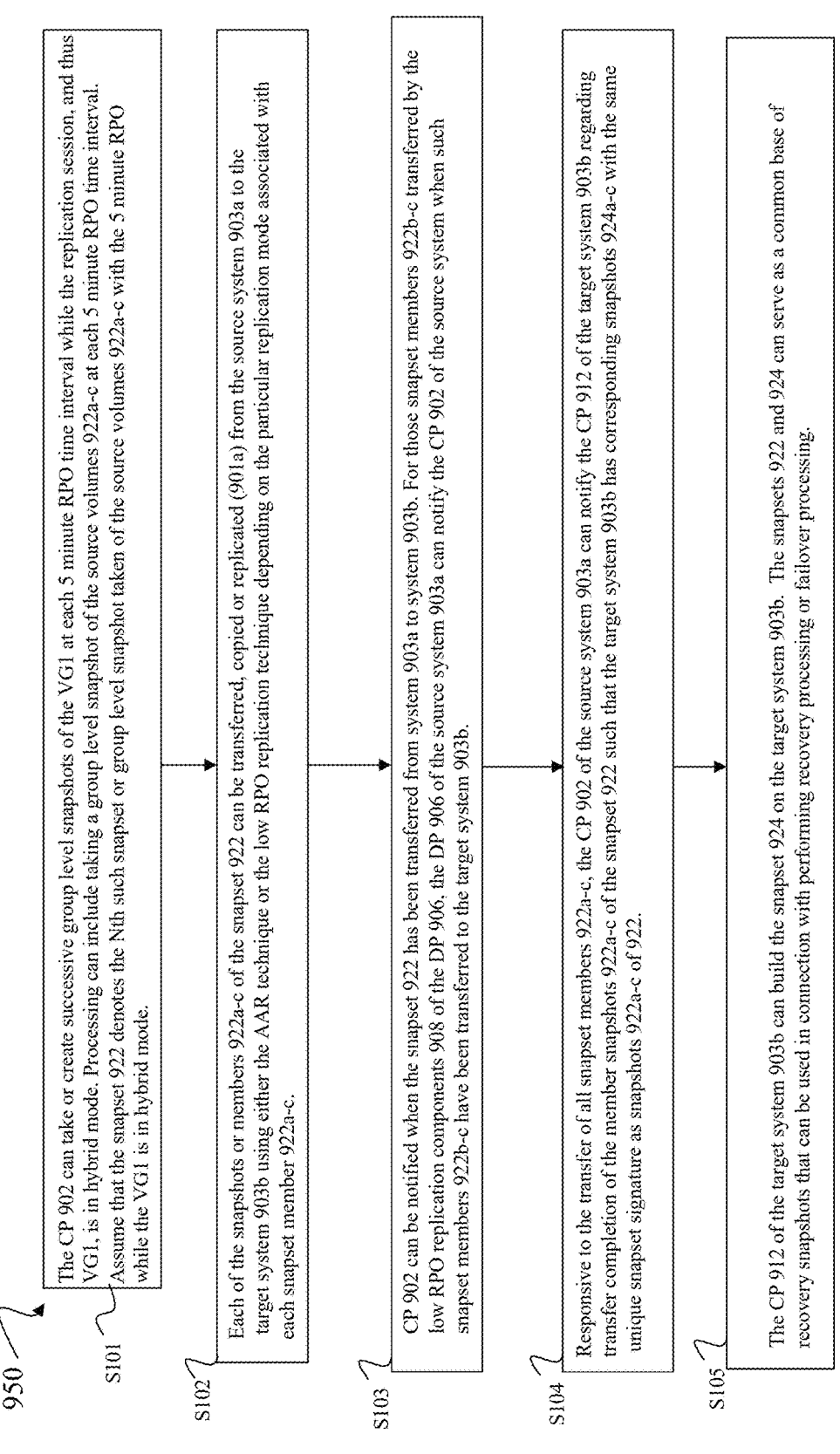

950

S101 The CP 902 can take or create successive group level snapshots of the VG1 at each 5 minute RPO time interval while the replication session, and thus VG1, is in hybrid mode. Processing can include taking a group level snapshot of the source volumes 922a-c at each 5 minute RPO time interval. Assume that the snapset 922 denotes the Nth such snapset or group level snapshot taken of the source volumes 922a-c with the 5 minute RPO while the VG1 is in hybrid mode.

S102 Each of the snapshots or members 922a-c of the snapset 922 can be transferred, copied or replicated (901a) from the source system 903a to the target system 903b using either the AAR technique or the low RPO replication technique depending on the particular replication mode associated with each snapset member 922a-c.

S103 CP 902 can be notified when the snapset 922 has been transferred from system 903a to system 903b. For those snapset members 922b-c transferred by the low RPO replication components 908 of the DP 906, the DP 906 of the source system 903a can notify the CP 902 of the source system when such snapset members 922b-c have been transferred to the target system 903b.

S104 Responsive to the transfer of all snapset members 922a-c, the CP 902 of the source system 903a can notify the CP 912 of the target system 903b regarding transfer completion of the member snapshots 922a-c of the snapset 922 such that the target system 903b has corresponding snapshots 924a-c with the same unique snapset signature as snapshots 922a-c of 922.

S105 The CP 912 of the target system 903b can build the snapset 924 on the target system 903b. The snapsets 922 and 924 can serve as a common base of recovery snapshots that can be used in connection with performing recovery processing or failover processing.

FIG. 11

TECHNIQUES FOR EFFICIENTLY TRANSITIONING OBJECT GROUPS TO LOW RPO REPLICATION MODE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: establishing an asynchronous replication configuration of a replication session associated with i) a source volume group VG1 of source volumes on a source system, ii) a target volume group VG2 of target volumes on a target system, and iii) volume pairs each including a source volume of VG1 and a unique corresponding target volume of VG2, where the source volume and the corresponding target volume of said each volume pair are configured for asynchronous replication such that writes to the source volume are asynchronously replicated to the corresponding target volume; and performing first processing to transition the replication session to have a group level asynchronous replication mode denoting a low RPO (recovery point objective) replication mode comprising: setting the group level asynchronous replication for the replication session to an alternative asynchronous replication (AAR)

mode where each source volume of VG1 has an associated member level asynchronous replication mode denoting the AAR mode; transitioning the group level asynchronous replication mode of the replication session from the AAR mode to a hybrid mode where i) at least one source volume of VG1 has a corresponding member level asynchronous replication mode of the AAR mode and ii) at least one source volume of VG1 has a corresponding member level asynchronous replication mode of the low RPO replication mode; creating a first snapset of snapshots of the source volumes of VG1, wherein the first snapset is a group level snapshot of the source volumes of VG1 taken at a same point in time; replicating each snapshot of the first snapset from the source system to the target system in either the low RPO replication mode or the AAR mode based on an associated member level asynchronous replication mode of a source volume of VG1 corresponding to said each snapshot; and constructing a second snapset of snapshots of target volumes of VG2 on the target system, wherein each snapshot of a target volume of VG2 in the second snapset denotes a same point in time copy as a corresponding snapshot of a source volume of VG1 in the first snapset.

In at least one embodiment, the first snapset and the second snapset can serve as a common base of recovery snapshots. A first volume pair SV1 of the replication session can be configured from a first source volume SRC of VG1 and a first target volume TGT1 of VG2, where SRC1 can have a first member level asynchronous replication mode denoting the low RPO replication mode and the first snapset can includes a first snapshot SNAP1 of SRC1. Processing can include replicating SNAP1, from the source system to the target system, in the low RPO replication mode using a low RPO replication technique. SNAP1 can denotes an Nth snapshot, SNAP N, of SRC1, and wherein SNAP N-1 and SNAP N can denote successive snapshots of SRC1. Replicating SNAP1 using the low RPO replication technique can include: determining a first delta set of changed content between successive snapshots SNAP N and SNAP N-1 of SRC1; copying the first delta set of changed content from the source system to the target system; applying the first delta set of changed content to TGT1; and taking a snapshot SNAP2 of TGT1 after applying the first delta set. SNAP2 can be included in the second snapset, and wherein SNAP2 and SNAP1 can denote identical point in time copies. A first replication cycle or tracking session having a first tracking identifier ID1 can be associated with SNAP N-1 and SNAP N of SRC1, the first member level asynchronous replication mode of SRC1 is the low RPO replication mode during the first replication cycle or tracking session. Processing can include: tracking, in a write tracking cache, first locations of SRC1 that are associated with ID1 and written to during the first replication cycle or tracking session; querying the write tracking cache for a list of tracked writes with a tracking identifier of ID1, wherein the list includes the first locations of SRC1 modified during the first replication cycle or tracking session; reading, from a cache, first content written to the first locations of SRC1 during the first replication cycle or tracking session; and copying the first content from the source system to the target system, wherein the first content is the first delta set of changed content applied to TGT1. A log can include first records corresponding to: taking SNAP N-1 of SRC1, taking SNAP N of SRC1, and writing the first content to the first locations of SRC1. The first records can be retained in the log until the first content, written to the first locations of SRC1 during the first replication cycle or tracking session, has been copied from the source system to the target system; and wherein the first content can be retained in the cache until the first content, written to the first locations of SRC1 during the first replication cycle or tracking session, has been copied from the source system to the target system. Responsive to copying the first content from the source system to the target system, third processing can be performed including: invalidating corresponding records of the log denoting said taking SNAP N-1 of SRC1 and said taking SNAP N of SRC1; flushing one or more corresponding records of the log denoting the first locations of SRC1 written to during the first replication or tracking session between SNAP N-1 and SNAP N; and marking corresponding cache locations of the cache storing the first content indicating that the first content is allowed to be evicted from the corresponding cache locations.

In at least one embodiment, a first volume pair SV1 of the replication session can be configured from a first source volume SRC1 of VG1 and a first target volume TGT1 of VG2, where SRC1 has a first member level asynchronous replication mode denoting the AAR mode and the first snapset includes a first snapshot SNAP1 of SRC1. Processing can include replicating SNAP1 from the source system to the target system in the AAR mode using an AAR technique. SNAP1 can denote an Nth snapshot, SNAP N, of SRC1, and wherein SNAP N-1 and SNAP N can denote successive snapshots of SRC1 of a first replication cycle. Replicating SNAP1 using the AAR technique can include: determining a first delta set of changed content between successive snapshots SNAP N and SNAP N-1 of SRC1; copying the first delta set of changed content from the source system to the target system; applying the first delta set of changed content to TGT1; and taking a snapshot SNAP2 of TGT1 after applying the first delta set. SNAP2 can be included in the second snapset, and wherein SNAP2 and SNAP1 can denote identical point in time copies. The first delta set can include first content denoting content written to first locations of SRC1 during the first replication cycle between SNAP N-1 and SNAP N, wherein a log can include first records corresponding to: taking SNAP N-1 of SRC1, taking SNAP N of SRC, and writing the first content to the first locations of SRC1. The first content may not be retained in the cache until the first content, written to the first locations of SRC1 during the first replication cycle or tracking session, has been copied from the source system to the target system. Processing can include flushing the first records from the log before the first content, written to the first locations of SRC1 during the first replication cycle or tracking session, has been copied from the source system to the target system.

In at least one embodiment, the first snapset can be identified using a unique signature. Constructing the second snapset of snapshots of target volumes of VG2 on the target system can include identifying a first set of snapshots on the target system where each snapshot of the first set has the unique signature, wherein the second snapset is the first set of snapshots having the unique signature. The first processing can include, for each of the volume pairs of the replication session configured from a corresponding source volume and a corresponding target volume, performing second processing that individually transitions the member level asynchronous replication mode of said corresponding source volume of said each volume pair from the AAR mode to the low RPO replication mode. The second processing can include: taking a snapshot of the corresponding source volume; replicating, in the AAR mode, the snapshot of the corresponding source volume from the source system to the target system; determining an amount of changed content in the snapshot of the corresponding source volume; and if the amount is less than or equal to a specified threshold, transitioning the member level asynchronous mode of the corresponding source volume of said each volume pair from the AAR mode to the low RPO replication mode. Replicating, in the AAR mode, the snapshot of the corresponding source volume from the source system to the target system can include: taking two successive snapshots of the corresponding source volume; determining that first content is written to first locations of the corresponding source volume between points in time corresponding to the two successive snapshots; copying the first content written to the target system; and applying the first content to the first locations of the corresponding target volume.

In at least one embodiment, while the group level asynchronous replication mode of the replication session is the hybrid mode, the first processing can include: taking group level snapshots of VG1 at defined fixed time intervals based on a defined RPO, where each of the group level snapshots of VG1 includes a first corresponding snapset of snapshots of the source volumes of VG1; replicating the group level snapshots of VG1 from the source system to the target system; and applying the group level snapshots of VG1 to VG2 to generate corresponding group level snapshots of V2, where each of the corresponding group level snapshots of VG2 includes a second corresponding snapset of snapshots of the target volumes of VG2.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 5B, 9 and 10 are examples of components that can be included in a system in at least one embodiment of the techniques of the present disclosure.

FIGS. 8A, 8B and 11 are flowcharts of processing steps that can be performed in at least one embodiment in accordance with the techniques of the present disclosure.

DETAILED DESCRIPTION OF EMBODIMENT(S)

Figure 1:
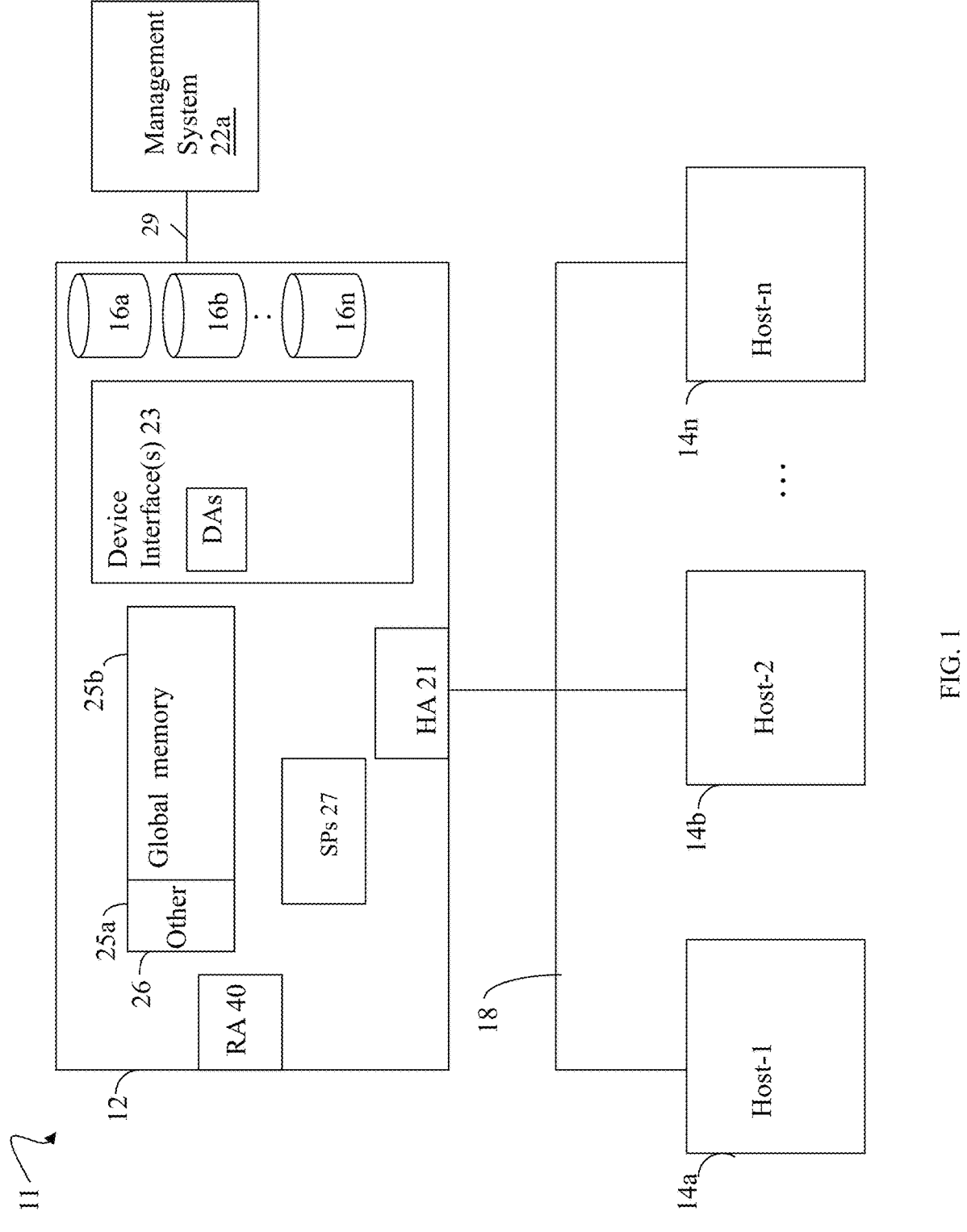
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system can present data storage resources or objects, such as a volume or logical device, to a client, such as a host. A replication session can be defined for a volume pair including a source volume V1 of the source storage system and a target volume V2 of the target storage system, where the replication session can be further characterized as one-way replication where, as noted above, writes to the source volume V1 are automatically replicated in a continuous ongoing manner to the target volume V2. In at least one embodiment, V1 can be exposed to an external host over paths from the source storage system and V2 may not be exposed to the host such that the host can issue I/Os to V1 over paths to the source storage system but cannot issue I/Os directly to V2 on the target storage system.

Once mode or methodology of one-way remote replication can be referred to as asynchronous remote replication (sometimes referred to as asynchronous replication) where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typically, for example, from hours to a number of minutes.

In at least one embodiment, asynchronous replication can capture data changes or differences to be copied from the source storage object or volume, such as V1, to the target storage object or volume, such as V2, in repeated cycles using a snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can sometimes be referred to as transient snapshots or replication related snapshots in that they are used only internally in the source system for asynchronous replication purposes. The source system can determine a difference in content between the current snapshot N of the source storage object and the immediately prior snapshot N-1 of the source storage object, where the data changes replicated to the target system correspond to the difference in content between the snapshots N and N-1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. In at least one version of the snapshot difference technique (sometimes referred to as the legacy version), resource intensive processing can be performed that includes creating the two successive snapshots N-1 and N, and then subsequently deleting the two snapshots in a very short time period solely for the purposes of replication. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

It can be desirable to support specifying an even smaller time granularity for an RPO such as less than a minute or a number of seconds. It can further be desirable to provide for efficient asynchronous replication resulting in a low RPO that is a number of seconds or generally less than a minute.

Accordingly, a more efficient asynchronous replication technique or mode sometimes referred to as a low RPO replication technique or a near-zero (NZ) replication technique can be used in at least one embodiment in accordance with the techniques of the present disclosure. Additionally in at least one embodiment, the low RPO or NZ replication technique or mode can perform various optimizations that provide for efficient asynchronous replication of a configured volume pair including a corresponding source storage object or volume of a source system and a corresponding target storage object or volume of a target system.

In at least one embodiment in accordance with the techniques of the present disclosure, the low RPO or NZ replication technique can be supported and performed along with a second asynchronous replication technique. In at least one embodiment, the low RPO replication technique can perform multiple optimizations as discussed herein, and the second alternative asynchronous replication technique can be a legacy snapshot difference or snap diff technique that generally does not perform the optimizations as performed by the low RPO replication technique. For example in at least one embodiment, the low RPO replication technique can perform an optimization that uses cache for tracking writes made to a configured volume between consecutive replication-related snapshots taken of the volume for determining the data difference to be copied or migrated from the source to the target. In contrast in at least one embodiment, the second asynchronous replication technique may not perform the foregoing optimization and can rather perform a snapshot difference operation of two successive replication-related snapshots to determine the data differences copied from the source to the target in a replication cycle.

In at least one embodiment, the low RPO replication technique or mode described herein provides for asynchronous replication that results in a near zero RPO or more generally a low RPO. For a configured replication session of a volume pair that perform asynchronous replication using the low RPO replication technique, multiple optimizations can be performed in connection with asynchronous replication that provide for achieving the very low RPO with the low RPO replication technique. One of the optimizations provides for tracking writes and keeping a record in cache of such writes made to a volume between successive snapshots. In at least one embodiment, the low RPO replication technique can also perform additional optimizations all of which can be dependent on the write tracking being performed where such the particular addresses or locations of the writes made to the volume between successive replication-related snapshots are tracked in cache.

In at least one embodiment, an asynchronous replication session operating using the low RPO replication technique can provide for efficient asynchronous replication for a volume pair that results in a very small RPO that is on the scale of a number of seconds or generally less than a minute. For example in at least one embodiment, the RPO can be less than 30 seconds and, as noted above, can sometimes be referred to herein as "near zero" or low RPO replication using a "near zero" RPO due to the very small RPO. With near zero (NZ) or low RPO replication in at least one embodiment, snapshots can be taken in a continuous ongoing manner such that when the data changes of a current replication cycle have been replicated or copied from the source to the target system, the source system can take a next snapshot of the source storage object and then replicate the data changes of the next replication cycle to the target system. The foregoing can be performed in an ongoing manner in at least one embodiment. In at least one embodiment, rather than taking replication related snapshots at a frequency based on a defined RPO value or setting, the near zero or low RPO replication can perform asynchronous replication by continually taking snapshots of the source storage object in an ongoing manner and then replicating data changes of the latest replication cycle. A replication cycle can occur between two successive replication related snapshots of a source volume where the writes made to the source volume between the time period when the two successive snapshots are taken are included in the replication cycle. Thus with near zero or low RPO replication for a configured volume pair (V1, V2) where V1 is the source volume configured for asynchronous remote replication to the target volume V2, in at least one embodiment, once the current replication cycle of data changes to V1 is copied or replicated from the source system to the target system, the source system can immediately commence the next replication cycle without regard to taking snapshots at a defined frequency.

In at least one embodiment, a replication related snapshot can denote a snapshot taken for replication related purposes such as for asynchronous replication using the near zero or low RPO replication technique described herein. In at least one embodiment, replication related snapshots can be used internally by the source storage system to capture data changes that are copied or replicated in ongoing replication cycles to the target system for a configured volume pair (V1, V2) where V1 is the source volume configured for asynchronous remote replication to the target volume V2. In at least one embodiment, the low RPO replication technique can be used where records of such replication related snapshots are transient and are retained in a log without flushing, and thus without actually creating the corresponding snapshots and corresponding metadata.

In at least one embodiment, the low RPO or near zero replication as discussed in more detail below can provide a low RPO by utilizing limited or finite resources of the storage system, where such resources can include cache resources and the log resources. In at least one embodiment, writes and other operations can be recorded in a persisted log and also in a volatile memory cache. Once the write or other operation has been recorded in the persisted log, an acknowledgement regarding completion of the operation can be returned to the client that sent the operation.

In at least one embodiment of the present disclosure, a low RPO or near zero RPO replication technique can perform multiple optimizations including: write tracking where tracked write locations between successive replication related snapshots are stored in write tracking cache or memory; using transient snapshots or snaps that can be retained in the log without flushing until deleted from the log; and holding or maintaining data to be replicated in a cache of the source system until the data has been asynchronously replicated to the target system.

In at least one embodiment, the low RPO replication technique of the present disclosure can determine data changes or writes that are replicated in a replication cycle without performing the expensive snapshot difference technique such as noted above where the snapshots are actually flushed from the log and created such as by a mapper component discussed elsewhere herein. In at least one embodiment using the low RPO replication technique, a cache or caching layer can perform write tracking of tagged writes where the cache can identify all writes tagged with a particular tracking identifier (ID). The particular tracking ID can uniquely identify tracked writes of a particular replication cycle between two successive snapshots of a source volume. All writes tracked with the particular tracking ID can denote the data changes in the replication cycle for a particular source volume. Thus in at least one embodiment, the above-noted write tracking can be used with the low RPO replication technique to determine corresponding locations in the source volume of the data changes to be replicated to the target system, where such tracked write locations are stored in the write tracking cache or memory. Thus such tracked data changes of the source storage object on the source system can denote source volume locations or offsets of written or changed data that is replicated from the source to the remote target system in a single replication cycle and then applied to the corresponding target storage object.

In at least one embodiment, the low RPO replication techniques of the present disclosure can include retaining the changed or written data (to be replicated in connection with asynchronous replication for a source volume) in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, the low RPO replication techniques of the present disclosure can utilize a mechanism for write tracking of write I/Os in the data path where a cache or caching layer, such as a transactional caching layer, can track tagged write I/Os (e.g., tagged with a tracking ID). In at least one embodiment with the low RPO replication technique or mode, the cache or caching layer of the source storage system can track metadata or information about the tagged write I/Os directed to a corresponding source storage object or volume, where the information can include a volume, offset (e.g., logical block address or LBA), and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular replication cycle for the source storage object or volume. In at least one embodiment, the collected information regarding tracked writes can be stored in the write tracking cache or memory.

In at least one embodiment of the low RPO replication technique or mode, the data changes or differences between two successive replication related snapshots N-1 and N of the source object can be identified by the tracked writes having a particular tracking ID. In at least one embodiment, data changes corresponding to successive snapshots of the source object can be identified by tracked writes directed to the source object, where such tracked writes can be tagged with corresponding tracking IDs uniquely associated with corresponding replication cycles.

In at least one embodiment for a replication session configured for low RPO replication that is one way asynchronous replication for a volume pair V1, V2, where V1 is the source volume on the source system and V2 is the target volume on the target system, the caching layer on the source system can track tagged write I/Os directed to the source volume V1 on the source system in connection with replication related snapshots for near zero or low RPO replication. In at least one embodiment of the low RPO technique, the tracked writes can denote a list of changed offsets or locations of V1 modified between successively taken replication-related snapshots of V1. The tracked writes can be stored as a list in a portion of a volatile memory cache of the source system. Low RPO replication techniques can then use the list of tracked writes as stored in cache (e.g., the write tracking cache) to identify the content to be replicated from the source system to the target system without having to use a more resource intensive technique. Additionally in at least one embodiment, retaining the content or data of the tracked writes in cache until such content or data has been replicated allows the low RPO replication technique to efficiently retrieve the content or data to be replicated from cache, as opposed to the more costly and time consuming processing of reading the data or content to be replicated from backend (BE) non-volatile storage.

Thus in at least one embodiment, the low RPO technique can store the list of tracked writes in cache where the list identifies logical addresses of the content to be replicated. In at least one embodiment, the low RPO technique can traverse the list of tracked writes to identify logical addresses or locations of V1 to be replicated, where the content or data of such logical addresses or locations can also be retrieved efficiently from cache without incurring the expensive processing of a read cache miss.

In at least one embodiment in accordance with the techniques of the present disclosure, the low RPO techniques can further utilize transient snapshots that are successively and continuously taken replication related snapshots. In low RPO replication, replication related snapshots can be created and deleted in a relatively short amount of time. In at least one embodiment, a snapshot request corresponding to a request to create a replication related snapshot of the source volume V1 can be received at the source system. In at least one embodiment, a log on the source system can be used to record, in time order, write I/Os of V1 and other operations such as commands to create and delete snapshots including replication related snapshots of V1. In such an embodiment, a record denoting the replication related snapshot creation or request can be recorded in the log having a relative position or location with respect to recorded writes that are included in the particular snapshot. Thus the log can include records in a time ordered sequence denoting the order in which recorded operations are received and applied.

In at least one embodiment, the low RPO replication technique can provide for retaining in the log replication related snapshot commands that create transient snapshots without flushing them from the log until deleted from the log. In at least one embodiment, transient snapshots can be created and deleted by a replication service that performs the low RPO replication technique. In this manner, the replication service can create a transient snapshot and then delete the transient snapshot when the service is done using the transient snapshot for its replication purposes. In at least one embodiment, the record of the log denoting the request to create or take the replication related snapshot can be marked as transient indicating that the particular snapshot created is a replication related or transient snapshot. In at least one embodiment of the low RPO replication technique, a transient flag or indicator of a log record for a create snapshot command can indicate that the log records corresponding to the snapshot and the snapshot's (dirty) write data be retained in the log and not flushed from the log until the snapshot has been deleted, as denoted by an entry recorded in the log for the delete snapshot operation. In at least one embodiment, once the low RPO technique has replicated content or write data of write I/Os received between successive transient snapshots N-1 and N from the source system to the target system, the log record of the transient snapshot N-1 can be deleted and the log records of write I/Os between transient snapshots N-1 and N can be flushed from the log. In at least one embodiment of the low RPO replication technique, the foregoing of retaining records for the transient snapshot in the log until deleted can be performed, for example, rather than incur additional performance penalties associated with flushing records of the transient snapshot creation and subsequent write I/Os from the log, and then performing processing to delete the transient snapshot after it has been flushed from the log and created.

In at least one embodiment, flushing records of the transient snapshot from the log can be an expensive operation and can include creating and storing corresponding metadata for the transient snapshot. Furthermore, subsequent flushed writes to the source volume occurring after taking the transient snapshot of the source volume can also result in write splits causing additional metadata updates. In at least one embodiment, deleting the flushed transient snapshot can be an expensive operation in that the corresponding metadata for the snapshot is deleted and/or updated. Furthermore, processing can also be performed to undo any previously performed operations in connection with the write splits. In at least one embodiment, a write split can be performed with respect to a metadata page and includes allocating a new metadata page where the content of an existing metadata page is copied to the new metadata page. In connection with taking a snapshot of a source volume, the source volume and the snapshot include the same content initially and can thus share one or more same metadata pages. Subsequently, writes can be applied to the source volume resulting in differences in stored content of the source volume and snapshot. As a result of the writes, a write split can be performed where, prior to the writes, the snapshot and the source volume may share the same metadata page. Subsequent to applying the writes such as to the source volume, a first metadata page that is shared by both the snapshot and the source volume may be modified to reflect the writes applied to the source volume. However, prior to modifying the existing first metadata page for use with the source volume writes, a write split operation can be performed to preserve or duplicate the existing first metadata page content in a new page for use with the snapshot. Thus in at least one embodiment in connection with the low RPO replication technique, retaining a transient snapshot in the log (e.g., retaining in the log a record to create a transient snapshot) until deleted can avoid expensive processing, such as write splits noted above, that can be associated with a flushed transient snapshot.

In at least one embodiment, dirty write data can generally be retained in cache until the BE non-volatile storage has been updated to persistently store the write data, whereby the write data can now be characterized as clean and can be a candidate for eviction from the cache. As may be needed in at least one embodiment, records of the transient snapshot can be flushed from the log such as, for example, if there is an insufficient amount of log space and/or cache. However in at least one embodiment using the low RPO replication technique, even though write data of the transient snapshot may be flushed from the log, write data can be retained in, and not evicted from, the cache even after being flushed from the log and characterized as clean.

In at least one embodiment, log records, such as records of transient snapshots and writes recorded in the persistent log, can also be stored in a volatile memory cache. While recorded writes of the log remain in the log, the write data can remain in the cache as dirty data that has not yet been flushed. Such dirty write data can be retained in the cache and may not be a candidate for removal or eviction. In at least one embodiment as part of normal processing in the data path, once the corresponding log records of the write data have been flushed from the log, the write data of the cache can be marked as clean, where clean data of the cache can be a candidate for removal or eviction. In at least one embodiment of low RPO replication, even if write data is flushed from the log, the write data can be retained in the cache of the source system until replicated to the target system.

In at least one embodiment, low RPO replication with respect to a volume pair (V1, V2) can denote one way asynchronous replication from a source volume V1 of a source system to a corresponding target volume V2 of a target system. In at least one embodiment, low RPO replication for the volume pair can replicate source volume data changes to the target system continuously such that as soon as one replication cycle ends, the next replication cycle begins. With low RPO replication in at least one embodiment, the cache can track tagged writes that are tagged with a tracking ID, and can store the list of tagged writes in cache. In at least one embodiment, tracking writes can include recording in cache information about the tagged writes such as volume, offset and length corresponding to the writes. In at least one embodiment, the tracking ID can be uniquely associated with a particular replication cycle of a particular source volume configured for near zero or low RPO replication. In this manner, querying the cache for tracked writes tagged with a particular tracking ID can denote the list of writes or data changes included in a particular corresponding replication cycle for a particular source volume. In at least one embodiment, low RPO replication can further include: retaining transient snapshots in the log; and retaining content to be replicated in the cache of the source system until such content has been replicated.

In at least one embodiment of low RPO replication, the following optimizations can be performed in connection with asynchronous replication for a configured volume pair (V1, V2): write tracking can be performed where the list of changes or writes to V1 to be replicated for a particular snapshot can be stored in cache; transient snapshots can be held in the log without flushing until deleted; and content to be replicated can remain in the cache until replicated. Thus for the low RPO replication in at least one embodiment, all content or data to be replicated can be dirty and can remain in cache on the source system until replicated to the target system.

In at least one embodiment, a low RPO replication session for a volume pair (V1, V2) can initially start its lifecycle in an alternative asynchronous mode that performs an alternative asynchronous replication technique that does not perform the optimizations of the low RPO replication mode. In at least one embodiment, the alternative asynchronous replication mode or technique can be the legacy snapshot difference technique. In at least one embodiment, processing can be performed to transition the replication session and corresponding volume pair from the alternative asynchronous replication mode to the low RPO replication mode. In at least one embodiment with respect to a replication session for a volume pair (source volume V1, target volume V2), such processing to transition the replication session and volume pair to the low RPO replication mode can include: i) performing an initial synchronization between the source and target volumes of the volume pair, where the initial synchronization can be performed using a data storage system internal snapshot taken at the start or create time of the replication session; ii) performing snapshot based delta synchronizations until the volume data differences with respect to the source volume are below a specified threshold level (e.g., such that the source volume and respective target volume have minimal data differences below the threshold level); and iii) once the foregoing data differences are below the specified threshold, then the replication session can transition or switch from the alternative asynchronous replication mode to the low RPO replication mode where, for example, further copy operations (copying written or changed content from the source to the target) can be performed using the cache based change tracking optimization as well as other optimizations of the low RPO replication mode. In at least one embodiment, when an asynchronous replication session for a volume pair is in the alternative asynchronous replication mode where asynchronous replication is performed using the alternative asynchronous replication technique such as the legacy snapshot difference technique, a recovery snapshot used in case of a failover operation can be based on a common base snapshot that is updated as part of the RPO synchronization. In at least one embodiment when an asynchronous replication session for a volume pair is in the low RPO replication mode where replication is performed using the low RPO replication technique, replication copy cycles can complete quickly within a few seconds and the recovery snapshot used can have corresponding content that typically has an RPO that is a few seconds of a corresponding source volume.

In at least one embodiment, an object group or more generally a group can be defined that is a logical entity including one or more objects, such as one or more volumes. Typically in at least one embodiment, a group can include two or more objects such as two or more volumes. In at least one embodiment, a volume group or VG can denote a defined group of one or more volumes. In at least one embodiment, a replication session can be associated with i) a source volume group VG1 of source volumes and ii) a target volume group VG2 of target volumes, where each source volume V1 of VG1 is uniquely mapped to a corresponding target volume V2 of VG2, and where writes or data changes to each source volume V1 of VG1 can be asynchronously replicated to the corresponding target volume V2 of VG2, and where (V1, V2) can denote one of the volume pairs configured for asynchronous replication in connection with the replication session. In at least one embodiment, each of the corresponding volume pairs of the replication session of VG1 and VG2 can be configured for one-way asynchronous replication. In at least one embodiment, the replication session of VG1 and VG2, or more generally any suitable groups of objects, can be enabled for the low RPO replication mode. Consistent with the discussion above and elsewhere herein in at least one embodiment, an asynchronous replication session can be enabled to operate using the low RPO replication technique for VG1 and VG2. In this scenario in at least one embodiment, all volume pairs, each including a source volume V1 of VG1 and corresponding target volume V2 of VG2, can initially perform asynchronous replication using an alternative asynchronous replication technique such as the legacy snapshot difference technique. The volume pairs of the replication session can then transition from the alternative asynchronous replication technique to the low RPO replication technique.

In at least one embodiment, all volume pairs of the replication session of the source volume group VG1 and the target volume group VG2 may not transition to the low RPO replication mode at the same time for one or more reasons. For example in at least one embodiment, each volume member of the source volume group VG1 can take a different amount of time to complete the initial synchronization between the source volume and corresponding target volume and/or to complete the delta synchronizations. In at least one embodiment, the source VG1 can include volumes of different sizes having different storage capacities and varied amounts of content. For example, the source VG1 can include multiple members for a database where a first VG1 member stores the database data or content, and a second VG1 member is the database log, where the first VG1 member can have a much larger storage capacity and content than the second VG1 member. Because of the foregoing, each VG1 member can be ready to switch or transition to the low RPO replication mode at a different time compared to other VG1 members. As another example in at least one embodiment, all VG1 members may not have an active copying session performing copying simultaneously to facilitate transitioning to the low RPO replication mode due to system limits such as MAX1, the maximum number of allowed active copier processes or threads such as per node. To further illustrate in at least one embodiment MAX1 can be less than MAX2, the maximum allowed number of VG1 members. For example in at least one embodiment, MAX1 can be 32 and MAX2 can be 128 such that if VG1 has more than 32 members, there will not be an active copier for each VG1 member. Furthermore in at least one embodiment, the active copiers can perform copying in connection with multiple various data migration features such that the limit of MAX1 active copiers can be with respect to not only copying performed in connection with the replication session and VG1 transitioning to the low RPO replication mode. For example in at least one embodiment, each node can have up to MAX1 copiers performing copying in connection with various features or facilities including synchronous replication, replication sessions transitioning to the low RPO replication mode, as well as others. In this latter example, the number of active copiers performing copying for VG1 members transitioning to the low RPO replication mode can be further limited.

Accordingly, the techniques of the present disclosure further provide for transitioning individual VG1 members, and thus each individual volume pair configured for asynchronous replication, to the low RPO replication mode when each such VG1 member or volume pair meets specified one or more criteria to transition from the alternative asynchronous replication mode to the low RPO replication mode. In at least one embodiment, processing can be performed to evaluate or assess the one or more criteria with respect to each VG1 member/volume pair independently of other VG1 members/volume pairs, thereby allowing each VG1 member/volume pair to transition independently of other remaining VG1 members/volume pairs of the replication session. In at least one embodiment, a replication session and thus source VG1 can be characterized as being in the hybrid mode if the replication session includes at least one volume pair in the low RPO replication mode and at least one volume pair in the alternative asynchronous replication mode. In at least one embodiment, an individual volume pair or VG1 member of a hybrid replication can transition from the alternative asynchronous replication mode to the low RPO replication mode based on one or more defined criteria. In at least one embodiment, such one or more criteria can include at least a first condition that indicates a VG1 member, and thus corresponding source volume and corresponding volume pair of the hybrid replication session, can transition from the alternative asynchronous replication mode to the low RPO replication mode when the size of a delta set denoting an amount or size of source volume changes determined during between successive snapshots of one of the snapshot based delta synchronizations is less than a specified threshold amount of changed content.

In at least one embodiment for a replication session during the period of transition from the alternative asynchronous replication technique to the low RPO asynchronous replication technique, the replication session can be in the hybrid or mixed mode. In at least one embodiment, when the replication session is in the hybrid or mixed mode or state, the source volumes and volume pairs of the replication session can be characterized as hybrid indicating that, at a same point in time, one or more source volumes/volume pairs can be in the low RPO asynchronous replication mode and one or more source volumes/volume pairs can be in the alternative asynchronous replication mode. Thus generally in at least one embodiment, a hybrid replication session can include volume pairs (e.g., each of which includes a source volume and corresponding target volume) each of which can be in one of various multiple asynchronous replication modes including the low RPO replication mode and an alternative asynchronous replication mode such as the legacy snapshot difference mode or technique. In at least one embodiment, i) each source volume and corresponding volume pair can have an individual or member associated replication mode or state; ii) a volume group, such as the source volume group VG1, can have a group level replication mode or state; and iii) a replication session can have an associated mode or state. In at least one embodiment for a replication session configured for asynchronous replication, each VG1 member and volume pair can have a member replication mode or state denoting either the low RPO replication mode or the alternative asynchronous replication mode; the VG1 and can have a group level replication mode or state that is one of: the low RPO replication mode, the alternative asynchronous replication mode, or the hybrid mode; and the replication session can have a replication mode or state that is one of: the low RPO replication mode, the alternative asynchronous replication mode, or the hybrid mode. In at least one such embodiment, the replication session mode can correspond to the group level replication mode, such as of the source volume group VG1.

In at least one embodiment, other system states or conditions can also trigger or result in a VG or replication session being in the hybrid mode or state where subsequently, the techniques of the present disclosure can be used to transition all members/volume pairs of the hybrid replication session to the low RPO replication mode. For example in at least one embodiment in accordance with the techniques of the present disclosure, one or more members of the source VG1 (e.g., one or more volumes pairs of the replication session) can be demoted from the low RPO replication mode to the alternative asynchronous replication mode as an alternative to demoting all replication session volume pairs or source VG1 members simultaneously. In at least one embodiment, when a VG member or volume pair is demoted from the low RPO replication technique or mode in at least one embodiment, no optimizations of the low RPO replication technique are performed such that low RPO replication can be characterized as turned off and replaced with an alternative asynchronous replication technique. For a source volume or volume pair in the off service level with respect to the low RPO replication mode in at least one embodiment, an alternative asynchronous replication technique can be performed rather than the low RPO replication technique. For example in at least one embodiment when in the off service level with respect to the low RPO technique, the alternative asynchronous replication technique performed can be the more time consuming legacy snapshot difference mode or technique that includes flushing transient or replication related snapshots from the log, and then creating and/or updating corresponding metadata for the snapshots. In at least one embodiment, one or more individual VG members or volume pairs of a replication session can be demoted and transition from the low RPO replication mode to the alternative asynchronous replication technique responsive to an occurrence of one or more defined conditions including: consumption of one or more resources used by the low RPO replication technique each being above a corresponding maximum threshold; an available or free amount of one or more resources used by the low RPO replication technique each falling below a corresponding minimum threshold; and/or temporary network issue such as with the replication link or connection used to copy data between the source and target systems.

In at least one embodiment, write tracking memory or cache can be characterized as a required or critical resource when performing the low RPO replication technique. In at least one such embodiment, one or more individual VG1 members or volume pairs can be demoted and transition from the low RPO replication mode to the alternative asynchronous replication technique responsive to: i) a collective amount of the write tracking memory or cache currently consumed in connection with performing asynchronous replication using the low RPO replication technique across all replication sessions in the system exceeding a specified maximum threshold; and/or ii) responsive to a free amount of the write tracking memory or cache available in connection with performing asynchronous replication using the low RPO replication technique across all replication sessions of the system falling below a specified minimum threshold. In at least one embodiment for a replication session in the low RPO replication mode where all volume pairs/VG1 members are in the low RPO replication, one or more VG1 members, and thus one or more volume pairs, can transition from the low RPO replication mode to the alternative asynchronous replication mode (e.g., such as due to a demotion responsive to low available resources such as a low amount of free write tracking cache) thereby also resulting in the VG1 group level replication mode or state and corresponding replication session transitioning to the hybrid mode.

In at least one embodiment, the techniques of the present disclosure can provide for maintaining recovery snapshots while the VG1 and replication session is in hybrid mode transitioning to the low RPO replication mode. In at least one embodiment, taking a snapshot of VG1 of the source volumes can include taking a snapshot of all VG1 members at a same point in time. In at least one embodiment for a hybrid VG1: i) for VG1 members operating in the low RPO replication mode processing can copy corresponding recovery snapshots from the source to the target system using the low RPO replication mode or techniques; and ii) for VG1 members operating in the alternative asynchronous replication mode processing can copy corresponding recovery snapshots from the source to the target system using the asynchronous replication mode or technique.

The foregoing and other aspects of the techniques of the present disclosure are described in more detail in the following paragraphs.

Referring to the FIG. 1, shown is an example of an embodiment of a system 11 that can be used in connection with performing the techniques described herein. The system 11 includes a data storage system 12 connected to the host systems (also sometimes referred to as hosts) 14a-14n through the communication medium 18. In this embodiment of the system 11, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 11.

Each of the host systems 14a-14n and the data storage system 12 included in the system 11 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 11 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1.

Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
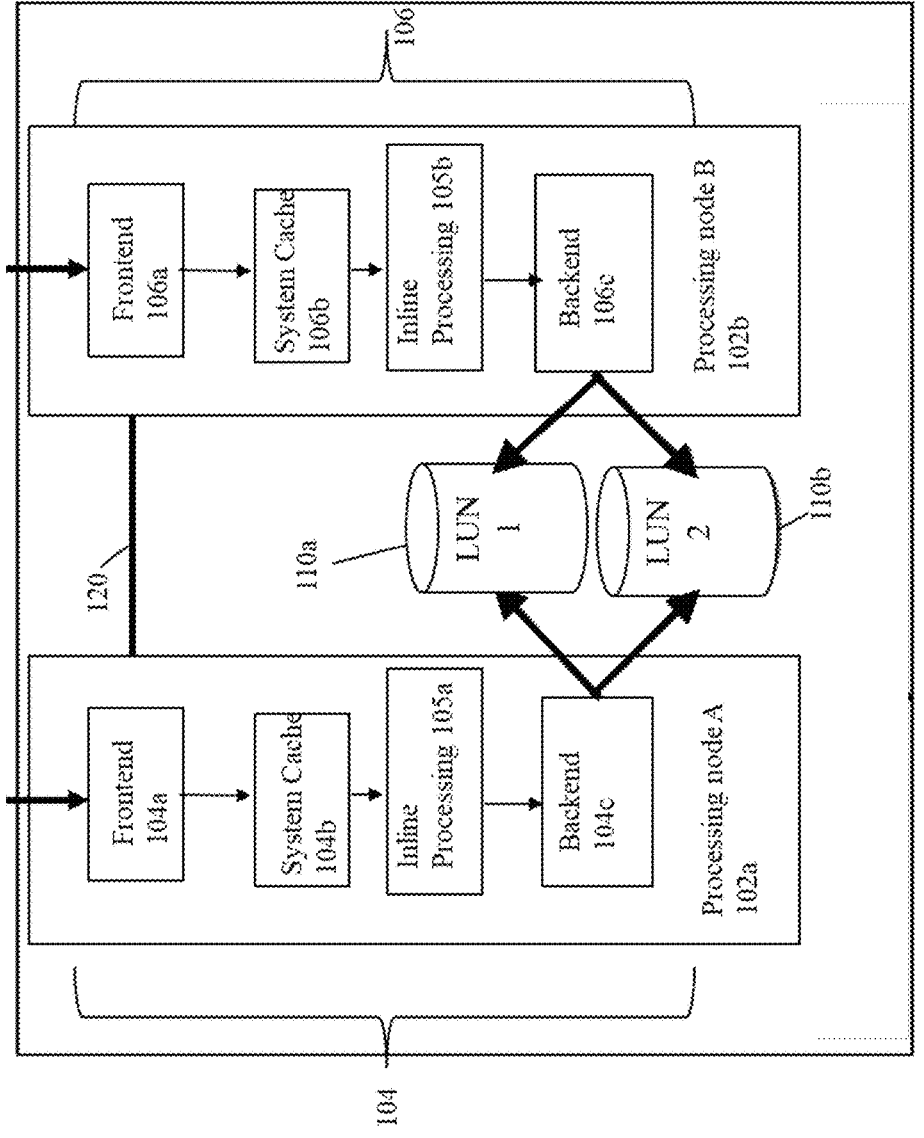
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment as discussed in more detail elsewhere where herein, the log can also be used to log or record other operations such as operations to create and delete snapshots of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
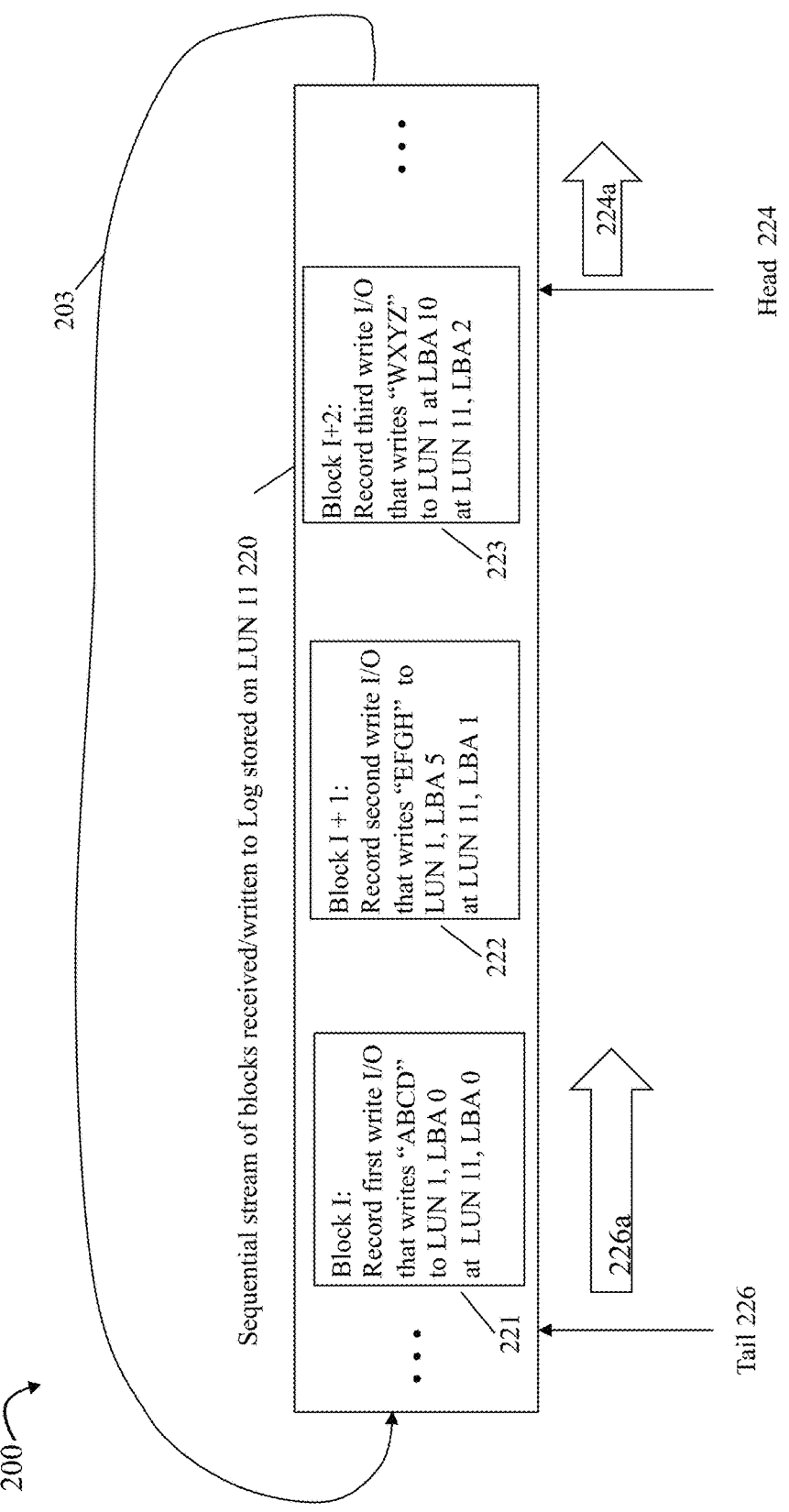
FIGS. 2B, 2C, 2D and 6 are examples illustrating use of a log in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
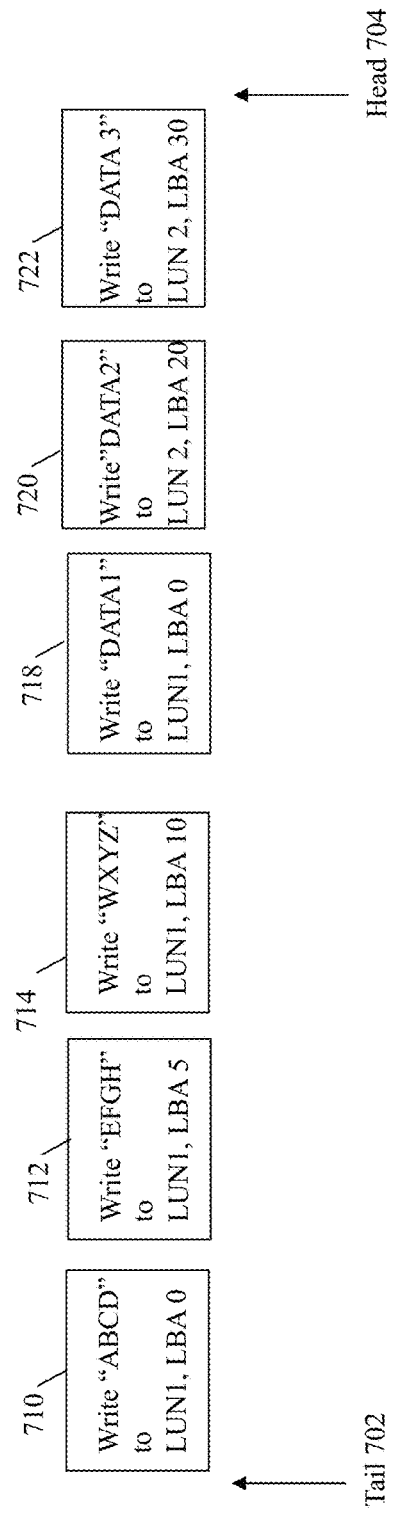

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
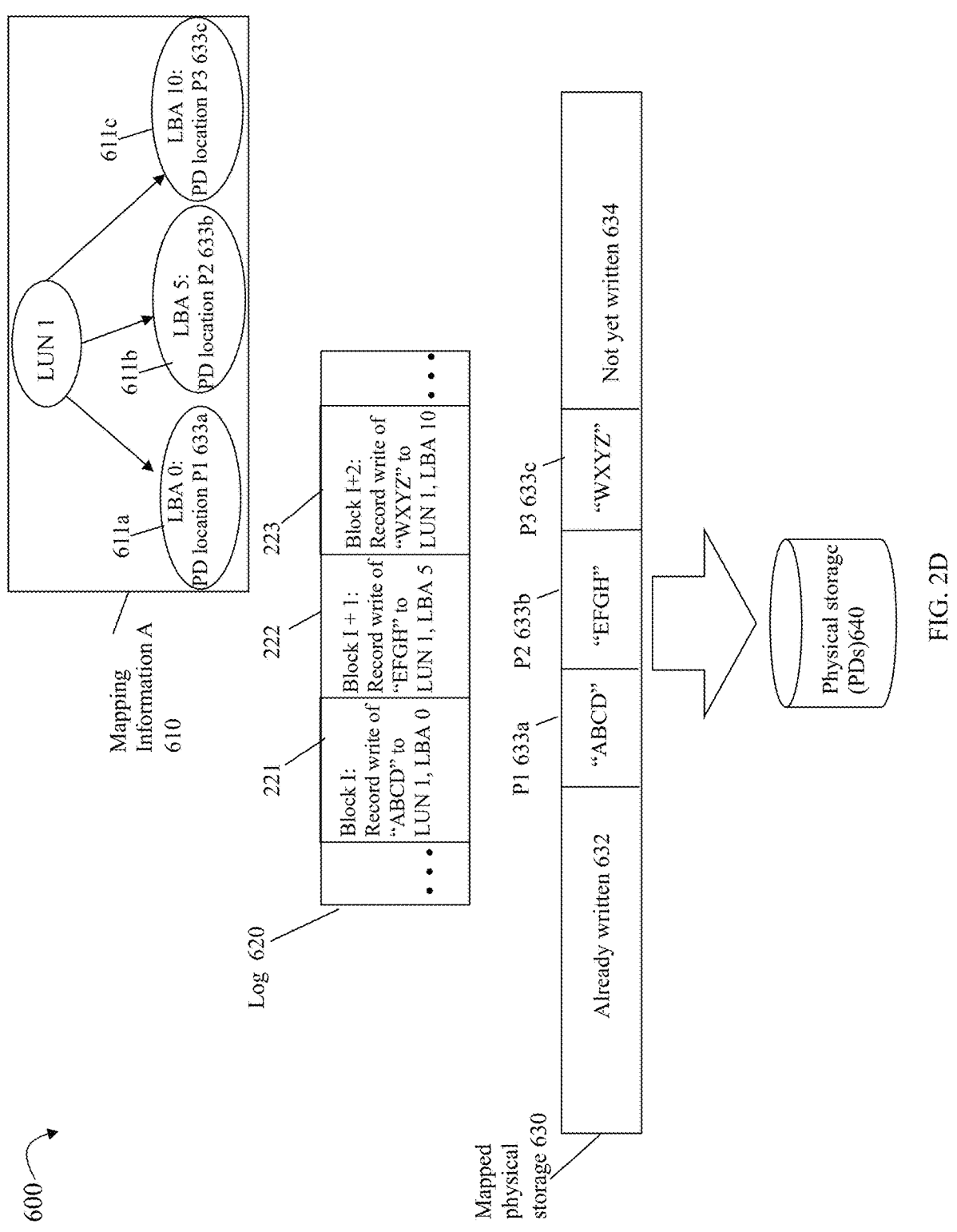

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUNI, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUNI, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
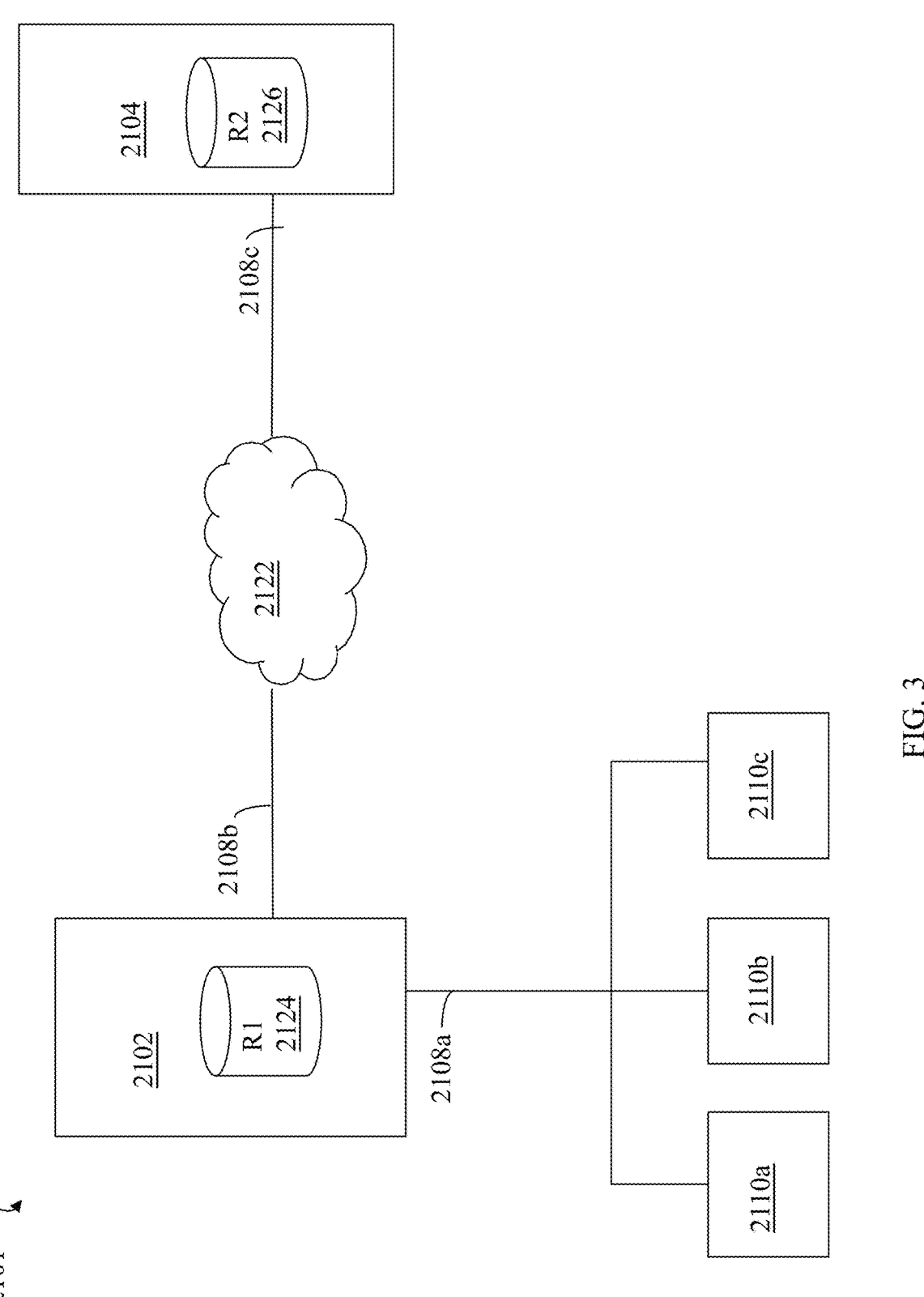
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110a can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110a regarding completion of the write. Thus, the acknowledgement sent from the system 2102 to the host 2110a regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108b, 2122, and 2108c, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write.

Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
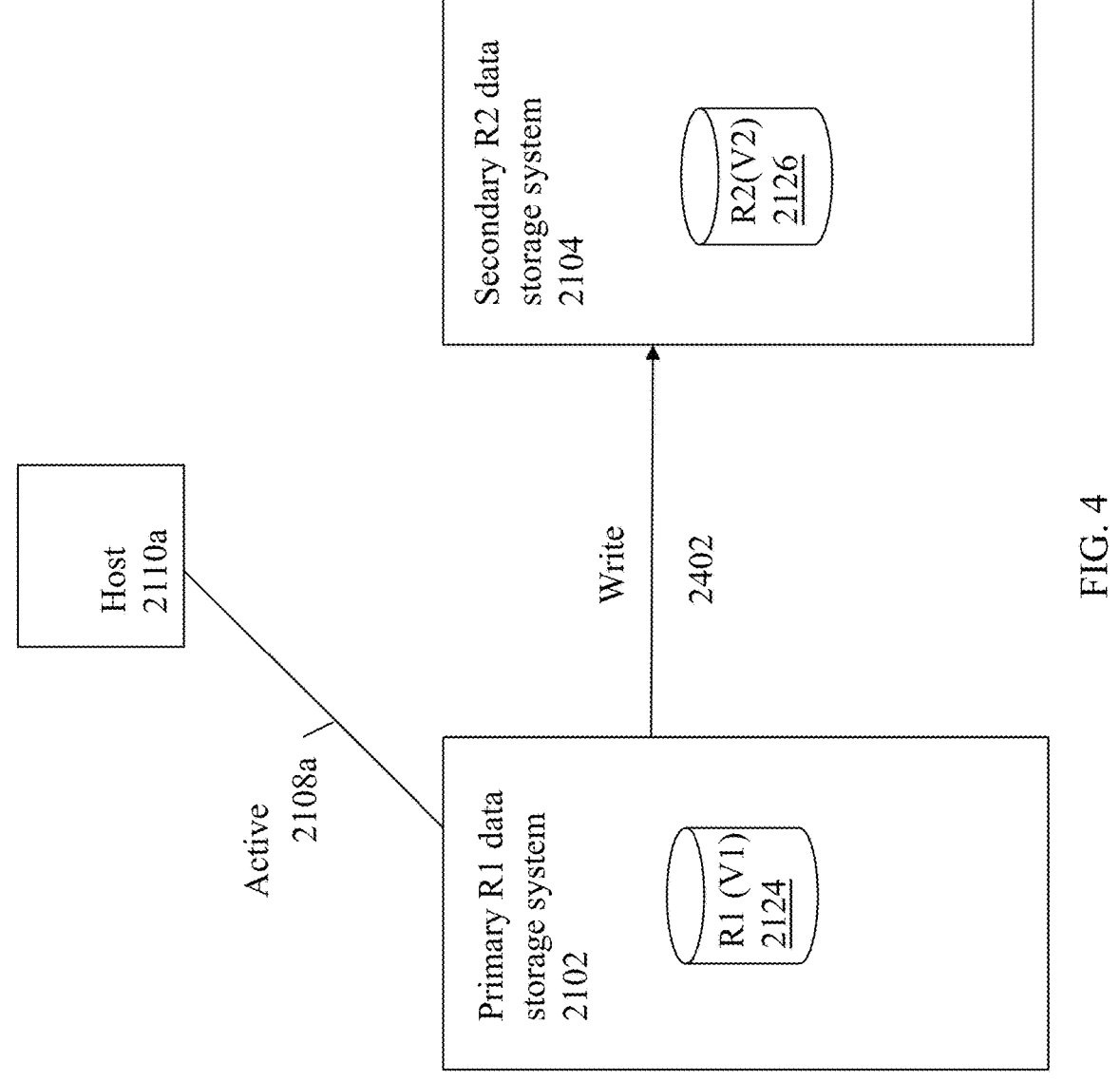
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 is a configuration with asynchronous replication performed from the R1 data storage system 2102 to the secondary R2 system 2104. With the configuration of FIG. 4, the host 2110*a* has an active connection or path 2108*a* over which all I/Os are issued to only the R1 data storage system. Writes issued over path 2108*a* to the R1 system 2102 can be asynchronously replicated to the R2 system 2104.

In at least one embodiment of the configuration of 2400, the R1 device 2124 (e.g., volume V1) and the R2 device 2126 (e.g., the volume V2) can be configured as an asynchronous volume pair where writes to V1 2124 are automatically asynchronously replicated to the R2 system 2104 and applied to the target volume V2 2126. Thus in the example 2400, the host 2110*a* can have write access over the active path 2108*a* to the source or R1/V1 volume (2124) but have no direct write access to the target or R2 volume (2126).

In at least one embodiment, the target volume or R2 volume 2126 can be used in the event of a failure of any one or more of: the host 2110*a*, link 2108*a* and/or system 2102. Although not illustrated in FIG. 4, another second host can be connected to the system 2104 where the second host can use the target volume or R2 volume 2126 due to the foregoing failure.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

Consistent with discussion above, the RRF or remote replication facility can perform asynchronous replication for a configured pair of volumes, resources or objects in at least one embodiment. The asynchronous replication configuration can be generally as discussed herein such as the asynchronous remote replication configuration as in FIG. 4. In at least one embodiment, the asynchronous replication configuration can be a near zero or low RPO replication configuration of a volume pair (V1 2124, V2 2126), where the RRF performs processing of the low RPO replication technique.

Consistent with discussion above, the asynchronous replication for the volume pair can be performed using the low RPO techniques discussed herein. The low RPO replication techniques in at least one embodiment can perform several optimizations that provide for the very low or near zero RPO achieved for a volume pair, or more generally, an object pair configured for asynchronous replication. A volume pair can be configured for asynchronous replication, in particular for low RPO replication, from a volume pair (V1, V2), where V1 denotes the source volume on the source system, and where V2 denotes the corresponding target volume on the target system.

Below is an initial discussion of further details regarding the various optimizations that can be performed by the low RPO replication technique in at least one embodiment in accordance with the present disclosure. Subsequently, there is a discussion regarding other features and embodiments of the techniques of the present disclosure.

In at least one embodiment, performing asynchronous replication using the low RPO replication mode or technique can have a lower adverse impact on the storage system than other asynchronous replication techniques such as the legacy snapshot difference technique. In at least one embodiment, the foregoing can be based, at least in part, on i) the list of differences between successive replication related or transient snapshots being maintained in the cache or memory and/or ii) the ability to retain such replication related or transient snapshots in the log. By retaining the transient snapshots in the log until related content has been replicated, the transient snapshots can be deleted or removed efficiently without incurring more expensive processing when such snapshots are flushed with corresponding metadata created, and then when such snapshots are subsequently deleted.

In the following paragraphs, examples can be provided in embodiments for a volume pair (V1, V2) where V1 is a source volume of the source system and V2 is the corresponding unique target volume of the target system. More generally, the techniques of the present disclosure can be used with other types of storage objects.

The foregoing and other aspects of the techniques of the present disclosure are described in more detail in the following paragraphs.

Figure 5A:
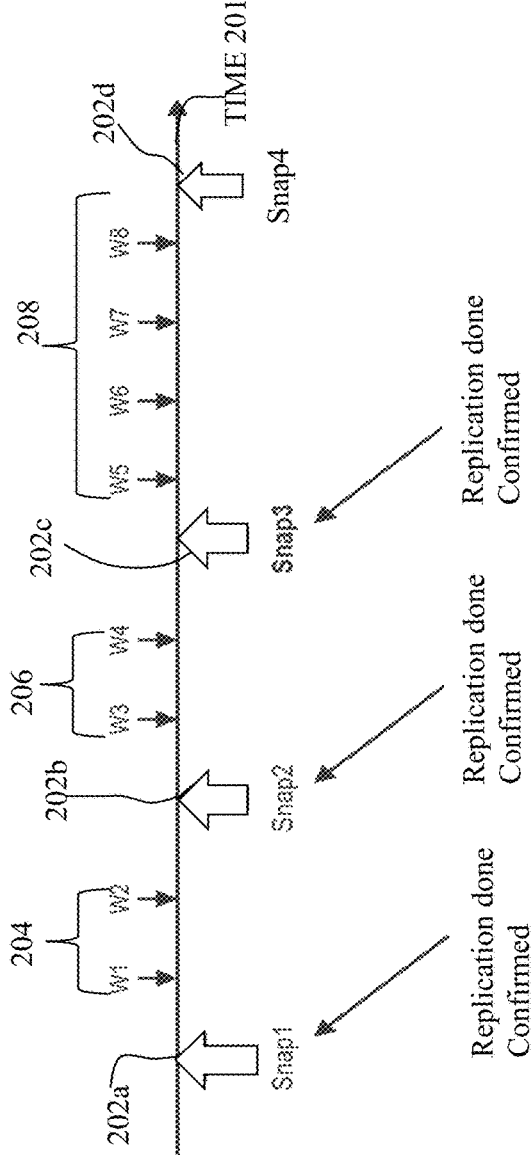
FIG. 5A is an example illustrating determining data differences for a replication configuration in at least one embodiment in accordance with the techniques of the present disclosure.

Referring to FIG. 5A, shown is an example 200 illustrating general use of replication related or transient snapshots in connection with asynchronous replication for volume pair (V1, V2), such as with the low RPO replication technique as well as the snapshot difference technique, in at least one embodiment in accordance with the techniques of the present disclosure.

The example 200 illustrates replication related snapshots 202*a-d* of a storage object such as a source volume V1 of a source storage system taken at various points in time along a timeline 201. The snapshot snap1 202*a* is taken at a first point in time P1 and can be marked as a replication related snapshot. The snapshot snap2 202*b* is taken at a second point in time P2 (subsequent to taking snap 1 202*a* at P1) and can be a marked as a replication related snapshot. The snapshot snap3 202*c* is taken at a third point in time P3 (subsequent to taking snap2 202*b* at P2) and can be marked as a replication related snapshot. The snapshot snap4 202*d* is taken at a fourth point in time P4 (subsequent to taking snap3 202*c* at P3).

In at least one embodiment, each of the replication related snapshots 202*a-d* can also be marked or flagged as a transient snapshot.

The writes W1 and W2 of 204 denote the writes occurring between taking snapshots 202*a* and 202*b*, whereby writes of 204 denote data changes between snapshots 202*a-b*. The writes W3 and W4 of 206 denote the writes occurring between taking snapshots 202*b* and 202*c*, whereby the writes of 206 denote data changes between snapshots 202*b-*

*c*. The writes W5-W8 of 208 denote the writes occurring between taking snapshots 202*c* and 202*d* whereby the writes of 208 denote data changes between the snapshots 202*c-d*.

The writes 204 can denote the replicated writes of a single asynchronous replication cycle between snapshots 202*a-b*; the writes 206 can denote the replicated writes of a single asynchronous replication cycle between snapshots 202*b-c*; and the writes 208 can denote the replicated writes of a single asynchronous replication cycle between the snapshots 202*c-d*.

In at least one embodiment, the writes 204 can be included in the snapshot 202*b*; the writes 206 can be included in the snapshot 202*c*; and the writes 208 can be included in the snapshot 202*d*.

Consistent with discussion elsewhere in at least one embodiment in accordance with the techniques of the present disclosure with the low RPO replication technique or mode, write tracking can be performed by a caching layer or cache to determine the replicated writes of each replication cycle corresponding to a particular tracking ID that uniquely identifies a particular replication cycle of the particular source volume. Processing can be performed to extract data changes of a replication cycle based on the tracked writes with the particular tracking ID as identified by the cache or caching layer.

Consistent with other discussion herein in connection with at least one embodiment of the low RPO replication, records of the writes 204 can remain in the cache until the writes 204 have been replicated from the source system to the target system whereby the replication of such subsequent writes 204 following the snap 202*a* are confirmed as committed on the target system. Records of the writes 206 can remain in the cache until the writes 206 have been replicated from the source system to the target system whereby the replication of such subsequent writes 206 following the snap 202*b* are confirmed as committed on the target system. Records of the writes 208 can remain in the cache until the writes 208 have been replicated from the source system to the target system whereby the replication of such subsequent writes 208 following the snap 202*c* are confirmed as committed on the target system.

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, records of the transient snapshots as recorded in the log can remain in the log and not flushed until deleted, such as by a remote replication facility or RRF performing asynchronous replication using the low RPO replication techniques described herein.

In at least one embodiment of the low RPO replication techniques, processing can be performed such as by a cache or caching layer to generally track changed data locations of the source volume or storage object on the source system, where the contents of the changed locations is what need to be replicated to the target volume or storage object of the target system. In at least one embodiment, such data changes can be read by the source system, replicated to the target system, and written to the target volume of the target system on each replication cycle. With the low RPO technique, optimizations can be enabled and applied that provide for tracking the changed locations of volumes that have been written to between successive replication related snapshots where such changed locations can be stored in the cache in the write tracking memory or cache. Additionally, the low RPO technique can provide for retaining data to be replicated in the cache and thus read from cache (as opposed to reading from BE non-volatile storage) by asynchronous replication processing.

In at least one embodiment, processing of the low RPO replication technique can include continually taking replication related snapshots or snaps of a source volume V1; tracking, in the write tracking memory or cache, writes of each replication cycle between two successive replication related snapshots using a unique tracking ID; using metadata or information recorded in the write tracking memory for the tracked writes to determine a set or list of corresponding locations of V1 denoting locations of V1 that have been modified or written in a particular replication cycle; extracting data changes of the corresponding locations for the corresponding replication cycle; and replicating the data changes of the replication cycle from the source system to the target system. Additionally, as the data or writes between successive snapshots N-1 and N are replicated from the source system to the target system, the low RPO replication technique can further include deleting the replication related snapshot N-1; and also deleting or otherwise reusing the cache storage consumed for the list of tracked writes. If the replication related snapshot is in the log and thus deleted from the log, the writes subsequent to the deleted snapshot can now be flushed from the log. If the replication related or transient snapshot has been flushed from the log and is deleted after the log entry to create the snapshot has been flushed, deleting the replication related snapshot can include deleting any associated metadata of the deleted snapshot. If the replication related snapshot has been flushed from the log, records of subsequent writes may have also been flushed from the log but retained in cache until replicated. If the replication related snapshot has not been flushed from the log, records of the subsequent writes are also not flushed, where the write data of such subsequent writes is dirty and can remain in the cache until replicated and flushed.

In at least one embodiment, the data differences or changed content can be determined, replicated or written to the target system, and then applied to the corresponding target volume. In at least one embodiment, the list of locations having content to be replicated can be obtained from the list maintained in the cache by write tracking. The content or data replicated can be read from cache since in at least one embodiment of the low RPO replication technique, the content or data to be replicated for a particular replication cycle can remain in cache until replicated.

Referring to FIG. 5B, shown is an example 250 of components on a storage system that can be used in an embodiment in accordance with the techniques of the present disclosure.

In at least one embodiment the components of 250 can be included in the source storage system configured to perform asynchronous replication using the low RPO techniques in accordance with the present disclosure.

The components 250 can include a remote replication facility or RRF 252, a logger or log component 254, a mapper component 260, a log 256 denoting a persistently stored log of recorded operations, a cache 258, and BE non-volatile storage 262. The cache 258 can generally be a volatile memory cache and can include a volatile memory copy 258*a* of the log 256. Put another way, in at least one embodiment, element 258*a* can denote an in-memory copy of the log 256, where the in-memory or volatile memory copy 258*a* can include the same information as the persistent log 256. In at least one embodiment, the copy 258*a* of the log can be accessed and used to perform processing described herein rather than the persistent copy 256 of the log. In at least one embodiment, the copy 258a of the log can have a corresponding layout and organization of content that can be different from the persisted log 256, where the organization of 258a can be designed for quicker retrieval, updating and/or management than that of the persisted log 256. In at least one embodiment, the persisted log 256 can be used in the event of system failure or reboot to repopulate the volatile memory copy 258a of the log. In at least one embodiment, committing a record or transaction to the log, such as part of ingest processing of a command or operation, can include storing corresponding records in both the persisted log 256 and the volatile memory copy 258a of the log. In at least one embodiment with a dual node system, committing a record or transaction to the log can also include communicating the committed or recorded operations between the peer nodes to ensure that both nodes have synchronized volatile memory copies of the log.

In at least one embodiment of a dual node system, each node can include node-local instances of 252, 254, 258, and 260. In at least one embodiment of a dual node system, there can be a single persistent log 256 accessed and used by both nodes. Additionally, the storage 262 can denote BE non-volatile storage accessed and used by both nodes.

The RRF 252 can be configured to perform asynchronous replication using the low RPO techniques of the present disclosure. In at least one embodiment, the RRF 252 can also be configured to perform asynchronous replication using an alternative asynchronous technique such as the legacy snapshot difference technique discussed elsewhere herein.

The mapper component 260, sometimes referred to as the mapper, can maintain mapping information of metadata pages used to map logical addresses, such as of user data or content, to corresponding physical addresses or locations of content stored at the logical addresses. The physical addresses or locations can correspond to storage locations in the BE non-volatile storage 262. Consistent with other discussion herein in at least one embodiment, the metadata pages can be organized in a hierarchal tree structure of multiple layers of metadata pages. In at least one embodiment, the hierarchical structure of multiple layers of metadata (MD) pages can include a layer of top MD pages, a layer of mid MD pages, a layer of leaf MD pages, where each top page can include pointers to multiple mid pages, each mid page can include multiple pointers to multiple leaf pages. Each leaf page can include multiple entries each associated with a logical address, where the leaf page entry for a logical address can include a reference, pointer, or address used to access a physical storage location of 262 containing content of the logical address. In at least one embodiment, the reference of the leaf page entry for a logical address can be an indirect pointer to the physical storage location of content stored at the logical address. In at least one embodiment, the mapping information mapping a logical address LA1 to a corresponding physical location PA1 of content stored at LA1 can include a chain of the metadata pages including top, mid and leaf MD (metadata) pages, where the top page points to a mid page, and where the mid page points to a leaf page, and where an entry of the leaf page includes the indirect pointer to PA1. In at least one embodiment, flushing a recorded write I/O of the log where the write I/O writes content C1 to LA1 can include: storing C1 at PA1; and creating and/or updating the mapping information of the chain of metadata pages used to map LA1 to PA1.

In at least one embodiment, flushing a recorded command or operation to take a snapshot can also include allocating and/or updating metadata pages for the new snapshot. In at least one embodiment, write I/Os to a source volume can result in write splits with respect to metadata pages shared with a snapshot of the source volume, where a write split can resulting in allocating one or more new metadata pages to accommodate the snapshot and writes to the source volume. As a result, deleting the snapshot once it has been flushed from the log can include the expensive process of deleting and/or updating metadata pages corresponding to the snapshot and its writes. Thus in at least one embodiment using the low RPO replication technique, retaining a transient snapshot in the log until deleted can use additional cache and log resources for an extended period of time while also avoiding or omitting performing the expensive processing associated with deleting a snapshot after it has been actually created as a result of flushing the log entry of the create snapshot command from the log.

The log component 254 can be configured to: record operations, commands or requests in the log 256, 258a; enforce constraints and dependencies between various operations that can be recorded in the log; and control flushing of the log 256, 258a to the mapper component 260. In accordance with the techniques of the present disclosure with the low RPO technique, the log component 254 can be configured to delay flushing recorded commands or operations, such as a command or operation to take or create transient snapshots, based on an indicator, such as a transient flag (TF) setting of the command to take a transient snapshot of a source volume.

In at least one embodiment, ingest processing of a write I/O and a snapshot related command (e.g., to create a snapshot of a volume or storage object and/or delete an existing snapshot of a volume or storage object) can include recording (e.g., committing) the command or operation in the log. Once the foregoing is recorded in the log, an acknowledgement can be returned to the client or originator of the command or operation just recorded in the log.

In at least one embodiment, the RRF 252 can be the client originating i) the command to create a transient or replication related snapshot and ii) the command to delete an existing transient or replication related snapshot. In at least one embodiment, write I/Os directed to a source volume configured for asynchronous replication using the low RPO techniques can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Figure 6:
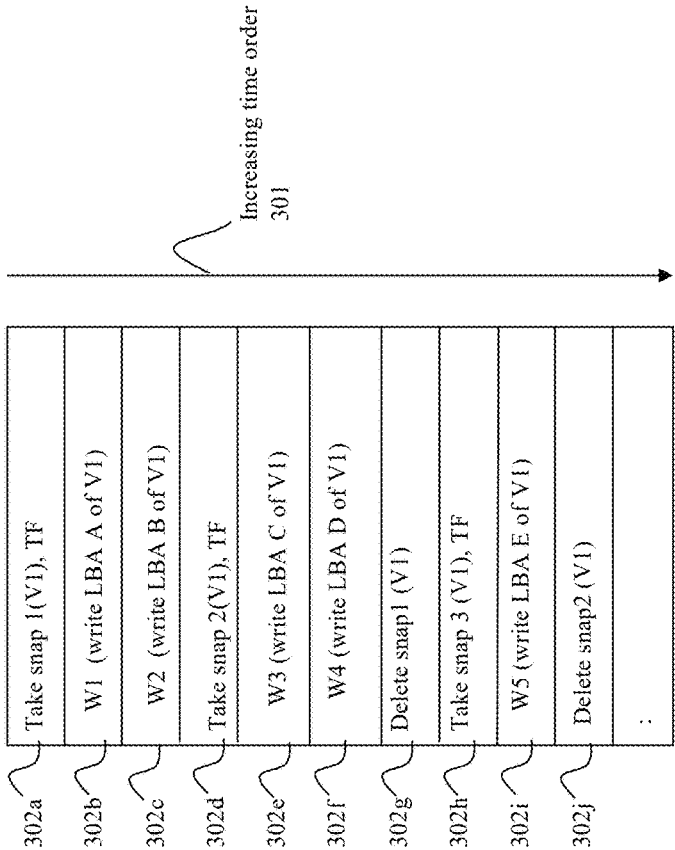

Referring to FIG. 6, shown is an example 300 illustrating use of the log in connection with recording transient or replication related snapshot operations and writes in at least one embodiment in accordance with the techniques of the present disclosure.

In the example 300, operations can be recorded as entries in the log in increasing time order as indicated by the arrow 301. Thus the records 302a-j denote operations, requests or commands recorded and committed to the log at various points in time in increasing time order.

Initially, a request or command to take or create a first transient or replication related snapshot, snap1, of the source volume V1, can be made by the RRF performing the low RPO replication techniques. The request to take snap1 of V1 is recorded in the log as record 302*a*, the transient flag (TF) is set for snap1 to signal to delay flushing the record 302*a*. In at least one embodiment, a log entry creating a snapshot can be viewed as a barrier record such that writes subsequent to the log entry for the create snapshot command are not flushed until the log entry for the create snapshot command is first flushed. Thus based on normal ordering of records of the log in at least one embodiment, the logger prevents write records, that occur in the log after a second record taking a snapshot, from being flushed prior to flushing the second record taking/creating the snapshot.

After recording 302*a* in the log, the storage system can receive writes W1 and W2 that are respectively recorded as entries 302*b-c* in the log. W1 and W2 can be writes directed respectively to LBAs A and B of V1 In at least one embodiment, the write records 302*b-c* would normally induce write splits in the mapper 260 if the record 302*a* taking snap 1 were allowed to be flushed before the records W1 and W2. In at least one embodiment in accordance with the low RPO replication technique, this can be avoided by delaying flushing of record 302*a* based on the transient flag TF.

Subsequent to recording the entries 302*b-c* in the log, RRF can issue a command or request to take a second transient or replication related snapshot, snap2, of the source volume V1. The request to take snap2 of V1 is recorded in the log as record 302*d*, where snap2 can have the transient flag (TF) set to signal to delay flushing the record 302*d*.

After recording 302*d* in the log, the storage system can receive writes W3 and W4 that are respectively recorded as entries 302*e-f* in the log. W3 and W4 can be writes directed respectively to LBAs C and D of V1 In at least one embodiment, the write records 302*e-f* would normally induce write splits in the mapper 260 if the record 302*d* taking snap2 were allowed to be flushed before the records W3 and W4. In at least one embodiment, this can be avoided by delaying flushing of record 302*d* based on the transient flag TF.

After recording entries 302*e-f* in the log, the RRF can issue a command or request to delete the transient or replication related snapshot, snap1 of V1. Snap of V1 is the snapshot instance taken by the recorded command of the record 302*a*. The command to delete snap1 of V1 can be recorded in entry 302 g of the log. At some later point in time, the logger can associate delete snap 1 record 302*g* with the create snap 1 record 302*a*, and invalidate the create snap1 record 302*a*. As such in at least one embodiment using the low RPO replication technique, the logger can be viewed as cancelling the creation or taking of snap1 of V1 such that mapper does not perform any processing related to creating or deleting the snap1 of V1. The result of such invalidation by logger is to allow the write records W1 302*b* and W2 302*c* without inducing write splits in the mapper 260. Rather, the writes W1 302*b* and W2 302*c* can be flushed and proceed as ordinary writes.

After recording the record 302*g* in the log, the RRF can issue a command or request to take a third transient or replication related snapshot, snap3, of the source volume V1. The request to take snap3 of V1 is recorded in the log as record 302*h*, where the transient flag (TF) is set for snap3 to signal to delay flushing the record 302*h*.

After recording 302*h* in the log, the storage system can receive write W5 recorded as entry 302*i* in the log. W5 can write to LBA E of V1. In at least one embodiment, the write record 302*i* would normally induce write splits in the mapper 260 if the record 302*h* taking snap3 were allowed to be flushed before the record W5 302*i*. In at least one embodiment of the low RPO replication technique, this can be avoided by delaying flushing of record 302*h* based on the transient flag TF.

After recording 302*i* in the log, the RRF can issue a command or request to delete the transient or replication related snapshot, snap2 of V1. Snap2 of V1 is the snapshot instance taken by the recorded command of the record 302*d*. The command to delete snap2 of V1 can be recorded in entry 302*j* of the log. At some later point in time, the logger can associate delete snap2 record 302*j* with the create snap2 record 302*d*, and invalidate the create snap2 record 302*d*. The result of such invalidation by logger would be to allow the write records W3 302*c* and W4 302*f* without inducing write splits in the mapper 260. Rather, the writes W3 302*c* and W4 302*f* can be flushed and proceed as ordinary writes.

As can be seen from FIG. 6 in at least one embodiment of the low RPO replication technique, sequences including creating and deleting multiple transient snapshots can be managed by invalidation by logger and delaying flushing of transient snapshots marked using the TF flag, which can avoid: creating any mappings (e.g., of metadata pages) for the snapshots, deleting the mappings for the snapshots, performing write splits when there is block sharing with the snapshots, and performing any needed cleanup after the write splits (e.g., deleting unneeded metadata supporting the write splits).

It should be noted that the example of FIG. 6 depicts an ordering in which the deletion of snap 1 (302*g*) is placed before the creating of snap 3 (302*h*) thereby leaving snap2 as the only existing snapshot. In this example, the order or placement of delete snapshot commands and create snapshots commands is controlled by the RRF. In some embodiments, the RRF can have at least two transient snapshots at any given time. In this case, RRF can alternatively ensure a corresponding command sequence, for example, such that creating snap3 would alternatively occur prior to deleting snap1. In such an embodiment, there can be one replication cycle between two successive transient snapshots for which content is being replicated, and there can be another replication cycle that is open for which writes or data change are being tracked or collected.

Figure 7:
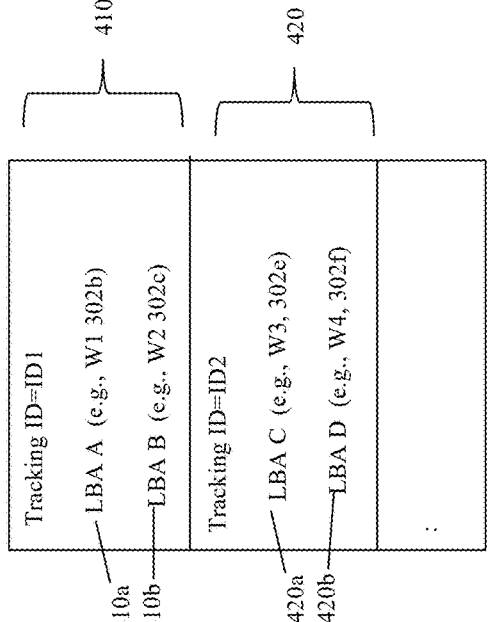
FIG. 7 is an example illustrating use of write tracking in at least one embodiment in accordance with the techniques of the present disclosure.

Referring to FIG. 7, shown is an example 400 of information that can be obtained as a result of write tracking in at least one embodiment of the low RPO replication technique in accordance with the techniques of the present disclosure.

In at least one embodiment, the cache or caching layer can perform write tracking of tagged writes where the cache can identify all writes tagged with a particular tracking identifier (ID). The particular tracking ID can uniquely identify a particular replication cycle between two successive snapshots of a source volume, and all writes tracked with the particular tracking ID can denote the data changes in the replication cycle. Put another way, writes can be tracked in a particular tracking session denoted by the tracking ID where the tracking session tracks writes made between two successive transient snapshots N-1 and N. Additionally generally the writes tracked for the tracking session with the tracking ID denote the writes included in the snapshot N. Based on the foregoing in at least one embodiment, the tracking ID can be uniquely associated with i) a particular source volume of an asynchronously configured volume pair, and ii) a particular snapshot of the particular source volume, where the tracking ID identifies content of the particular snapshot.

The information of 400 can be stored in the cache, such as a volatile memory cache. The information of 400 can include a list of changes to the source volume V1 between successive transient or replication related snapshots taken by RRF. In at least one embodiment, each tracking ID can uniquely identify a corresponding replication cycle between two successive transient snaps. The example 400 includes tracked writes for 2 replication cycles, where each replication cycle can denote data changes or writes made to V1 between two successive transient snapshots N-1 and N, and where such writes or data changes are included in the snapshot N.

In some instances, the cache or memory 400 used for write tracking can be referred to as write tracking memory or cache used in connection with tracking changed locations of volumes between successive snapshots of each such volume for use with the low RPO replication technique.

FIG. 6 illustrates a sequence of commands or operations recorded in the log including 3 commands or requests to take snapshots of V1. With reference back to FIG. 6, let a tracking ID=ID1 denote the data changes or writes included in a first replication cycle or tracking session between snap1 of V1 and snap2 of V1; and let a tracking ID=ID2 denote the data changes or writes included in a second replication cycle or tracking session between snap2 of V1 and snap3 of V1. Based on the foregoing in this example, writes or data changes tracked with tracking ID=ID1 can be those writes made to V1 during the time interval between taking snap1 of V1 and snap 2 of V1. Additionally, writes or data changes tracked with tracking ID=ID2 can be those writes made to V1 during the time interval between taking snap2 of V1 and snap 3 of V1.

The example 400 of FIG. 7 includes element 410 denoting tracked writes tagged with tracking ID=ID1 identifying those writes or data changes made to V1 in the first replication cycle or tracking session between snap1 and snap2 of V1. The element 410 includes: LBA A 410a corresponding to the write W1 302b, and LBA B 410b corresponding to the write W2 302c, where such writes W1 and W2 occur between taking snap 1 (302a) and snap2 (302d), and where such writes W1 and W2 can be tagged with the tracking ID=ID1.

The example 400 includes element 420 denoting tracked writes tagged with tracking ID=ID2 identifying those writes or data changes made to V1 in the second replication cycle or tracking session between snap2 and snap3 of V1. The element 420 includes: LBA C 420a corresponding to the write W3 302c; and LBA D 410b corresponding to the write W4 302f, where such writes W3 and W4 occur between taking snap2 (302d) and snap 3 (302h), where such writes W3 and W4 can be tagged with the tracking ID=ID2. For a replication cycle or tracking session having a corresponding tracking ID with the low RPO replication technique, RRF can determine the list of locations of data changes or writes having associated content to be replicated in the replication cycle or tracking session by querying the cache for all tracked writes having the corresponding tracking ID. For example, RRF can perform processing to determine the list or set of locations of data changes in the first replication session by querying the cache for all tracked writes having the tracking ID of ID1. In response, the cache can return to RRF a list of LBAs or offsets, and associated lengths, of tracked writes of V1 having the tracking ID of ID1. In this example, the cache can determine that the LBA A 410a and LBA B 410b of V1 have been written to or modified during the first replication cycle or tracking session between snap1 and snap2.

Thus the RRF can determine a first set of data changes to be replicated from the source system to the target system by querying the cache for locations of V1 of tracked writes having the tracking ID=ID1, and then obtaining the data written to such locations, such as LBA A and LBA B of V1, during the corresponding replication cycle. In response to the query for tracked writes associated with tracking ID=ID1, the cache can return to RRF a list of LBA A and LBA B. In at least one embodiment, the content or data written by W1 to LBA A and by W2 to LBA B during the corresponding replication cycle can be retained in the cache until replicated. Thus, RRF can read, from the cache, the write data of LBA A (W1) and LBA B (W2) to be replicated. Once the write data of LBA A and LBA B has been replicated, write data of LBA A and LBA B, as stored in the cache, can be candidates for eviction or removal from the cache. The first set of data changes or differences denotes the locations of V1 that have been modified or written during the corresponding replication cycle between snaps 1 and 2 of V1.

RRF can perform processing to determine the list or set of locations of data changes in the second replication session by querying the cache for all tracked writes having the tracking ID of ID2. In response, the cache can return to RRF a list of LBAs or offsets, and associated lengths, of tracked writes of V1 having the tracking ID of ID2. In this example, the cache can determine that the LBA C 420a and LBA D 420b of V1 have been written to or modified during the second replication cycle or tracking session between snap2 and snap3 of V1.

Thus the RRF can determine a second set of data changes to be replicated from the source system to the target system by querying the cache for locations of V1 of tracked writes having the tracking ID=ID2, and then obtaining the data written to such locations, such as LBA C and LBA D of V1 during the corresponding replication cycle. In response to the query for tracked writes associated with tracking ID=ID2, the cache can return to RRF a list of LBA C and LBA D of V1. In at least one embodiment, the content or data written by W3 to LBA C and by W4 to LBA D during the corresponding replication cycle can be retained in the cache until replicated. Thus, RRF can read, from the cache, the write data of LBA C (W3) and LBA D (W4) of V1 to be replicated. Once the write data of LBA C and LBA D of V1 has been replicated, write data of LBA C and LBA D, as stored in the cache, can be candidates for eviction or removal from the cache. The second set of data changes or differences denotes the locations of V1 that have been modified or written to during the corresponding second replication cycle between snaps 2 and 3 of V1.

Thus in at least one embodiment, low RPO replication processing can include efficiently determining the set or list of changed locations of V1 for a particular replication cycle by querying the cache for the list. Additionally, low RPO replication processing can include efficiently obtaining the content of such changed locations by then reading the content of such changed locations from cache where such content can be retained and can remain in the cache until replicated.

Thus generally in at least one embodiment, asynchronous replication as performed using the low RPO replication techniques described herein can utilize multiple optimization to achieve very low RPOs, such as RPOs that are less than 30 seconds. Such multiple optimizations in at least one embodiment are described elsewhere herein and can include: write tracking; retaining records of the transient snapshots are recorded in the log until deleted; and retaining data to be replicated in cache until replicated.

AES

Referring to FIGS. 8A and 8B, shown is a flowchart 500, 501 of processing steps that can be performed in at least one embodiment of the low RPO replication technique. The steps of FIGS. 8A and 8B describe a sequence of processing steps that can be performed based on the example of FIGS. 6 and 7.

In the step 502, a volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication. From the step 502, control proceeds to the step 504.

At the step 504, RRF sends a command or request to create snap 1 of V1 resulting in recording entry 302*a* in the log. From the step 504, control proceeds to the step 506.

At the step 506, the storage system receives writes W1 and W2 directed to V1 resulting in recording entries 302*b-c* in the log. From the step 506, control proceeds to the step 508.

At the step 508, RRF sends a command or request to create snap2 of V2 resulting in recording entry 302*d* in the log. From the step 508, control proceeds to the step 510.

At the step 510, the storage system receives writes W3 and W4 directed to V1 resulting in recording entries 302*e-f* in the log. From the step 510, control proceeds to the step 512.

At the step 512, RRF computes the list or set of changed locations to V1 during the replication cycle or tracking session with tracking ID=ID1 thereby denoting the replication cycle between snap1 of V1 and snap2 of V1. RRF can determine the list by querying the cache for the list of tracked writes with tracking ID=ID1. In response, the cache can return the list of changed locations or LBAs of V1 written to or modified during the replication cycle between snap1 and snap2 where such tracked writes are tagged with tracking ID=ID1. In this example, the changed locations can be LBA A and LBA B of V1. RRF can determine a delta set of data differences or changes between snap1 and snap2 by reading from cache the contents of LBAs A and B of V1 as written during the corresponding replication cycle. The data changes of the delta set, including contents of LBAs A and B of V1 as written during the corresponding replication cycle, can be replicated from the source system to the target system and applied to the target volume V2. At this point, cache locations storing contents of LBAs A and B of V1 are no longer retained in cache and can be candidates for removal or eviction. From the step 512, control proceeds to 514.

At the step 514, RRF issues a command to delete snap1 of V1. The logger can respond to the delete command by invalidating and thus canceling the corresponding create snap 1 command of record 302*a*. Invalidating snap1 302*a* allows writes W1 (302*b*) and W2 (302*c*) to be flushed. Invalidating snap1 302*a* allows the create snap 1 record 302*a* and delete snap1 record 302*g* to be canceled so that flushing can simply ignore records 302*a* and 302*g* without involving mapper (e.g., without inducing write splits, and without creating or deleting metadata for the snapshot or writes W1, W2). From the step 514, control proceeds to the step 516.

At the step 516, RRF sends a command or request to create snap 3 of V1 resulting in recording entry 302*h* in the log. From the step 516, control proceeds to the step 518.

At the step 518, the storage system receives write W5 directed to V1 resulting in recording entry 302*i* in the log. From the step 518, control proceeds to the step 520.

At the step 520, RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3, where such locations are associated with tracked writes having tracking ID=ID2. In this example, the changed locations can be LBA C and LBA D of V1. RRF can determine a delta set of data differences or changes between snap2 and snap3 by reading from cache the contents of LBAs C and D of V1 as written during the corresponding replication cycle. The data changes of the delta set, including contents of LBAs C and D of V1, can be replicated from the source system to the target system and applied to the target volume V2. At this point, cache locations storing contents of LBAs C and D of V1 are no longer retained in cache (e.g., are not guaranteed to remain in cache) and can be candidates for cache removal or eviction. From the step 520, control proceeds to the step 522.

At the step 522, RRF issues a command to delete snap2 of V1. The logger can respond to the delete command by invalidating and thus canceling the corresponding take snap2 command of record 302*d*.

Invalidating snap2 302*d* allows writes W3 (302*c*) and W4 (302*f*) to be flushed. Invalidating snap2 302*d* allows the records 302*d* and 302*j* to be canceled so that flushing can simply ignore records 302*d* and 302*j* without involving mapper (e.g., without inducing write splits, and without creating or deleting metadata for the snapshot or writes W3, W4).

In at least one embodiment, the alternative asynchronous replication technique or mode can be the legacy snapshot difference technique discussed in more detail elsewhere herein that does not perform the optimizations of the low RPO replication technique. In at least one embodiment, the legacy snapshot difference technique does not consume or use write tracking memory that is consumed or used in connection with the low RPO replication technique or mode.

In at least one embodiment with the legacy snapshot difference technique, the snapshot difference can be determined between successive two snapshots that have been created and thus flushed from the log to mapper. In this manner with the legacy snapshot difference technique, metadata has been created by mapper for the two transient snapshots and any writes applied to the source volume can result in performing write split processing as noted elsewhere herein that includes allocating/creating one or more new metadata pages for use with the snapshots as writes are applied to the source volume. The legacy snapshot difference technique can include determining the data differences between the two successive snapshots by traversing the metadata pages corresponding to each snapshot. Thus the legacy snapshot difference technique is generally more time consuming than determining the difference between two successive snapshots using the tracked writes in the low RPO technique. In at least one embodiment, the legacy snapshot technique or alternative technique performed when in the off service level can be expected to consume less cache resources and/or log resources than the low RPO technique. With the legacy snapshot difference technique, deleting the transient or replication related snapshots can also be more time consuming and can include performing expensive metadata page updates and/or deletion of metadata pages.

It should be noted that the low RPO replication technique and legacy snapshot difference technique can both generally determine the differences or changes between successive snapshots of a volume. However, as discussed herein in at least one embodiment, the low RPO replication technique uses resources, such as the write tracking cache, and performs optimizations, such as using transient snapshots based on records retained in the log, that are otherwise omitted by the legacy snapshot technique such that the low RPO replication technique is able to achieve much lower RPOs than the legacy snapshot technique.

Thus in at least one embodiment, the low RPO replication technique can provide for much lower RPOs due to the optimizations and corresponding additional resource consumption. In contrast, the alternative asynchronous replication technique such as the legacy snapshot difference technique may not be able to provide such low RPOs but the alternative technique may also consume lesser amounts of system resources such as cache and/or log resources in comparison to the low RPO replication technique. In at least one embodiment, the alternative asynchronous replication technique can be the legacy snapshot difference technique that does not use or consume the write tracking cache or memory, and where the write tracking cache or memory is consumed and used by the low RPO replication technique.

What will now be described are additional details and features that can be performed in at least one embodiment in accordance with the techniques of the present disclosure.

In at least one embodiment, a volume group (or more generally a group) can be a logically defined group of two or more volumes or other supported storage resources or objects. In at least one embodiment, a replication session can be configured for asynchronous replication using a source system volume group VG1 and a target system volume group VG2. VG1 can include source volumes of a source system and VG2 can include target volumes of a target system. In the asynchronous replication session, volume pairs can be defined where each volume pair (V1, V2) includes one of the source volumes V1 of VG1 and a unique corresponding target volume V2 of VG2, where writes to V1 on the source system are automatically replicated asynchronously to V2 on the target system.

In at least one embodiment, an asynchronous replication session for VG1 and VG2 can be enabled for low RPO replication. Initially, all VG1 members, and thus all volume pairs of the replication session, can perform asynchronous replication using an alternative asynchronous replication (AAR) technique or mode such as the legacy snapshot difference technique. In at least one embodiment, the techniques of the present disclosure provide for allowing individual VG1 members, and thus each individual volume pair, to individually transition to the low RPO replication mode such that the VG1 and replication session can be in a hybrid mode or state during the replication session's transition to the low RPO replication mode or state where all VG1 members, and thus all volume pairs of the replication session, operate in the low RPO replication mode. During this period of transitioning the replication session from the AAR mode to the low RPO replication mode, the asynchronous replication session on VG1 and VG2 will also end up in an intermediate replication mode or state, the hybrid mode or state, which indicates that one or more VG1 members (and thus one or more asynchronously configured volume pairs), are individually in the AAR replication mode (e.g., member level) and one or more VG1 members (and thus one or more asynchronously configured volume pairs) are individually in the low RPO replication mode (e.g., member level).

In at least one embodiment where the alternative asynchronous replication mode is the legacy snapshot difference technique, transitioning a VG1 member and corresponding volume pair from the AAR mode to the low RPO replication mode can include: i) performing an initial synchronization between the source and target volumes of the volume pair, where the initial synchronization can be performed using a data storage system internal snapshot taken at the start or create time of the low RPO replication session; ii) performing snapshot based delta synchronizations or syncs until the volume data differences with respect to the source volume are below a specified threshold level (e.g., such that the source volume and respective target volume have minimal data differences below the threshold level); and iii) once the foregoing data differences are below the specified threshold, then the VG1 member and corresponding volume pair can transition or switch from the alternative asynchronous replication mode to the low RPO replication mode where, for example, further copying or replicating content (e.g., copying written or changed content from the source to the target) can be performed using the RPO replication technique and mode using the cache based change tracking optimization as well as other optimizations of the low RPO replication technique.

In at least one embodiment, while the replication session and VG1 of source volumes is in hybrid mode and its members (and corresponding volume pairs) are transitioning to the low RPO replication mode, host I/Os, such as write I/Os, directed to member source volumes of the VG1 can be received and serviced in an ongoing manner. Put another way, host I/Os directed to a hybrid VG1 member can be received and serviced simultaneously while the hybrid VG1 members are transitioning to the low RPO replication mode. More generally in at least one embodiment, host I/Os, such as write I/Os, directed to member volumes of the VG1 can be received and serviced in an ongoing manner while the VG1 and its members (and corresponding volume pairs) are transitioning from the alternative asynchronous replication mode to the low RPO replication mode.

Additionally in at least one embodiment while the VG1 and replication session is in the hybrid mode transitioning to the low RPO replication mode, the techniques of the present disclosure can also provide for taking and maintaining recovery snapshots of the VG1 and VG2 of the replication session, where such recovery snapshots can be used to perform recovery or failover processing.

In at least one embodiment, taking a snapshot such as a transient or replication related snapshot of a volume group such as VG1 in connection with asynchronous replication can include taking a snapshot of all of the source volumes of the volume group at the same point in time. Thus in at least one embodiment, asynchronous replication with respect to a volume group can include taking successive volume group level snapshots of all source volumes of the volume group VG1 and replicating the writes or changes between successive volume group snapshots of VG1 to the target system for application to the corresponding target volumes of the target volume group VG2.

In at least one embodiment, the group level snapshot can provide for taking a snapshot of all group members, such as of VG1, at a same point in time and providing for write order consistency among all snapshots of group members. Volumes in the volume group can maintain such consistency even on the destination or target system and therefore can be replicated with the same RPO. In at least one embodiment, taking a group level snapshot of a volume group such as VG1 includes taking a snapshot of each source volume of the VG1 members. For example in at least one embodiment, taking or creating a snapshot of a VG1 including multiple source volumes at the same point in time can include quiescing writes directed to the source volumes of VG1. For example, new writes to source volumes of the VG1 can be temporarily paused or suspended, and pending writes can be allowed to complete. Subsequently, snapshots can be taken of all source volumes of VG1, and then new writes to the source volumes of the VG1 can resume.

In at least one embodiment, a group level snapshot of a volume group VG can be obtained to thereby provide a common base snapshot of the VG, where the same common base snapshot of the VG can exist on the source and target systems. In at least one embodiment, such common base VG snapshots (common across both the source and target systems) can be used as recovery snapshots in any desired recovery operation. For example, such recovery snapshots of a VG or single volumes can be used to synchronize content of the VG and its members across the source and target systems during a failover operation subsequent to a replication failure and/or failure of one of the source and target systems. In at least one embodiment, a group level snapshot of VG1 of the source volumes can be taken and applied to corresponding target volumes of VG2 on the target system. In this case, the group level snapshot of VG1 and the group level snapshot of VG2 can serve as a common base of recovery snapshots.

In at least one embodiment, the techniques of the present disclosure provide for transitioning members of a hybrid VG1 and corresponding volume pairs from the alternative asynchronous replication mode (where the alternative asynchronous replication technique is performed) to the low RPO replication mode (where the low RPO replication technique is performed) while still maintaining a recovery snapshot of the VG1 to perform any needed failover processing with a minimum data loss, where the recovery snapshot of the VG1 can be common across both the source and target systems.

In at least one embodiment, the alternative asynchronous replication technique such as the legacy snapshot difference technique takes successive snapshots of objects, such as volumes, at a frequency based on a defined or explicitly specified RPO such as 5 minutes. In contrast in at least one embodiment, the low RPO replication mode does not utilize such an explicit defined RPO target and rather takes transient snapshots in a continual manner as soon as the current copy of a replication cycle completes. The optimizations performed by the low RPO technique in at least one embodiment as described herein results in achieving and maintaining asynchronous replication RPOs generally less than 30 seconds.

In at least one embodiment, an asynchronous replication session enabled for low RPO replication can initially start in the alternative asynchronous replication mode or technique and transition to the low RPO replication mode so as to avoid exhausting or depleting resources, such as cache resources of the write tracking cache, used by the low RPO replication mode but not the alternative asynchronous replication mode. For example, initially there may be a large amount of data differences between the source and target volume of a volume pair enabled for low RPO replication.

If such large amounts of data differences for all volume pairs enabled for the low RPO replication mode were all stored in the write tracking cache, the write tracking cache would be easily exhausted or depleted. As a result in at least one embodiment, the techniques of the present disclosure provide for initially synchronizing content of the source and corresponding target volumes of a replication session using the alternative asynchronous replication mode. Subsequently, when the amount of data differences between successive snapshots of a particular source volume is below a threshold level, then the source volume and corresponding volume pair can transition to the low RPO replication mode where the low RPO replication technique and optimizations as described herein can be performed at the member or individual volume pair level.

Figure 9:
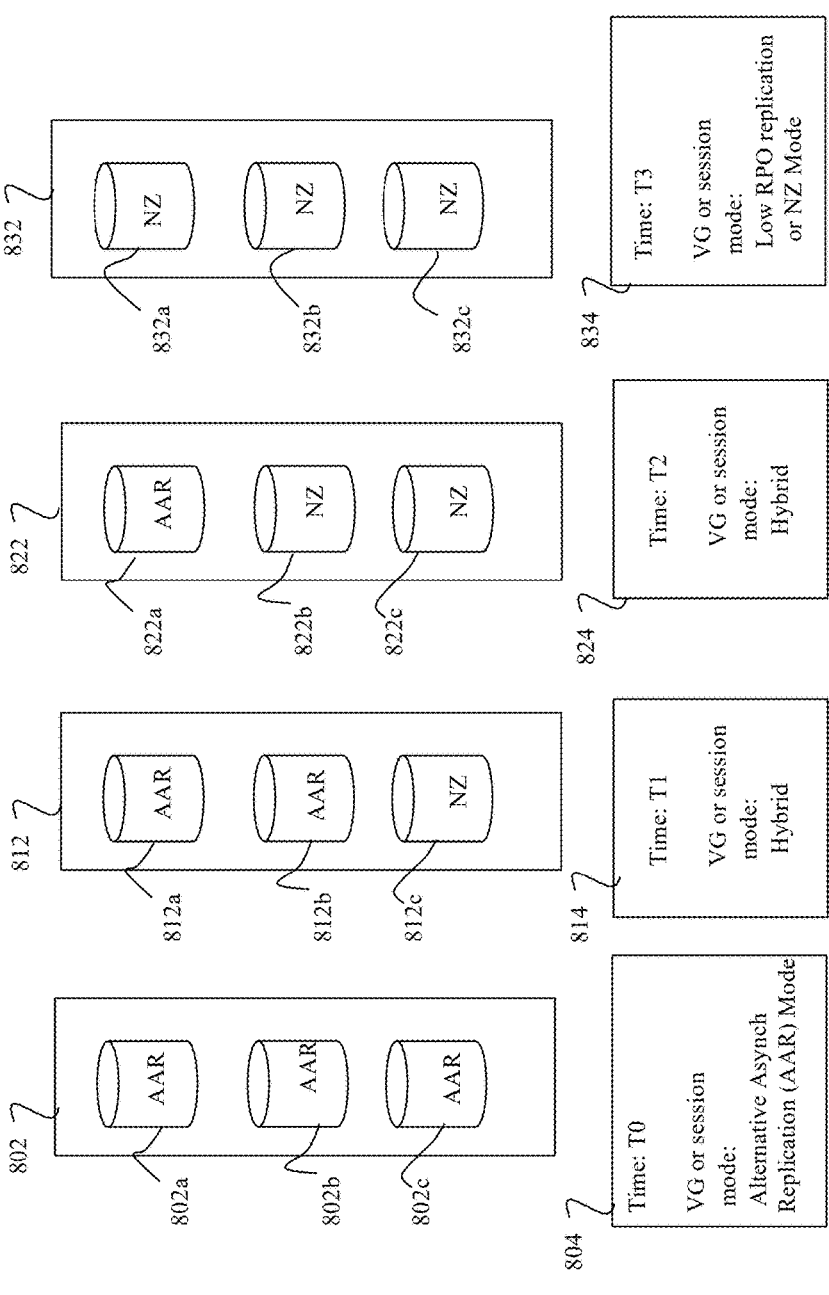

Referring to FIG. 9, shown is an example 800 illustrating the volume group (VG) or replication session mode or state and corresponding individual VG member modes or states in at least one embodiment in accordance with the techniques of the present disclosure.

The example 800 illustrates a source VG, VG1, with only 3 members for simplicity of illustration.

The element 802 illustrates the starting point or initial state of the 3 VG members of the VG1 enabled for low RPO replication at time TO. As denoted by 802, all 3 VG1 members 802*a-c* are in the "AAR" mode denoting the alternative asynchronous replication mode such as the legacy snapshot difference technique. The element 812 indicates at time T0, the VG or session mode is initially "AAR" denoting the alternative asynchronous replication or AAR mode.

The element 812 illustrates the replication mode or state of the individual 3 VG members of VG1 at a time T1 subsequent to T0 where the two VG members 812*a-b* are in the AAR mode, and where the VG member 812*c* has transitioned to the low RPO replication mode as denoted by "NZ". The element 814 indicates at time T1, the VG or session mode is hybrid denoting that one or more VG members of VG1 are in the AAR mode and one or more VG1 members are in the NZ or low RPO replication mode. Generally, the hybrid mode for the VG or session as in 814 indicates mixed replication modes among the VG members.

The element 822 illustrates the state of the 3 VG members of VG1 at a time T2 subsequent to T1 where the two VG members 822*a-b* have transitioned to the NZ or low RPO replication mode, and where the VG member 822*a* is in the AAR mode. The element 824 indicates at time T2, the VG or session mode is hybrid denoting that one or more VG members of VG1 are in the AAR mode and one or more VG members of VG1 are in the low RPO replication mode.

The element 832 illustrates the state of the 3 VG members of VG1 at a time T3 subsequent to T2 after all the VG members 832*a-c* have transitioned to the NZ or low RPO replication. The element 834 indicates at time T3, the VG or session mode is now in the low RPO replication mode since all VG members of VG1 have transitioned to the low RPO replication mode.

Thus, the example 800 illustrates the various states of the individual VG1 members (and thus corresponding individual volume pairs) as well as the VG or asynchronous replication session mode at various points in time as individual VG members (and corresponding individual volume pairs) transition from the alternative asynchronous replication mode or technique (e.g., denoted as AAR on VG1 members in the example 800) to the low RPO replication mode or technique (e.g., denotes as NZ on VG1 members in the example 800) at various points in time.

In at least one embodiment, when the VG and replication session is in the hybrid mode such as at times T1 and T2, there is no guarantee how long the switch or transition to the low RPO replication mode will take for all VG1 members and volumes pairs of the entire replication session.

If a failover or recovery operation needs to be performed when a VG or replication session is in the hybrid mode, there may not be a recent common base snapshot or recovery snapshot for the VG on both the source and target systems to use during the failover or recovery operation. In order to avoid the foregoing in at least one embodiment, the techniques of the present disclosure provide for updating the recovery snapshot or common base snapshot of the VG1 frequently while in the hybrid mode. In at least one embodiment, processing can be performed, such as by the control path (CP), to update the common base snapshot or recovery snapshot of VG1 while the volume group or replication session is in the hybrid mode. In at least one embodiment, the CP can be responsible for taking a snapshot of the VG1 in hybrid mode at each occurrence of a defined time period, such as every 5 minutes. In at least one embodiment, the defined time period such as 5 minutes may be the lowest RPO that can be specified by customers in connection with the alternative asynchronous replication mode or technique such as the legacy snapshot difference technique. In at least one embodiment, while in the hybrid mode, the replication session can behave as if it is a 5 minute RPO session and the CP can orchestrate creating an internal snapshot of VG1 (e.g., all source volumes of the VG1) and VG2 (e.g., all target volumes of VG2) every 5 minutes, where such internal snapshots of VG1 and VG2 can be used as common base recovery snapshots across the source and target systems.

In at least one embodiment, while in the hybrid mode, the replication session can behave as if it is a 5 minute RPO session and the CP can orchestrate i) creating an internal snapshot of the VG1 (e.g., all source volumes of the VG1) every 5 minutes, ii) replicating the VG1 snapshot to the target system, and iii) applying source volume level snapshots of the VG1 snapshot to corresponding target volumes of VG2 to generate target volume level snapshots included in a VG2 snapshot, where the VG1 snapshot and the VG2 snapshot can serve as a common base of recovery snapshots across the source and target systems. For each volume pair (V1, V2), the corresponding source volume level snapshot (e.g. snap V1) of VG1 and the corresponding target volume level snapshot (e.g., snap V2) of VG2 denote the same point in time copies where the content of V1 is identical to the content of V2, where snap V1 and snap V2 for a particular volume pair can be used as a common base of recovery snapshots.

The internal snapshot of the VG1 taken on the source system can denote a recovery or common base snapshot of the VG1 and can also be referred to as a snapset or set of snapshots of VG1 members to be copied or replicated from the source to the target system. In at least one embodiment, the VG1 snapshot or snapset taken on the source system can include a snapshot of each source volume of the VG1. For example with reference to FIG. 9 for a VG1 of 3 source volumes, the snapset creation initiated by the CP can include 3 snapshots, one for each source volume of VG1. When in the hybrid mode in at least one embodiment, each individual member snapshot of the snapset can be transferred from the source to the target system as part of copying or replicating performed by the low RPO replication technique or the alternative asynchronous replication technique, depending on the particular replication mode of each individual VG1 member or volume pair. In at least one embodiment for a hybrid VG1/replication session mode and for an individual VG1 member M1 or volume pair in the low RPO replication mode, a snapshot S1 of M1's source volume (where S1 is included in the snapset) can be transferred or replicated from the source to the target system by the data path (DP) or I/O path components used generally in connection with replicating content for the low RPO replication mode. In at least one embodiment for a hybrid VG1/replication session mode and for an individual VG1 member M2 or volume pair in the alternative asynchronous replication or AAR mode such as the legacy snapshot difference technique, a snapshot S2 of M2's source volume (where S2 is included in the snapset) can be transferred or replicated from the source to the target system by the control path (CP) components used generally in connection with replicating content for the alternative asynchronous replication mode. It should be noted that in connection with the AAR mode and technique, the DP of the source system can communicate with the DP of the source system to replicate snap set members to the target system. Thus for a hybrid VG although the CP can initiate and coordinate taking 5 minute RPO recovery snapshots of corresponding source and target volumes of the hybrid VG, copying or replicating the recovery snapshots of a snapset can be performed using either the alternative asynchronous replication technique or low RPO replication technique based on the individual VG member/volume pair replication mode.

Generally, for a snapshot Sn taken of a source volume SV where Sn denotes a replication related snapshot of SV, where Sn is included in a snapset, the content of Sn transferred can denote the content of the replication cycle of data differences or writes since the most recent prior replication related snapshot Sn-1. In at least one embodiment, both Sn and Sn-1 of SV can denote replication related snapshots that are recovery snapshots taken by the source system's CP at the defined time period such as every 5 minutes as noted above. In at least one embodiment, the CP of the source system can then coordinate and instruct the CP of the target system when to take corresponding replication related recovery target volume snapshots.

For example, a first VG1 member of a hybrid VG or replication session can be a source volume V1 that is i) in the alternative asynchronous replication mode and ii) has a snapset member snap A1 (denoting the snapshot of V1) that can be transferred or replicated from the source system to the target system under control of the source system CP as part of processing performed in connection with transferring delta sets or sets of data differences. In at least one embodiment, transferring snap A1 (a snapset member) can include i) the source system CP communicating with the DP to copy or replicate to the target system using the AAR replication technique the writes W9 made to the source volume V1 since the last or most recent 5 minute RPO replication related snapshot of V1 was taken; ii) applying the writes W9 to the corresponding target volume V2; and iii) taking a snapshot A2 of V2 on the target system after applying the writes W9. As a result of the foregoing the snap A1 of the source volume V1 is identical to the snapshot A2 of V2 taken after applying the writes W9 to V2. In the foregoing example, snapshot A1 of the source system and the snapshot A2 of the target system can denote recovery snapshots included in the common base for the replication session of VG1 (e.g., volume group of source volumes) and VG2 (e.g., volume group of target volumes). In at least one embodiment for V1 (and its corresponding volume pair) in the AAR or alternative asynchronous replication mode, processing to create or take the snapshot A1 can be performed at the appropriate points in the data stream of writes on the source system; and processing to create or take the snapshot A2 can be performed at the appropriate points in the replicated data stream of writes on the target system. In at least one embodiment with reference back to FIG. 6, creating or taking a recovery or other snapshot such as the snapshot A1 can be recorded as a time ordered entry in the log similar to that as discussed herein for transient snapshots. As a result, the source system can create a recovery snapshot A1 for V1 and can similarly coordinate creation of the recovery snapshot A2 of V2 on the target system.

A second VG1 member of the hybrid VG or replication session can be a source volume V11 that is i) in the low RPO replication mode and ii) has a snapset member snap B1 (denoting the snapshot of V11) that can be transferred or replicated from the source system to the target system by the I/O or data path (DP) that performs processing for low RPO replication in connection with transferring or copying deltas or sets of data differences. In at least one embodiment, transferring snap B1 (a snapset member) can include i) the source system DP copying or replicating to the target system using the low RPO replication technique the writes W19 made to the source volume V11 since the last or most recent 5 minute RPO replication related snapshot of V11 was taken; ii) applying the writes W19 to the corresponding target volume V12; and iii) taking a snapshot B2 of V12 on the target system after applying the writes W19. As a result of the foregoing the snap B1 of the source volume V11 is identical to the snapshot B2 of V12 taken after applying the writes W19 to V12. In the foregoing example, snapshot B1 of the source system and the snapshot B2 of the target system can denote recovery snapshots included in the common base for the replication session of VG1 (e.g., volume group of source volumes) and VG2 (e.g., volume group of target volumes).

In at least one embodiment for a source volume of a VG1 member in a particular member level replication mode, additional snapshots (e.g., replication related, internal, and/or user created) of the source volume can also be taken on the source system where management of such snapshots and content between such successive snapshots can also be transferred, copied or replicated to the target system using the corresponding replication technique based on the particular member level replication mode.

In at least one embodiment for the source volume V11 in the low RPO replication mode, processing to create or take the snapshot B1 can be performed at the appropriate points in the data stream of writes on the source system; and processing to create or take the snapshot B2 can be performed at the appropriate points in the replicated data stream of writes on the target system. In at least one embodiment with reference back to FIG. 6, creating or taking a recovery or other snapshot such as the snapshot B1 can be recorded as a time ordered entry in the log similar to that as discussed herein for transient snapshots. As a result, the source system can create a recovery snapshot B1 for V11 and can similarly coordinate creation of the recovery snapshot B2 of V12 on the target system.

Thus in at least one embodiment for a hybrid VG, each individual snapset member (e.g., snapshot of a source volume of a VG1 member) can be transferred by either i) using the AAR technique or ii) using the low RPO replication technique depending on the particular current individual replication mode corresponding to the snapset member (e.g., the individual replication mode of a snapset member can be that of the individual VG1 member or volume pair corresponding to the snapset member). If a snapset member is transferred by the DP of the source system using the low RPO replication technique, the source system DP can notify the CP of the source system when such transfer is complete. In this manner, the CP of the source system can track and know when all members of the snapset have been transferred from the source system to the target system.

Once the snapset has been transferred from the source system to the target system, the CP of the source system can notify the CP of the target system. In response to receiving the notification, the CP of the target system can build the snapset on the target system to serve as the common base used by the target system. In at least one embodiment, each snapset can have a unique signature, where each member snapshot of the snapset can be tagged with the same unique signature. In at least one embodiment, the unique signature can be included in each member snapshot. For example in at least one embodiment, the unique signature can include any of: a time stamp, a unique snapset identifier (ID), and/or information identifying the snapshot as a user-created snapshot or an internal snapshot. The internal snapshot can be created by the storage system and used only internally by the storage system (e.g., not exposed or used externally outside the storage system). The replication related snapshots of the snapset used as a common base for recovery snapshots can be examples of such internal snapshots on both the source and target systems each having the same unique snapset ID to allow processing to determine the particular snapshots included in the same snapset, common base or set of recovery snapshots on the source and target systems.

Figure 10:
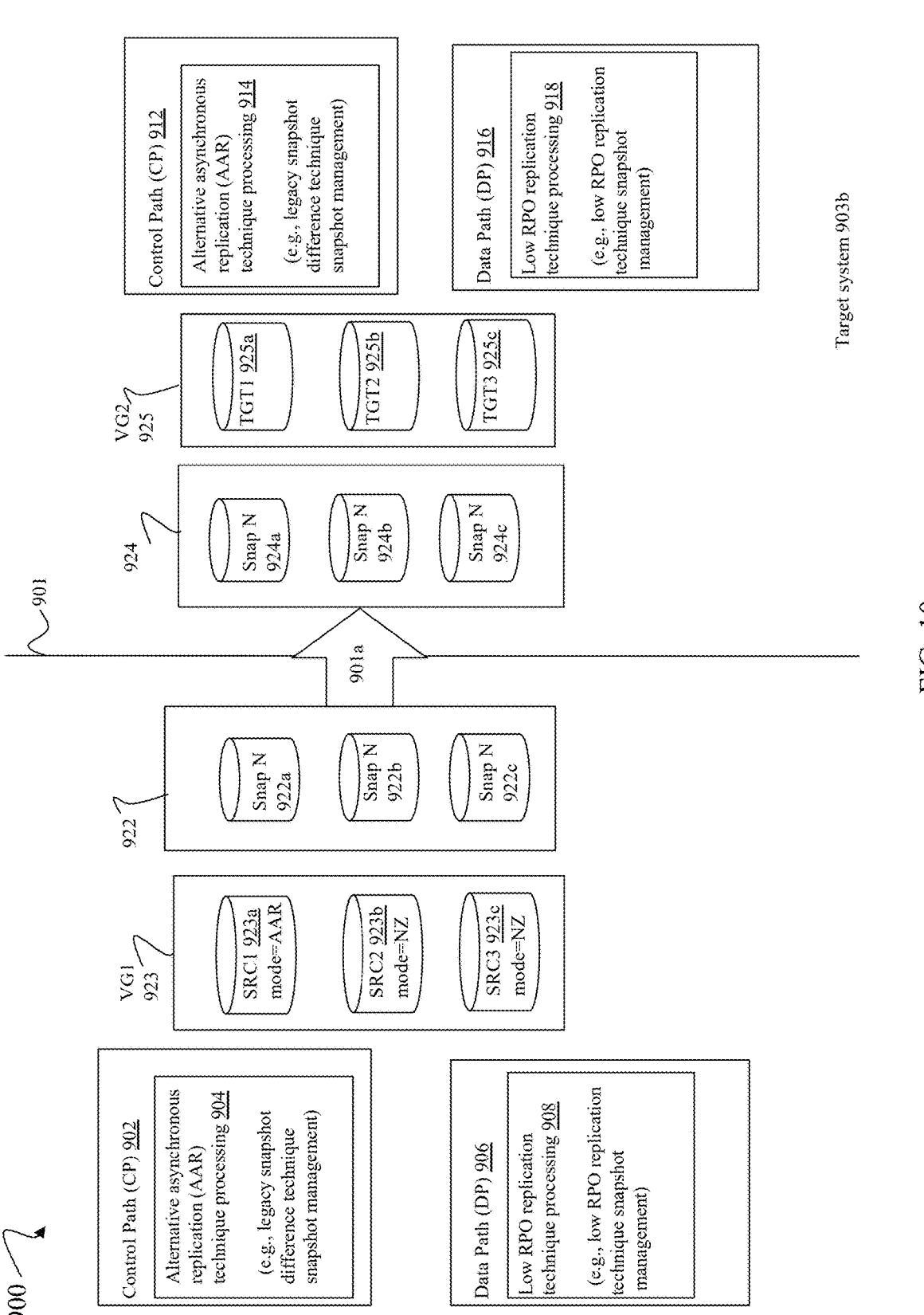

Referring to FIG. 10, shown is an example 900 illustrating use of the techniques of the present disclosure in at least one embodiment in connection with recovery snapshots of a snapset serving as a common base for a replication session in hybrid mode.

The example 900 includes the line 901 where components to the left of line 901 can be included in the source system 903a and components to the right of line 901 can be included in the target system 903b (also sometimes referred to as the disaster recovery (DR) system or site). The source system 903a includes the control path or CP 902, the data path or DP 906, the source volumes 923 of a VG1 in hybrid mode such as at time T2 as in FIG. 9, and the snapset 922 including snapshots 922a-c for 3 corresponding source volumes 923a-c of the VG1 923 in hybrid mode. The target system 903b includes the CP 912, the DP 916, the target volumes 925 of the VG2 in hybrid mode, and the snapset 924 including snapshots for the 3 corresponding target volumes 925a-c of the VG2 in hybrid mode. The source volume 923a and target volume 925a can denote a first corresponding volume pair X1 of the hybrid VG1/replication session where X1, 923a and 925a are in the AAR mode; the source volume 923b and target volume 925b can denote a second corresponding volume pair X2 of the hybrid VG1/replication session where X2, 923b and 925b are in the NZ or low RPO replication mode; and the source volume 923c and target volume 925c can denote a third corresponding volume pair X3 of the hybrid VG 1/replication session where X3, 923c and 925b are in the NZ or low RPO replication mode. The snapset 924 includes snapshots 924a-c of the 3 corresponding target volumes 925a-c.

The snapsets 922, 924 can form the common base or recovery snapshots for the VG1 923 and VG2 925.

On the source system 903a, the snapshot 922a can be recovery snapshot N of source volume SRC1 923a, the snapshot 922b can be the recovery snapshot N of source volume SRC2 923a, and the snapshot 922c can be recovery snapshot N of the source volume SRC3 923c. On the target system 903b, the snapshot 924a can be recovery snapshot N of target volume TGT1 925a, the snapshot 924b can be the recovery snapshot N of target volume TGT2 925b, and the snapshot 924c can be recovery snapshot N of the target volume TGT3 925c. The snapshots 922a and 924a can denote identical content or point in time copies of respective volumes 923a, 925a, whereby the snapshots 922a, 924a denote identical point in time copies of identical content. The snapshots 922b and 924b can denote identical content or point in time copies of respective volumes 923b, 925b, whereby the snapshots 922b, 924b denote identical point in time copies of identical content. The snapshots 922c and 924c can denote identical content or point in time copies of respective volumes 923c, 925c, whereby the snapshots 922c, 924c denote identical point in time copies of identical content.

The CP 902 can be responsible for updating the common base of recovery snapshots for the hybrid VG or replication session such as every 5 minutes in efforts to maintain a 5 minute RPO during the transition of the replication session and VG to the low RPO replication mode while the replication session and VG are in hybrid mode. The element 904 of the CP 902 can include one or more components that perform processing for the AAR replication technique or mode such as the legacy snapshot difference technique. In at least one embodiment, the CP 912 of the target system 903b can include components 914 similar to 904 of the source system 903a. Thus the AAR replication processing technique components 904 can perform processing to i) communicate with the DP 906 to copy or replicate any needed writes or updated content for the recovery snapshot N 922a of SRC1 923a since the last or most recent 5 minute RPO recovery snapshot N-1 of SRC1 923a; and then ii) initiate creation of a corresponding recovery snapshot 924a of the corresponding target volume 925a by the CP 912 (e.g., by components of 914) of target system 903a after applying the updated content since the most recent 5 minute RPO recovery snapshot N-1 of the source volume SRC1 923a. In at least one embodiment, the AAR component 904 can control or drive the AAR technique processing and can also communicate as needed with other components of the DP 906 to effect the actual copying of writes or updated content. For example in at least one embodiment, components of the DP 906 that perform the copying or replicating of content from the source to the target system can be used in connection with both the AAR replication technique and the low RPO replication technique.

The element 908 of the DP 906 can include one or more components that perform processing for the low RPO replication technique or mode described herein. In at least one embodiment, the DP 916 of the target system 903b can include components 918 similar to 908 of the source system 903a. Thus the low RPO replication technique components 908 can perform processing to i) copy or replicate any needed writes or updated content for the recovery snapshot N 922b of SRC2 923b since the last or most recent recovery snapshot N-1 of SRC2 923b; and then ii) initiate creation of a corresponding recovery snapshot 924b of the corresponding target volume 925b by the DP 916 (e.g., by components of 918) of target system 903a after applying the updated content since the most recent 5 minute RPO recovery snapshot N-1 of the source volume SRC2 923b. Additionally, the low RPO replication technique components 908 can perform processing to i) copy or replicate any needed writes or updated content for the recovery snapshot N 922c of SRC3 923c since the last or most recent recovery snapshot N-1 of SRC3 923c; and then ii) initiate creation of a corresponding recovery snapshot 924c of the corresponding target volume 925c by the DP 916 (e.g., by components of 918) of target system 903a after applying the updated content since the most recent 5 minute RPO recovery snapshot N-1 of the source volume SRC3 923c.

In this manner in at least one embodiment for a VG or replication session in hybrid mode, the techniques of the present disclosure provide for replicating or transferring member snapshots, including the 5 minute RPO recovery snapshots, using either the AAR replication technique (if the member has a corresponding AAR replication mode), or the low RPO replication technique (if the member has a corresponding low RPO replication mode).

In at least one embodiment with reference back to FIG. 9, when the VG1 is in the AAR replication mode such as at time T0, a group level snapshot of the source volumes can be obtained as a snapset used for recovery where the snapset is transferred or replicated to the target system using the AAR replication technique.

In at least one embodiment with reference back to FIG. 9, when the VG1 is in the low RPO replication mode such as at time T3, a group level snapshot of the source volumes can be obtained as a snapset used for recovery where the snapset is transferred or replicated to the target system using the low RPO replication technique.

With reference now again to FIG. 10, what will now be described in connection with FIG. 11 is a flowchart 950 of processing steps that can be performed in at least one embodiment in accordance with the techniques of the present disclosure in connection with the example 900 to obtain recovery snapshots, such as 922a-c and 924a-c with a 5 minute RPO on systems 903-b, where such recovery snapshots 922, 924 can be used as a common base for recovery when the replication session of the example 900 is in hybrid mode. Consistent with other discussion herein, the common base includes identical snapshots or point in time copies of corresponding source and target volumes on both the source system 903a and target system 903b. Generally, the flowchart 950 summarizes processing discussed above.

At a first step S101, the CP 902 can take or create successive group level snapshots of the VG1 at each 5 minute RPO time interval while the replication session and thus VG1 is in hybrid mode. The step S101 can include taking a group level snapshot of the source volumes 922a-c at each 5 minute RPO time interval. Assume that the snapset 922 denotes the Nth such snapset or group level snapshot taken of the source volumes 922a-c with the 5 minute RPO while the replication session and VG1 is in hybrid mode. From the step S101, control proceeds to the step S102.

At the step S102, each of the snapshots or members 922a-c of the snapset 922 can be transferred, copied or replicated (901a) from the source system 903a to the target system 903b using either the AAR technique or the low RPO replication technique depending on the particular replication mode associated with each snapset member 922a-c. For example, the source volume 923a or volume pair X1 corresponding to snapshot 922a is in the AAR mode so that the snapshot 922a can be replicated from the source system 903a to the target system 903b using the AAR technique as controlled by components 904 of the CP 902. For example, the source volume 923b or volume pair X2 corresponding to snapshot 922b is in the low RPO replication mode so that the snapshot 922b can be replicated from the source system 903a to the target system 903b using the low RPO replication technique as controlled by the components 908 of the DP 906. For example, the source volume 923c or volume pair X3 corresponding to snapshot 922c is in the low RPO replication mode so that the snapshot 922c can be replicated from the source system 903a to the target system 903b using the low RPO replication technique as controlled by the components 908 of the DP 906.

In at least one embodiment, when each of the member snapshots 922a-c of 922 is transferred in the step S102 to the target system 903b, corresponding snapshots 924a-c can be created for respective target volumes 925a-c, where such corresponding snapshots 924a-c have the same unique signature as all members of the snapset 922.

In at least one embodiment, transferring or replicating a snapshot, such as any recovery snapshot of 922, where the snapshot can be recovery snapshot Sn of a source volume SRC, can include: i) transferring or replicating to the target system any writes or updated content W1 since the most recent prior recovery snapshot Sn-1; ii) applying the writes or updated content W1 to a corresponding target volume TGT; and iii) taking or creating a snapshot Sm of the corresponding target volume TGT after applying the writes or updated content W1. As a result of the foregoing Sm can be included in the snapset of recovery snapshots on the target system, where Sn and Sm denote a same point in time copy or identical content. Put another way for a volume pair (SRC, TGT) configured for asynchronous replication in a replication session where SRC is included in the source volume group VG1 and where TGT is included in the target volume group VG2, Sn denotes a first point in time copy of SRC and Sm denotes a second point in time copy TGT, where the foregoing first point in time copy of SRC and second point in time copy of TGT are identical/denote identical content. Thus generally the writes or updated content W1 can denote the data changes, writes or differences in a single replication cycle between successive recovery snapshots, such as Sn and Sn-1, taken of a source volume such as SRC.

In at least one embodiment, the step S102 can include transferring or replicating W1 and creating the corresponding recovery snapshot Sm on the target system using the low RPO replication technique if the corresponding source volume and volume pair are in the NZ or low RPO replication mode.

In at least one embodiment, the step S102 can include transferring or replicating W1 and creating the corresponding recovery snapshot Sm on the target system using the AAR replication technique if the corresponding source volume and volume pair are in the NZ or AAR replication mode.

From the step S102, control proceeds to the step S103.

At the step S103, CP 902 can be notified when the snapset 922 has been transferred from system 903a to system 903b. For those snapset members 922b-c transferred by the low RPO replication components 908 of the DP 906, the DP 906 of the source system 903a can notify the CP 902 of the source system when such snapset members 922b-c have been transferred to the target system 903b. From the step S103, control proceeds to the step S104.

At the step S104, responsive to the transfer of all snapset members 922a-c, the CP 902 of the source system 903a can notify the CP 912 of the target system 903b regarding transfer completion of the member snapshots 922a-c of the snapset 922 such that the target system 903b has corresponding snapshots 924a-c with the same unique snapset signature as snapshots 922a-c of 922. From the step S104, control proceeds to the step S105.

At the step S105, the CP 912 of the target system 903b can build the snapset 924 on the target system 903b. The snapsets 922 and 924 can denote respective group level snapshots of VG1 and VG2 taken at a same point in time where the snapsets 922 and 924 can serve as a common base of recovery snapshots that can be used in connection with performing recovery processing or failover processing.

In at least one embodiment, there can be many more snapshots on the system 903b than as illustrated by 924. As a result, the step S105 can include the target system performing processing to search existing snapshots of the target system 903b for snapshots matching a particular snapshot signature denoting a particular common base of recovery snapshots. In this example, the snapset 922 can have a unique signature that can be encoded in each member snapshot 922a-c where the unique signature can denote a particular common base of recovery snapshots for the replication session and associated VGs, VG1, VG2. The unique signature can be communicated from the source system 903a to the target system 903b such as, for example, by the CP 902 of the source system 903a in the step S104 as part of the notification to the target system 903b. In at least one embodiment, when each of the member snapshots 922a-c of 922 is transferred (e.g., in the step S102) to the target system 903b, corresponding snapshots 924a-c can be created for respective target volumes 925a-c, where such corresponding snapshots 924a-c have the same unique signature as all members of the snapset 922. In at least one embodiment, the step S105 can include searching snapshots of the system 903a for corresponding snapshots 924-c matching the desired unique signature of the snapset 922, where such matching snapshots 924a-c can form the snapset 924 of the system 903b. The step S105 can include the target system forming the snapset 924 with the same unique snapset signature as the snapset 922. Thus the snapsets 922 and 924 can form a common base of recovery snapshots on the systems 903a-b where the common base snapshots can be used as may be needed for subsequent recovery or failover processing such as, for example, when a failed one of the system 902a-b is rebooted and performs processing to synchronize content of VG members with the other remaining system. For example, the common base of the failed and now rebooted system A can be used to denote a point in time from which content is copied from the other system B in order to restore the VG members on the system A. The snapsets 922 and 924 can form a single group level snapshot of the VG across both systems 902a-b.

For a first volume pair configured from SRC1 923a and TGT1 925a, the member snapshot 922a can be snapshot N of SRC1 923a of the system 903, the member snapshot 924a can be snapshot N of TGT1 925a, where the snapshots 922a, 924a denote the same point in time copies of the SRC1 923a.

For a second volume pair configured from SRC2 923b and TGT2 925b, the member snapshot 922b can be snapshot N of SRC2 923b of the system 903, the member snapshot 924b can be snapshot N of TGT2 925b, where the snapshots 922b, 924b denote the same point in time copies of SRC2 923b.

For a third volume pair configured from SRC3 923c and TGT3 925c, the member snapshot 922c can be snapshot N of SRC3 923c of the system 903, the member snapshot 924c can be snapshot N of TGT3 925c, where the snapshots 922c, 924c denote the same point in time copies of SRC3 923c.

Figure 12A:
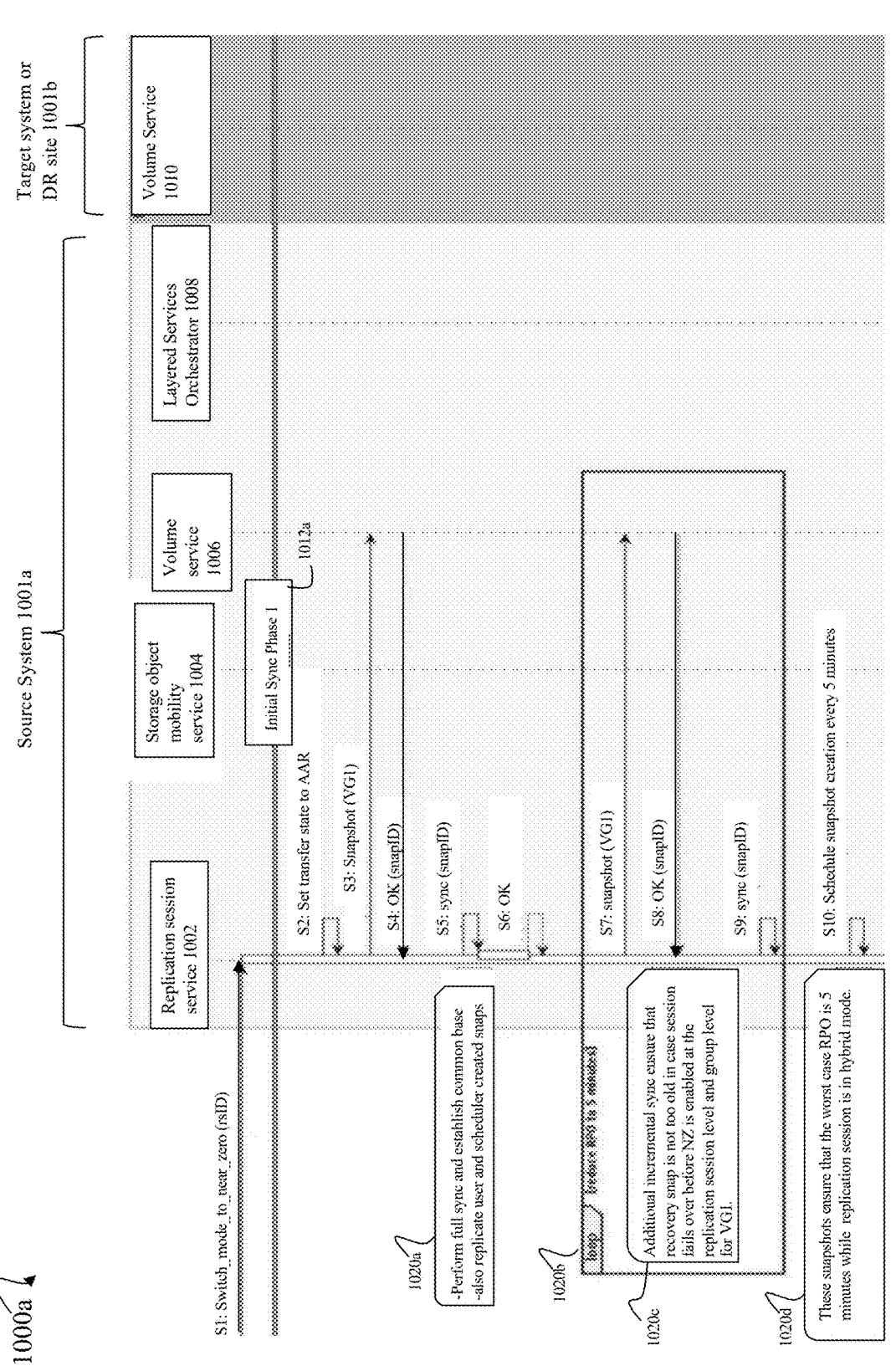
FIGS. 12A, 12B and 12C illustrate a sequence diagram of processing steps that can be performed in at least one embodiment in accordance with the techniques of the present disclosure.
Figure 12B:
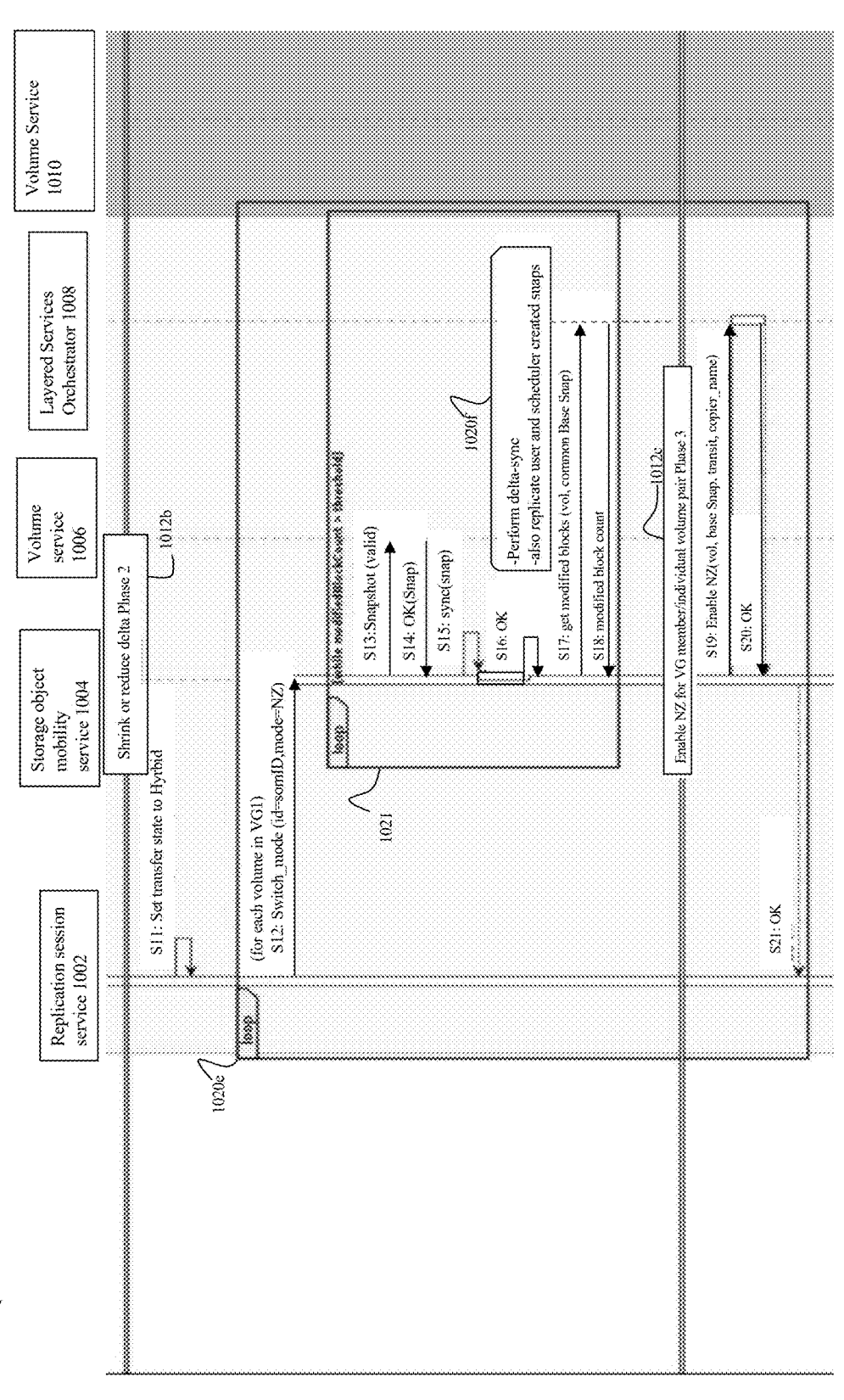
Figure 12C:
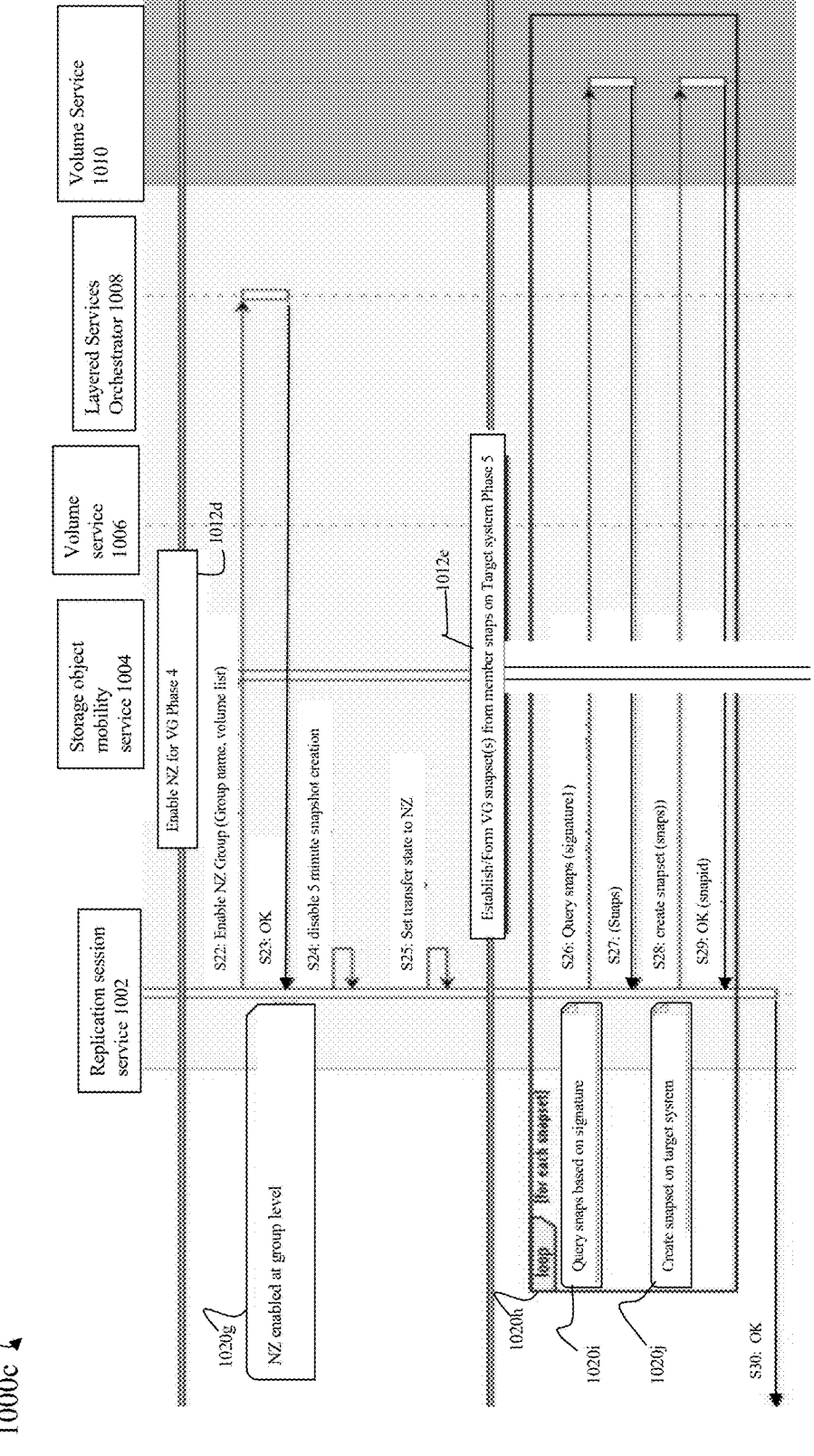

Referring to FIGS. 12A, 12B and 12C, shown is a sequence of diagram 1001a-c illustrating steps that can be performed in at least one embodiment in accordance with the techniques of the present disclosure The sequence diagram 1001a-c illustrates in more detail 5 phases that can be performed in at least one embodiment in connection with transitioning a replication session configured for asynchronous replication to the low RPO or NZ replication mode.

The initial synchronization or sync phase 1 in at least one embodiment can include the steps S2-S10 discussed below. The shrink or reduce delta phase 2 in at least one embodiment can include the step S11-S18 discussed below. The enable NZ or low RPO replication phase 3 for an individual VG1 member or individual volume pair in at least one embodiment can include the steps S19-21 discussed below. The create NZ or low RPO replication phase 4 at the group level for the VG1 in at least one embodiment can includes the steps S22-S25 discussed below. Establishing or forming the one or more VG2 snapsets on the target system or DR site can be performed in a phase 5 in at least one embodiment that includes the steps S26-S30 discussed below.

The sequence diagram 1001a-c illustrates processing performed in connection with communications between various components or modules in at least one embodiment.

In at least one embodiment, the replication session service 1002, the storage object mobility (SOM) service 1004 and the volume service 1006 can be included in the CP of the source system 1001a. In at least one embodiment, the layered services orchestrator (LSO) 1008 can be included in the DP of the source system 1001a. In at least one embodiment, the volume service 1010 can be included in the CP on the target system 1001b.

The SOM service 1004 can provide storage element pair level mobility capabilities and APIs for data mobility operations such as, for example, for mirroring or copying operations. For example, as described elsewhere herein, each volume pair of source volume V1 and a target volume V2 of a replication session can be configured where V1 is included in the source system 1001a and V2 is included in the target system 1001b.

In this manner, the SOM service 1004 can interact with other services of the CP and/or DP on the source system 1001a such as, for example, the LSO 1008 as discussed below.

The volume service 1006, 1010 can orchestrate or control performing various volume services or operations such as taking or creating a snapshots.

In the step S1, a request can be received by the replication session service 1002 to switch or transition the asynchronous replication session for the source volume group VG1 to the low RPO replication mode. Subsequent processing of the sequence diagram discussed below can be performed to switch or transition the VG1, and corresponding replication session, to the low RPO replication mode and also provide a common base of snapsets on the systems 1001a-b to be used for recovery purposes during the transition of the replication session to the low RPO replication mode. The processing of the remaining steps of the sequence diagram can be performed responsive to the replication session service 1002 receiving the request in the step S1. Responsive to the replication session service 1002 receiving the request in the step S1, the initial synchronization or sync phase 1 1012a can be performed.

In at least one embodiment for each volume pair (V1, V2) of a replication session where V1 is a source volume V1 of the source volume group VG1 of the source system and where V2 is a target volume of the target volume group VG2 of the target system, at the start or initial point of the asynchronous replication session, the target volume V2 can have no content stored thereon. As a result, the initial synchronization phase 1 1012a can perform, for each volume pair, an initial synchronization of V1 and V2 that can include copying or replicating all existing content from V1 to V2. In at least one embodiment, a bitmap of V1 can be used that tracks and indicates which blocks of V1 have been written to since V1 creation. The bitmap can include a corresponding bit or entry for each block of V1 where the bit corresponding to a particular block can include a value of 1 if the block has been written to and needs to be copied, and otherwise can include a value of 0 (denoting that the particular block has not been written to and does not need to be copied).

In response to the replication session service 1002 receiving the request (S1) to switch the replication session configured for asynchronous replication to the low RPO replication mode, the service 1002 can perform processing in the step S2 to set the replication session and VG1 group level replication mode to AAR and accordingly also set each individual VG1 member and volume pair to have an individual member level replication mode of AAR such as denoted at time T0 in connection with 802 and 804 of FIG. 9.

Following the step S2, the steps S3-S4 can be performed to take a group level snapshot of source volumes of the VG1. The replication session service 1002 can issue a request (S3) to the volume service 1006 to take the group level snapshot. In response, the volume service 1006 can return a response (S4) to the replication session service.

The group snapshot of the source volumes of VG1 taken in the step S3 can capture all existing content of all source volumes of the VG1. In at least one embodiment, the group snapshot of the source volumes of VG1 taken in the step S3 can denote an initial snapshot snap 0 of each source volume of VG1 where such initial snapshots of source volumes can be used in subsequent processing in the shrink or reduce delta phase 2 discussed below. For example, consider a source volume V1 of VG1 having a snapshot snap 0 included in the group snapshot taken in the step S3. In at least one embodiment, the foregoing snap 0 of V1 can be used in connection with subsequent snapshot based delta synchronizations or delta synes of the source volume V1 as part of processing to transition V1 and the corresponding volume pair from the AAR replication mode to the low RPO replication mode. Sometimes the foregoing snap 0 of V1 as well as other snapshots used in connection with performing delta syncs can be referred to as synchronization snapshots, sync snapshots or delta sync snapshots to distinguish from other snapshots such as recovery snapshots based on usage in connection with the technique of the present disclosure.

Following the step S4, the replication session service 1002 can perform the steps S5-S6. The steps S5-S6 can be performed to copy or replicate the group level snapshot of the source volumes of VG1 taken in the step S3 to the target system. In at least one embodiment, the snapshot taken in the step S3 can capture all existing content of all source volumes which is then replicated or copied to corresponding target volumes of VG2 on the target system. Thus the step S5 performs a full synchronization of source volumes of VG1 and corresponding target volumes of VG2 to establish a common base of content (1020a) that can be used in connection with computing subsequent data differences or delta sets of subsequent corresponding snapshots. The step S5 can include replicating the initial snapshots of the source volumes of the VG1 (e.g., taken in the step S3) to the target system using the AAR replication technique. In at least one embodiment, the step S5 can also include replicating any additional user and scheduler created snapshots chronologically (1020a).

Following the step S6, the steps S7-S9 (1020*b*) can be repeatedly performed in order to perform additional delta syncs to achieve an initial RPO of 5 minutes for the VG1 (1020*c*). Writes to the VG1 can be ongoing during this process while the VG1 and its members transition from the AAR replication mode to the low RPO replication mode. As such, there can be additional data written to the source volumes of the VG1 while the step S5 is performed (for the full data synchronization of source volumes of VG1 and target volumes of VG2), where at least some such writes can be further replicated or copied to the target system in connection with the added delta synes performed in the loop 1020*b*.

In a first iteration of the loop 1020*b* formed by the steps S7-S9, the step S7 can include: i) taking an additional successive group level snapshot snap 1 of the source volumes VG1, ii) determining the delta set of writes or updated content W1 made to the source volumes VG1 in the current replication AAR replication cycle between successive snapshots snap 0 (e.g., taken at step S3) and snap 1; iii) replicating the writes or updated content W1 made to the source volumes VG1 in the current replication AAR replication cycle from the source to the target system; iv) applying the writes or updated content W1 to corresponding target volumes of the VG2; and v) taking a group level snapshot of corresponding target volumes of the VG2 on the target system after applying the updated content or writes W1 to the corresponding target volumes of the VG2.

Generally, the steps S7-S9 (1020*b*) can be repeated a suitable number of times to replicate writes or updated content to the source volumes of the VG1 that occurs between successive snapshots N and N+1 in efforts to initially establish a 5 minute RPO for the VG1.

In at least one embodiment, the replication session service 1002 can issue a request (S7) to the volume service 1006 to take the group level snapshot with respect to the source volumes of the VG1. In response the volume service 1006 can take the requested group level snapshot and return to the replication session service 1002 a response (S8) indicating successful completion of the request. In the step S9, the replication session service 1002 can trigger synchronization of the source volumes of VG1 and the target volumes of VG2 where the latest snapshots of the source volumes VG1 can be replicated to the target system using the AAR replication technique.

Following the step S9, the step S10 can be performed by the replication session 1002 included in the CP of the source system 1001*a* to schedule taking or creating a group level snapshot of the VG1 with an RPO of 5 minutes such that a group level snapshot of the VG1 is created as a common base on both the source and target system every 5 minutes. As denoted by 1020*d*, scheduling the foregoing in the step S10 can ensure that the worst case scenario RPO is 5 minutes while the replication session is in the hybrid mode as set in the next phase 2 1012*b*. Following the step S10 is the step S11 included in the shrink or reduce delta phase 2 1012*b*.

In the shrink delta phase 1012*b*, initially each volume pair of the replication session can be in the AAR replication mode where the alternative asynchronous replication technique can be performed to determine delta sets of data differences between successive snapshots of the corresponding source volume V1 and then replicate or copy such data differences of the delta sets to the target system for application to V2.

Generally, this phase 2 1012*b* performs processing to reduce the delta set of data differences between successive delta sync snaps of each individual source volume V1 of the VG1, where V1 can have a corresponding target volume V2 on the target system. The processing of phase 2 discussed below can be performed independently for each individual source volume V1 or volume pair to facilitate transitioning the individual VG1 members or volume pairs from AAR to NZ or low RPO replication mode. For a source volume V1, processing can include: i) taking a snapshot snap N of V1; ii) determining a delta set of data differences (e.g., write or changed content) between successive delta sync snapshots snap N and snap N-1 of V1; iii) the delta set of data differences can be copied from the source system to the target system and applied to V2; and iv) an evaluation can be made to determine whether the size of the delta set of data differences is greater than a threshold size. For example, the size or amount of data differences can be a block count denoting the number of data blocks of content in the delta set of data differences. In this manner the block count can denote the number of data blocks to be copied or replicated. If the block count is greater than the threshold, then another snapshot N+1 of V1 can be taken and a next delta set of data differences can be determined based on the data differences between snapshot N+1 of V1 and snapshot N of V1 where the foregoing copying of the data differences and evaluation of the size of the data differences can be repeated. Otherwise (if the block count is not greater than the threshold), then the member V1 and its corresponding volume pair can transition to the low RPO replication mode where the low RPO replication technique and optimizations as described herein can be performed. Generally, the foregoing can be repeated for each source volume while the number of blocks in the most recent delta set of data differences between successive delta sync snapshots of V1 is greater than the threshold, where the source volume and its corresponding volume pair remain in the alternative asynchronous replication mode. Once the number of blocks of the most recent delta set of data differences is less than or equal to the threshold, the source volume and corresponding volume pair can transition to the low RPO replication mode where the low RPO replication technique and optimizations described herein can be performed to subsequently replicate changed or written content of V1 to the target system.

In the step S11, the replication session service 1002 can update the VG1 or replication mode to hybrid. Following the step S11, the processing of the loop 1020*e* (e.g., including steps S12-21) can be performed for each VG1 member. In at least one embodiment based on the sequence diagram, processing can update the VG1 or replication mode to hybrid in the step S11 even though no VG1 member has yet transitioned to the low RPO replication mode. As a variation in at least one embodiment, the VG1 group level and replication session mode can be updated from AAR to hybrid after a first VG1 member has transitioned at the member level to the low RPO replication mode. Following the step S11, the step S12 can be performed for each VG1 member or each volume pair, to initiate a call from the replication session service 1002 to the storage object mobility (SOM) service 1004 to perform processing to switch or transition the VG1 member and corresponding volume pair from the AAR replication mode to the low RPO replication mode. The steps S13-S18 (1021) can be performed for each VG member or volume pair in response to the SOM service 1004 receiving the switch request (S12) for the particular VG member or volume pair.

The steps S13-S18 can form a loop 1021 that can be repeatedly performed until the size of the current delta set of data differences between successive snapshots of a source volume V1 of the VG1 member is less than or equal to the threshold size. The steps S13-S14 can take a next snapshot N of V1. The steps S15-S16 can i) determine the delta set of data differences between snapshots N and N-1 of V1; ii) use the AAR technique to copy or replicate the delta set of data differences to the target system and apply the delta set to the corresponding target volume V2; and iii) take a snapshot N of V2 on the target system, where snapshot N of V2 denotes the same point in time copy as the snapshot N of V1. In at least one embodiment, the steps S15-S16 can also replicate any additional user and/or scheduler created snapshots of V1. In the steps S17-18, the modified block count can be obtained denoting the size of the delta set which in this example is the number of data blocks in the delta set just copied or replicated.

As discussed above for each VG1 member or source volume, the processing of the loop of steps S13-S18 can be repeated while the modified block count of the delta set for the current iteration is greater than the threshold. The SOM service 1004 can issue a request (S13) to the volume service 1006 take or create a snapshot of the source volume of the VG1. The volume service 1006 can take the requested snapshot and return a response (S14) to the SOM service 1004 indicating successful completion of the request (S13). The SOM service 1004 can then perform the delta sync operation (S15, S16) to synchronize content of the source and corresponding target volume. In at least one embodiment, the foregoing delta sync operation can replicate (using the AAR replication technique) the latest or most recent snapshot N of the source volume to the target system by replicating the delta set of data differences (e.g., changed or written content) between snapshot N and N-1 of the source volume to the target system and then applying the delta set to the corresponding target volume. As denoted by 1020f in at least one embodiment, the delta sync operation (S15) can also replicate any other user and scheduler created snaps for the particular source volume. In the step S17, the SOM service 1004 can query the LSO 1008 for the modified block count that is returned in the step S18.

Once processing breaks out of the loop of steps S13-S18 when the modified block count of a delta synch delta set is less than or equal to the threshold, control proceeds to the step S19 of the enable NZ or low RPO replication phase 3 1012c for the corresponding individual VG1 member (e.g., source volume) and corresponding volume pair. In the steps S19-S20, the low RPO replication mode can be enabled for the corresponding individual VG1 member or source volume whose modified block count just evaluated is less than or equal to the threshold. In the step S19, the SOM service 1004 can issue a request to the LSO 1008 to enable the NZ or low RPO replication mode for the particular VG1 member. In response, the LSO 1008 can issue a reply (S20) to the SOM service 1004 indicating successful completion of the request. Thus the step S19 provides for the CP of the source system notifying the DP of the source system to perform asynchronous replication using the low RPO replication technique such as discussed elsewhere herein. From the step S20, control returns (S21) from the SOM service 1004 to the replication session service 1002.

Thus, the steps S12-S21 can be performed for each individual VG1 member or source volume independently of all other VG1 members to allow the individual VG1 members to transition from the member level AAR replication mode to the member level NZ or low RPO replication mode. In this manner, each individual VG1 member and its corresponding volume pair can progress or transition to the low RPO replication mode at its own corresponding rate based on the amount of data differences or changes (e.g., writes) each delta sync cycle performed in the loop of the steps S13-S18. For example, a first VG1 member having a source volume that is not frequently written to can transition to the low RPO replication mode prior to a second VG1 member that is more frequently written to.

In at least one embodiment, the step S12 and processing of the loop 1020e can be performed in parallel for multiple VG1 members. For example, the replication service 1002 can issue a request in the step S12 for each VG1 member to generally trigger remaining processing of loop 1020e to be performed for each VG1 member. The service 1002 can generally wait for completion of step S21 for each VG1 member before continuing to the next phase 4 1012d.

Once the processing of the steps S12-S21 is performed for each VG1 member such that each VG1 member has transitioned to the member level low RPO replication mode, control proceeds to the step S22 of phase 4 1012d. Once all VG1 members and thus all volume pairs of the current replication session are in the low RPO or NZ replication mode, the VG1 (at the group level) and the replication session can transition to the NZ or low RPO replication mode in phase 4 1012d.

As noted above, phase 4 includes steps S22-S25 to enable the NZ or low RPO replication mode for the replication session and also at the group level for the VG1.

At the step S22, the replication session service 1002 of the source system CP can issue a request the LSO 1008 of the source system DP to enable the low RPO replication mode at the group level for the VG1. In the step S23, the LSO 1008 can issue a reply to the replication session service 1002 indicating successful completion of the request from the step S22. Following the step S23, the NZ or low RPO replication mode is enabled for the VG1 and thus all VG1 members and corresponding volume pairs as denoted by 1020g. Following the step S23, control proceeds to the step S24.

At the step S24, the replication session service 1002 can disable the 5 minute RPO recovery snapshots of the VG. The step S24 generally undoes the scheduled 5 minute RPO recovery snapshots by the CP in the step S10. In the step S25, the transfer state for the VG1 and replication session within the CP can be set to NZ or the low RPO replication mode.

Once the phase 4 1012d has completed, control proceeds from the step S25 to the step S26 of phase 5 1012c. In at least one embodiment, the replication session service 1002 of the CP on the source system can query (S26, 1020i) the snapshots on the target system or DR site to identify the corresponding snapset members (S27) with a particular unique snapset signature. Subsequently, the source system CP can instruct the target system or DR site to create the snapset (S28-S29, 1020j) including the identified snapshots of the target system having the particular unique snapset signature.

In at least one embodiment, the steps S26-S29 can form loop 1020h that can generally be performed for each snapset of recovery snapshots forming a point in time common base between the source and target systems. From the step S29, control can be returned (S30) from the replication session service to the requester that sent the request in the step S1 to switch the replication mode of the asynchronous replication session to the low RPO replication mode.

In at least one embodiment when the VG1 and replication session are in the NZ or low RPO replication mode such as a result of completing processing of the sequence diagram 1000a-c, a group level recovery snapshot of VG1 can be taken on the source system, where the group level recovery snapshot can include a snapshot of each VG1 member taken at the same point in time. The group level recovery snapshot of VG 1 can denote the snapset on the source system that is replicated or transferred to the target system using the low RPO replication techniques described herein.

Generally, at the group level, the source system can coordinate transferring all members of the snapset or group level recovery snapshots of the source volumes to the target system and then notify the target system once all snapset members having a particular unique snapset signature are transferred. In response to receiving the notification, the target system can build the snapset on the target system to serve as the common base. In at least one embodiment consistent with other discussion herein, each snapset can have a unique signature such that the target system can perform processing to query or search for snapshots having the particular unique signature of the snapset where such matching snapshots can be identified as the forming the common base of recovery snapshots.

The foregoing describes various optimizations that can be performed in connection with low RPO replication techniques for asynchronous replication in at least one embodiment. Additionally, the foregoing describes processing that can be performed in at least one embodiment to switch or transition a replication session and VG1 configured for asynchronous replication from the AAR mode to the low RPO replication mode. Such processing in at least one embodiment can include transitioning individual VG1 members and corresponding volume pairs independently at various points in time where the replication session and VG1 transition to a hybrid group level replication mode where one or more VG1 members are in the low RPO replication mode at the member level and one or more VG1 members of the VG1 are in the AAR replication mode at the member level.

In at least one embodiment, the VG1 and replication session can also transition into hybrid mode in other scenarios such as in response to one or more other conditions or triggers. For example in at least one embodiment for a VG1 or replication session in the low RPO replication mode at the group level, one or more VG1 members can temporarily transition, at the individual member level, to the AAR mode such as responsive to the amount of free or write tracking cache falling below a minimum threshold level. Instead of exiting the low RPO replication mode for the entire VG1 or all volume pairs of the replication session, one or more VG1 members or volume pairs can temporarily transition to the AAR mode at the member level thereby leaving the VG1 and replication session in a hybrid mode with remaining VG1 members and corresponding volume pairs still in the low RPO replication mode at the member level. In at least one embodiment, the CP such as on the source system can be notified whenever a VG1 member or volume pair transitions from the low RPO replication mode to the AAR replication mode to thereby place the VG1 and replication session in the group level hybrid mode. In at least one embodiment, the CP can then handle the replication session as discussed herein with the VG1 and replication session in hybrid mode using a 5 minute or other RPO (e.g., to create 5 minute common base recovery snapshots of the VG1) until the VG1 or replication session mode can be switched back to the low RPO replication mode once the problem(s) or condition(s) that triggered the transition to hybrid mode have been corrected or resolved.

In further detail as can be observed from the foregoing discussions, the low RPO replication technique uses cache resources and log resources. In at least one embodiment, the cache resources can include volatile memory cache resources and the log resources can include non-volatile or persistent storage used for the persisted log. As the I/O load on the volumes under asynchronous replication using the low RPO techniques increases and/or as the number of volumes under asynchronous replication using the low RPO techniques increases, the available or free cache and log resources can run low such as below corresponding minimum thresholds. Due to the low levels of free cache and log resources, at least some volumes configured for low RPO replication can fall out of compliance such that low RPO replication ceases/is unable to be performed and an alternative asynchronous replication technique is performed for such volumes.

Consistent with discussion above, at least one embodiment of the low RPO replication technique relies on the ability to track every write to a volume to maintain a list of changed locations of the source volumes between successive transient or replication related snapshots (e.g., such as illustrated in the write tracking memory or cache of FIG. 7). If the write tracking memory or cache resource becomes depleted or exhausted (e.g., consumed so that no additional writes can be tracked), all further writes to all low RPO replication volumes will no longer be tracked such that all such volumes can fall back to use an alternative asynchronous replication technique or mode. In at least one embodiment, the alternative asynchronous replication technique may not perform any of the asynchronous replication optimizations performed by the low RPO replication technique. As such, the alternative asynchronous replication technique may not use or consume the write tracking memory or cache resource.

To avoid depleting the write tracking memory consumed collectively by all volumes configured for low RPO replication, the techniques of the present disclosure in at least one embodiment provide for monitoring the total amount of write tracking memory or cache consumed collectively across all volumes in connection with low RPO replication. In at least one embodiment, when the total amount of write tracking memory consumed exceeds a high water mark threshold, processing can be performed to pre-emptively and proactively demote selected one or more volumes from the low RPO replication technique or mode to the alternative asynchronous replication technique or mode. In at least one embodiment, the alternative asynchronous replication technique or mode can be the legacy snapshot difference technique discussed in more detail elsewhere herein that does not perform the optimizations of the low RPO replication technique. In at least one embodiment, the legacy snapshot difference technique does not consume or use write tracking memory that is consumed or used in connection with the low RPO replication technique or mode.

In at least one embodiment, processing can demote one or more volume pairs or members of VG1 from low RPO replication mode such that the VG and replication session are in hybrid mode after such demotion(s). Consistent with other discussion herein, such one or more VG1 member or volume pair demotions can be triggered by an amount of an available resource, such as the write tracking memory or cache used by low RPO replication, having a free amount below a minimum threshold. At a later point in time as the free or available amount of the resource, such as write tracking memory or cache, increases above a specified threshold, processing can be performed to transition the hybrid VG1 or replication session to a low RPO replication where all VG1 members and volume pairs of the replication session can resume performing low RPO replication.

In at least one embodiment, the low RPO replication mode for asynchronous replication relies on limited cache or volatile memory resources and log space. In at least one embodiment, a specified amount of memory, sometimes referred to as write tracking memory or cache, can be allocated and used for write tracking across all volumes configured for asynchronous replication using the low RPO replication mode or technique. As the I/O load on the volumes and/or the number of volumes operating using the low RPO replication mode for asynchronous replication increases, the resources, such as the write tracking memory or cache consumed in connection with such replication also increases. As a result, the amount of write tracking cache available can run low and can be insufficient to sustain performing low RPO replication for at least some of the volumes thereby causing at least these particular volumes to go out of RPO compliance such that low RPO replication is not performed for the particular volumes. In at least one embodiment, when asynchronous replication using the low RPO replication technique cannot be performed such as due to insufficient write tracking memory or cache, asynchronous replication for such volumes can be performed using an alternative technique, such as the legacy snapshot difference technique. In at least one embodiment the alternative technique such as the legacy snapshot difference technique may not perform the asynchronous replication optimizations of the low RPO replication. Thus, the alternative technique may not use the write tracking memory or cache resource that is otherwise used and consumed by the low RPO replication technique. In at least one embodiment, the alternative technique can be used rather than the low RPO replication technique until corresponding resource pressure or consumption, such as of the write tracking memory or cache, has abetted such that the amount of available or free write tracking memory increases to a sufficient level.

In at least one embodiment, rather than wait until one or more volumes fall out of compliance such that an alternative asynchronous replication technique is performed rather than the low RPO replication technique as a result of depletion of the write tracking memory or insufficient available write tracking memory, the techniques of the present disclosure can be performed to further pre-emptively and proactively demote selected one or more candidate volumes from the low RPO replication technique or mode to the alternative asynchronous replication technique or mode. The foregoing can be performed in efforts to relieve the resource pressure and consumption demand, such as with respect to the write tracking memory. By acting pre-emptively or proactively in at least one embodiment, the techniques of the present disclosure can be used to purposefully and proactively select one or more particular volumes for demotion rather than have other volumes fall out of RPO compliance (e.g., no low RPO replication technique performed) and use the alternative asynchronous replication mode or technique. In at least one embodiment, when the system load reduces and the available resource, such as write tracking cache, used in connection with low RPO replication mode, increases to a sufficient level, processing can be performed by the storage system to promote or restore the demoted volumes back to the low RPO replication mode and take advantage of the optimizations of the low RPO replication mode.

In at least one embodiment, responsive to i) determining that a free amount of write tracking cache falls below a minimum, or ii) determining that a consumed amount of write tracking cache is above a maximum, one or more volumes can be selected for demotion from the low RPO replication mode to the alternative asynchronous replication mode. In at least one embodiment, the one or more volumes selected for demotion can be included in VG1 with all members replicating using the low RPO replication mode. In at least one embodiment, the one or more volumes selected for demotion can be included in a hybrid VG1 or hybrid replication session with one or more members replicating using the low RPO replication mode and one or more members replicating using the alternative asynchronous replication mode.

In at least one embodiment in accordance with the techniques of the present disclosure, processing can be performed to monitor resource consumption and determine a total amount of resource consumption consumed in connection with all volumes operating in accordance with the low RPO technique for asynchronous replication. In at least one embodiment, one of the resources monitored in connection with low RPO replication can include the write tracking memory or cache.

In at least one embodiment in response to a total consumed amount of the write tracking memory or cache being above a corresponding threshold, processing can be performed to select one or more volumes for demotion from the low RPO replication mode to an alternative asynchronous replication technique. In at least one embodiment in response to the total consumed amount of the write tracking memory or cache rising above the corresponding threshold, processing can be performed to restore low RPO replication for one or more previously demoted volumes.

In at least one embodiment, any suitable selection criteria can be used to select the one or more volumes demoted from the low RPO replication mode to the AAR replication mode. In at least one embodiment, one or more volumes or volume pairs selected for demotion can be included in a replication session configured for asynchronous replication. When the VG1 and replication session is in the low RPO replication mode and a VG1 member is selected for demotion to the AAR replication with other remaining VG1 members in the low RPO replication mode, the VG1 and replication session can transition to the hybrid mode. Subsequently in at least one embodiment while the VG1 and replication session are in hybrid mode, the techniques of the present disclosure can provide for creating a common base recovery snapshot for the VG1 at a fixed RPO such as every 5 minutes while allowing each individual VG1 member to have corresponding snapshots replicated using either the low RPO technique or AAR technique based on the individual VG1 member's replication mode. At a later point in time, the VG1 member in the AAR replication mode can transition back to the low RPO replication mode such that all VG1 members are now in the low RPO replication mode and the VG1 and replication session can also transition back to the low RPO replication mode.

In at least one embodiment, the techniques of the present disclosure can provide an efficient way to transition a large VG1 with many members to the low RPO replication mode while also maintaining a common base recovery RPO snapshots across the source and target systems, where the common base of recovery snapshots of the VG1 can be used to perform any needed failover that occurs such as while the corresponding replication session is in hybrid mode.

In at least one embodiment, the techniques of the present disclosure can provide an efficient way to transition a large VG1 with many members to the low RPO replication mode, where the VG1 has a number of members exceeding the maximum number of active copiers supported on a storage system.

In at least one embodiment while a VG1 and replication session are in hybrid mode, the techniques of the present disclosure provide for transferring, copying or replicating recovery snapshots of a snapset from the source system to the target system based on the particular VG1 member level replication modes of the VG1 or source volume members. In at least one embodiment, the techniques of the present disclosure provide for consolidation or grouping transferred recovery snapshots of the snapset based on a unique snapset signature to build a corresponding snapset of recovery snapshots on the target system.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    establishing an asynchronous replication configuration of a replication session associated with i) a source volume group VG1 of source volumes on a source system, ii) a target volume group VG2 of target volumes on a target system, and iii) volume pairs each including a source volume of VG1 and a unique corresponding target volume of VG2, wherein the source volume and the corresponding target volume of said each volume pair are configured for asynchronous replication such that writes to the source volume are asynchronously replicated to the corresponding target volume; and
    performing first processing to transition the replication session to have a group level asynchronous replication mode denoting a low RPO (recovery point objective) replication mode comprising:
        setting the group level asynchronous replication for the replication session to an alternative asynchronous replication (AAR) mode, wherein each source volume of VG1 has an associated member level asynchronous replication mode denoting the AAR mode;
        transitioning the group level asynchronous replication mode of the replication session from the AAR mode to a hybrid mode, wherein i) at least one source volume of VG1 has a corresponding member level asynchronous replication mode of the AAR mode and ii) at least one source volume of VG1 has a corresponding member level asynchronous replication mode of the low RPO replication mode;
        creating a first snapset of snapshots of the source volumes of VG1, wherein the first snapset is a group level snapshot of the source volumes of VG1 taken at a same point in time;
        replicating each snapshot of the first snapset from the source system to the target system in either the low RPO replication mode or the AAR mode based on an associated member level asynchronous replication mode of a source volume of VG1 corresponding to said each snapshot; and
        constructing a second snapset of snapshots of target volumes of VG2 on the target system, wherein each snapshot of a target volume of VG2 in the second snapset denotes a same point in time copy as a corresponding snapshot of a source volume of VG1 in the first snapset.

2. The computer-implemented method of claim 1, wherein the first snapset and the second snapset serve as a common base of recovery snapshots.

3. The computer-implemented method of claim 1, wherein a first volume pair SV1 of the replication session is configured from a first source volume SRC1 of VG1 and a first target volume TGT1 of VG2, wherein SRC1 has a first member level asynchronous replication mode denoting the low RPO replication mode and the first snapset includes a first snapshot SNAP1 of SRC1, and wherein said replicating includes:
    replicating SNAP1, from the source system to the target system, in the low RPO replication mode using a low RPO replication technique.

4. The computer-implemented method of claim 3, wherein SNAP1 denotes an Nth snapshot, SNAP N, of SRC1, and wherein SNAP N-1 and SNAP N denote successive snapshots of SRC1, and wherein said replicating SNAP1 using the low RPO replication technique includes:
    determining a first delta set of changed content between successive snapshots SNAP N and SNAP N-1 of SRC1;
    copying the first delta set of changed content from the source system to the target system;
    applying the first delta set of changed content to TGT1; and
    taking a snapshot SNAP2 of TGT1 after applying the first delta set.

5. The computer-implemented method of claim 4, wherein SNAP2 is included in the second snapset, and wherein SNAP2 and SNAP1 denote identical point in time copies.

6. The computer-implemented method of claim 4, wherein a first replication cycle or tracking session having a first tracking identifier ID1 is associated with SNAP N-1 and SNAP N of SRC1, the first member level asynchronous replication mode of SRC1 is the low RPO replication mode during the first replication cycle or tracking session, and the method includes:
    tracking, in a write tracking cache, first locations of SRC1 that are associated with ID1 and written to during the first replication cycle or tracking session;
    querying the write tracking cache for a list of tracked writes with a tracking identifier of ID1, wherein the list includes the first locations of SRC1 modified during the first replication cycle or tracking session;
    reading, from a cache, first content written to the first locations of SRC1 during the first replication cycle or tracking session; and
    copying the first content from the source system to the target system, wherein the first content is the first delta set of changed content applied to TGT1.

7. The computer-implemented method of claim 6, wherein a log includes first records corresponding to: taking SNAP N-1 of SRC1, taking SNAP N of SRC1, and writing the first content to the first locations of SRC1.

8. The computer-implemented method of claim 7, wherein the first records are retained in the log until the first content, written to the first locations of SRC1 during the first replication cycle or tracking session, has been copied from the source system to the target system; and wherein the first content is retained in the cache until the first content, written to the first locations of SRC1 during the first replication cycle or tracking session, has been copied from the source system to the target system.

9. The computer-implemented method of claim 8, wherein responsive to copying the first content from the source system to the target system, third processing is performed including:

invalidating corresponding records of the log denoting said taking SNAP N-1 of SRC1 and said taking SNAP N of SRC1;

flushing one or more corresponding records of the log denoting the first locations of SRC1 written to during the first replication cycle or tracking session between SNAP N-1 and SNAP N; and marking corresponding cache locations of the cache storing the first content indicating that the first content is allowed to be evicted from the corresponding cache locations.

10. The computer-implemented method of claim 1, wherein a first volume pair SV1 of the replication session is configured from a first source volume SRC1 of VG1 and a first target volume TGT1 of VG2, wherein SRC1 has a first member level asynchronous replication mode denoting the AAR mode and the first snapset includes a first snapshot SNAP1 of SRC1, and wherein said replicating includes:

replicating SNAP1 from the source system to the target system in the AAR mode using an AAR technique.

11. The computer-implemented method of claim 10, wherein SNAP1 denotes an Nth snapshot, SNAP N, of SRC1, and wherein SNAP N-1 and SNAP N denote successive snapshots of SRC1 of a first replication cycle, and wherein said replicating SNAP1 using the AAR technique includes:

determining a first delta set of changed content between successive snapshots SNAP N and SNAP N-1 of SRC1;

copying the first delta set of changed content from the source system to the target system;

applying the first delta set of changed content to TGT1; and taking a snapshot SNAP2 of TGT1 after applying the first delta set.

12. The computer-implemented method of claim 11, wherein SNAP2 is included in the second snapset, and wherein SNAP2 and SNAP1 denote identical point in time copies.

13. The computer-implemented method of claim 12, wherein the first delta set includes first content denoting content written to first locations of SRC1 during the first replication cycle between SNAP N-1 and SNAP N, wherein a log includes first records corresponding to: taking SNAP N-1 of SRC1, taking SNAP N of SRC, and writing the first content to the first locations of SRC1.

14. The computer-implemented method of claim 13, wherein the first content is not retained in a cache until the first content, written to the first locations of SRC1 during the first replication cycle or tracking session, has been copied from the source system to the target system, and wherein the method includes:

flushing the first records from the log before the first content, written to the first locations of SRC1 during the first replication cycle or tracking session, has been copied from the source system to the target system.

15. The computer-implemented method of claim 1, wherein the first snapset is identified using a unique signature, and wherein said constructing the second snapset of snapshots of target volumes of VG2 on the target system includes:

identifying a first set of snapshots on the target system, wherein each snapshot of the first set has the unique signature, wherein the second snapset is the first set of snapshots having the unique signature.

16. The computer-implemented method of claim 1, wherein the first processing includes, for each of the volume pairs of the replication session configured from a corresponding source volume and a corresponding target volume, performing second processing that individually transitions the corresponding member level asynchronous replication mode of said corresponding source volume of said each volume pair from the AAR mode to the low RPO replication mode, wherein said second processing includes:

taking a snapshot of the corresponding source volume;

replicating, in the AAR mode, the snapshot of the corresponding source volume from the source system to the target system;

determining an amount of changed content in the snapshot of the corresponding source volume; and if the amount is less than or equal to a specified threshold, transitioning the corresponding member level asynchronous mode of the corresponding source volume of said each volume pair from the AAR mode to the low RPO replication mode.

17. The computer-implemented method of claim 16, wherein said replicating, in the AAR mode, the snapshot of the corresponding source volume from the source system to the target system includes:

taking two successive snapshots of the corresponding source volume;

determining that first content is written to first locations of the corresponding source volume between points in time corresponding to the two successive snapshots;

copying the first content written to the target system; and applying the first content to the first locations of a corresponding target volume.

18. The computer-implemented method of claim 1, while the group level asynchronous replication mode of the replication session is the hybrid mode, the first processing includes:

taking group level snapshots of VG1 at defined fixed time intervals based on a defined RPO, wherein each of the group level snapshots of VG1 includes a first corresponding snapset of snapshots of the source volumes of VG1;

replicating the group level snapshots of VG1 from the source system to the target system; and applying the group level snapshots of VG1 to VG2 to generate corresponding group level snapshots of V2, wherein each of the corresponding group level snapshots of VG2 includes a second corresponding snapset of snapshots of the target volumes of VG2.

19. A system comprising:

one or more processors; and a memory comprising code stored thereon that, when executed, performs a method comprising:

establishing an asynchronous replication configuration of a replication session associated with i) a source volume group VG1 of source volumes on a source system, ii) a target volume group VG2 of target volumes on a target system, and iii) volume pairs each including a source volume of VG1 and a unique corresponding target volume of VG2, wherein the source volume and the corresponding target volume of said each volume pair are configured for asynchronous replication such that writes to the source volume are asynchronously replicated to the corresponding target volume; and performing first processing to transition the replication session to have a group level asynchronous replication mode denoting a low RPO (recovery point objective) replication mode comprising:

setting the group level asynchronous replication for the replication session to an alternative asynchronous replication (AAR) mode, wherein each source volume of VG1 has an associated member level asynchronous replication mode denoting the AAR mode;

transitioning the group level asynchronous replication mode of the replication session from the AAR mode to a hybrid mode, wherein i) at least one source volume of VG1 has a corresponding member level asynchronous replication mode of the AAR mode and ii) at least one source volume of VG1 has a corresponding member level asynchronous replication mode of the low RPO replication mode;

creating a first snapset of snapshots of the source volumes of VG1, wherein the first snapset is a group level snapshot of the source volumes of VG1 taken at a same point in time;

replicating each snapshot of the first snapset from the source system to the target system in either the low RPO replication mode or the AAR mode based on an associated member level asynchronous replication mode of a source volume of VG1 corresponding to said each snapshot; and constructing a second snapset of snapshots of target volumes of VG2 on the target system, wherein each snapshot of a target volume of VG2 in the second snapset denotes a same point in time copy as a corresponding snapshot of a source volume of VG1 in the first snapset.

20. A non-transitory computer-readable media comprising code stored thereon that, when executed, performs a method comprising:

establishing an asynchronous replication configuration of a replication session associated with i) a source volume group VG1 of source volumes on a source system, ii)

a target volume group VG2 of target volumes on a target system, and iii) volume pairs each including a source volume of VG1 and a unique corresponding target volume of VG2, wherein the source volume and the corresponding target volume of said each volume pair are configured for asynchronous replication such that writes to the source volume are asynchronously replicated to the corresponding target volume; and performing first processing to transition the replication session to have a group level asynchronous replication mode denoting a low RPO (recovery point objective) replication mode comprising:

setting the group level asynchronous replication for the replication session to an alternative asynchronous replication (AAR) mode, wherein each source volume of VG1 has an associated member level asynchronous replication mode denoting the AAR mode;

transitioning the group level asynchronous replication mode of the replication session from the AAR mode to a hybrid mode, wherein i) at least one source volume of VG1 has a corresponding member level asynchronous replication mode of the AAR mode and ii) at least one source volume of VG1 has a corresponding member level asynchronous replication mode of the low RPO replication mode;

creating a first snapset of snapshots of the source volumes of VG1, wherein the first snapset is a group level snapshot of the source volumes of VG1 taken at a same point in time;

replicating each snapshot of the first snapset from the source system to the target system in either the low RPO replication mode or the AAR mode based on an associated member level asynchronous replication mode of a source volume of VG1 corresponding to said each snapshot; and constructing a second snapset of snapshots of target volumes of VG2 on the target system, wherein each snapshot of a target volume of VG2 in the second snapset denotes a same point in time copy as a corresponding snapshot of a source volume of VG1 in the first snapset.

\* \* \* \* \*